(12) United States Patent
Uchida

(10) Patent No.: US 7,848,636 B2
(45) Date of Patent: Dec. 7, 2010

(54) CAMERA FOR MICROSCOPE

(75) Inventor: Tomohiro Uchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 169 days.

(21) Appl. No.: 12/237,536

(22) Filed: Sep. 25, 2008

(65) Prior Publication Data

US 2009/0087177 A1   Apr. 2, 2009

(30) Foreign Application Priority Data

Sep. 28, 2007   (JP) ............................. 2007-256259

(51) Int. Cl.
*G02B 21/36* (2006.01)
*H04N 9/47* (2006.01)
(52) U.S. Cl. ........................... 396/432; 348/79; 348/80
(58) Field of Classification Search .................. 396/432; 348/79, 80
See application file for complete search history.

(56) References Cited

U.S. PATENT DOCUMENTS

| 6,400,502 B1 | 6/2002 | Ooki |
| 2006/0171023 A1 | 8/2006 | Kishida |

| 2008/0218604 A1* | 9/2008 | Shikano et al. .......... 348/240.3 |

FOREIGN PATENT DOCUMENTS

| JP | 2000-066109 A | 3/2000 |
| JP | 2001-350101 A | 12/2001 |
| JP | 2003-032524 A | 1/2003 |
| JP | 2004-258495 A | 9/2004 |
| JP | 2005-037683 A | 2/2005 |
| JP | 2005-234435 A | 9/2005 |
| JP | P3909928 B2 | 2/2007 |

OTHER PUBLICATIONS

European Office Action dated Nov. 23, 2009 (in English) issued in counterpart European Application No. 080170063.1.
Extended European Search Report dated Feb. 23, 2009 (6 pages), issued in counterpart European Application Serial No. 08017006.1.

* cited by examiner

*Primary Examiner*—Rodney E Fuller
(74) *Attorney, Agent, or Firm*—Holtz, Holtz, Goodman & Chick, PC

(57) ABSTRACT

A microscope digital camera includes a camera head unit and an operation display unit. A display portion of the operation display unit displays an observed image acquired by a microscope body. A CPU in an operated portion of the operation display unit detects a change of the observed image. By turning on an objective warning LED provided for the operated portion, notification information indicating a detection result of a change of the observed image by the CPU is output.

9 Claims, 41 Drawing Sheets

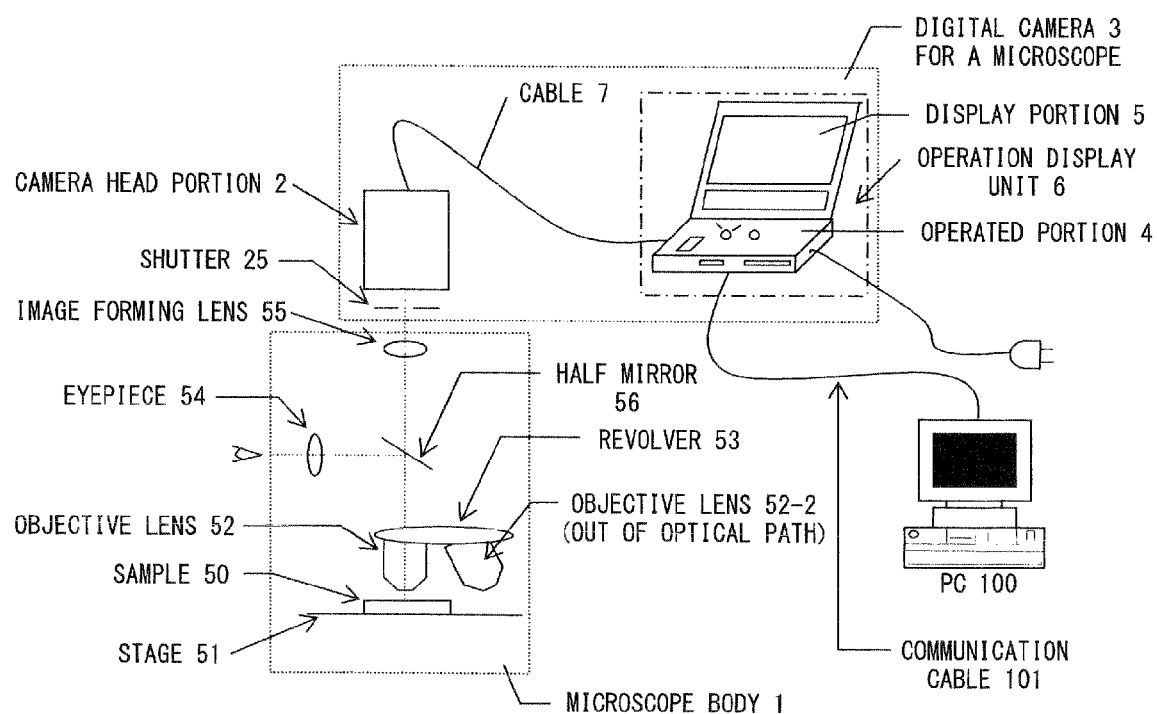
F I G. 1

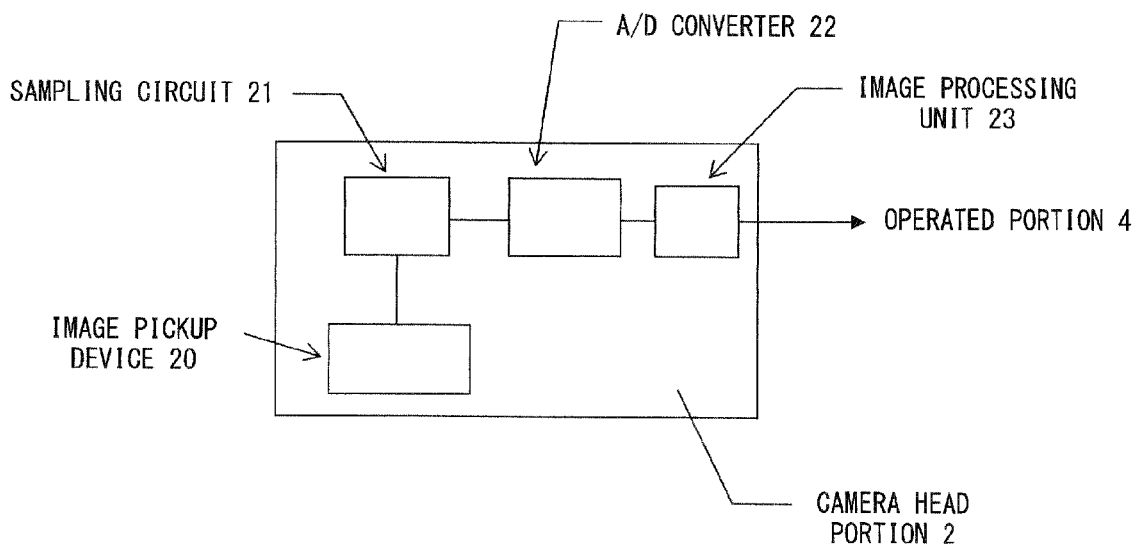
F I G. 3

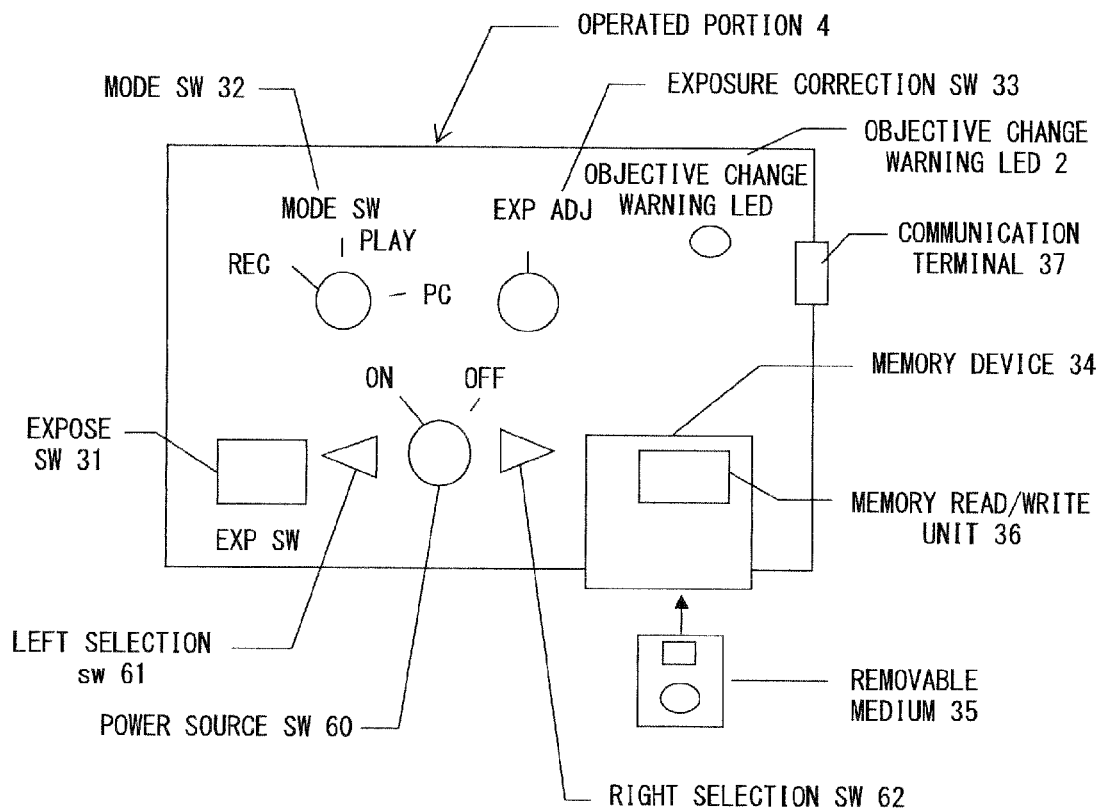
F I G. 4

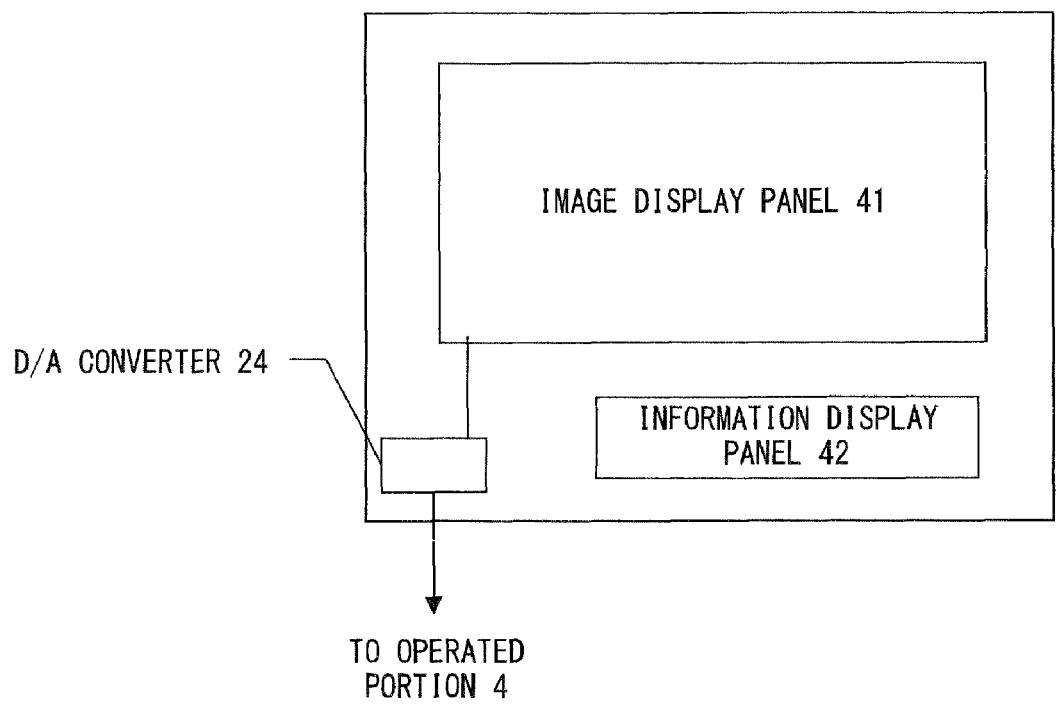
F I G. 7

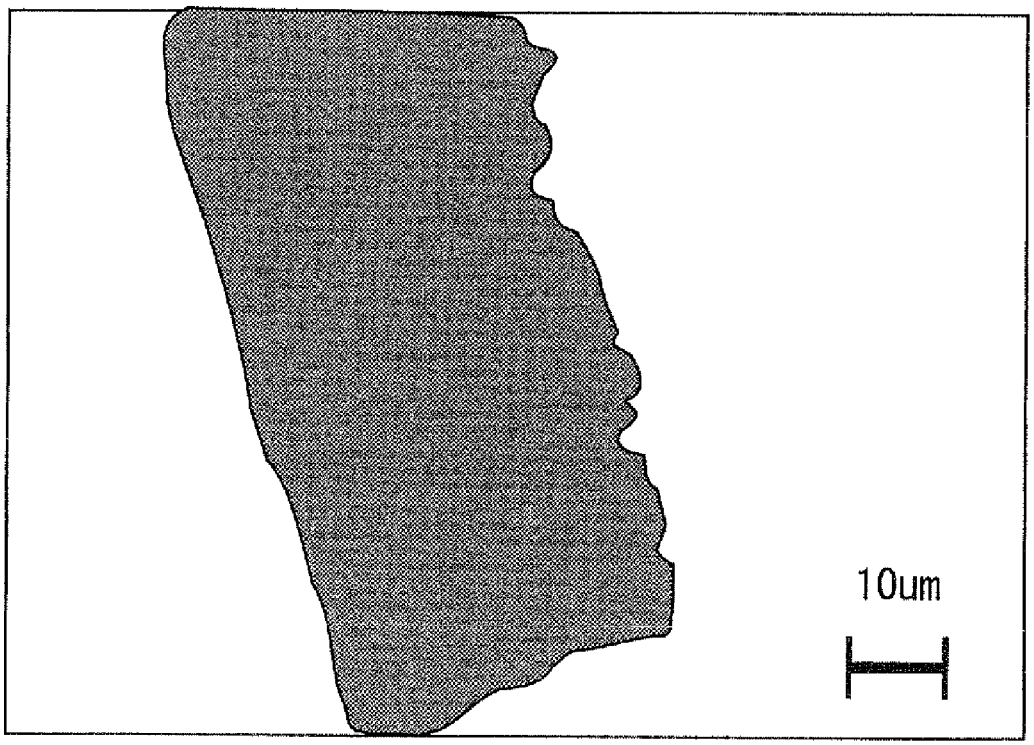
F I G. 8

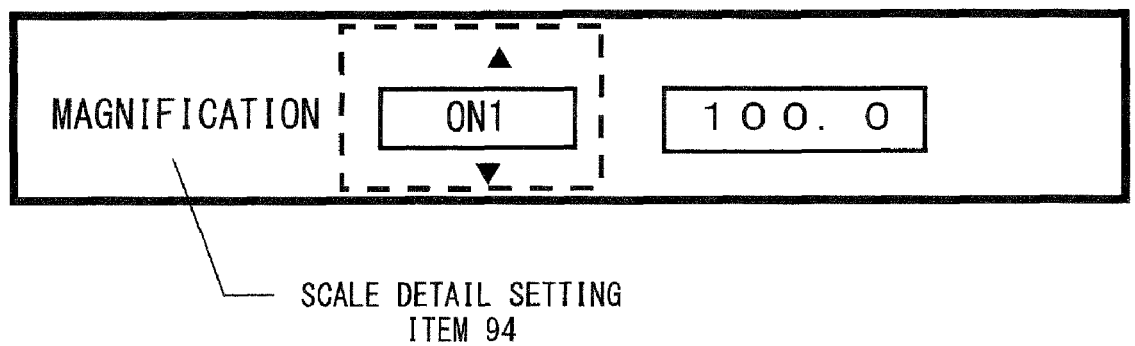
F I G. 1 0

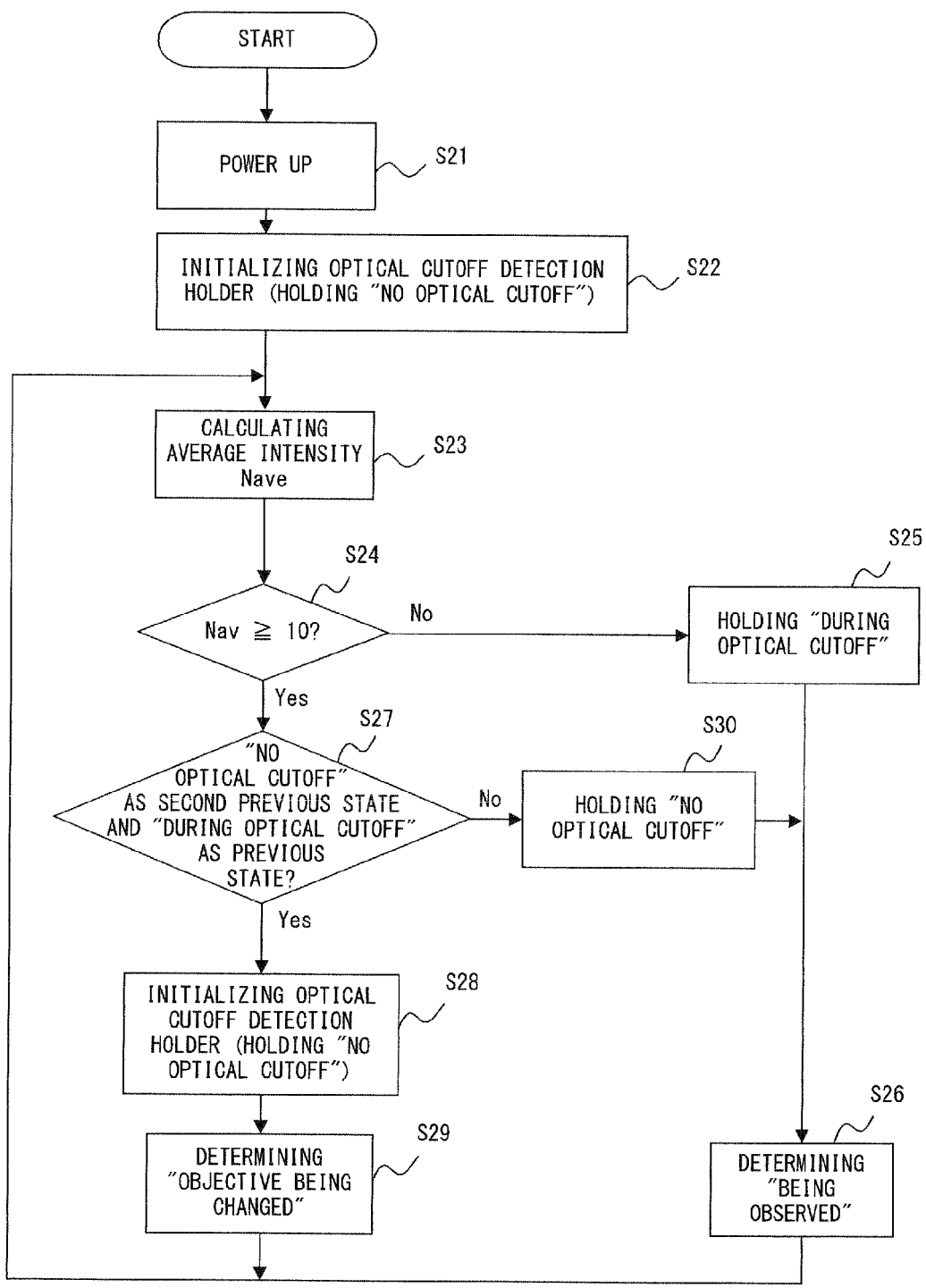
F I G. 15

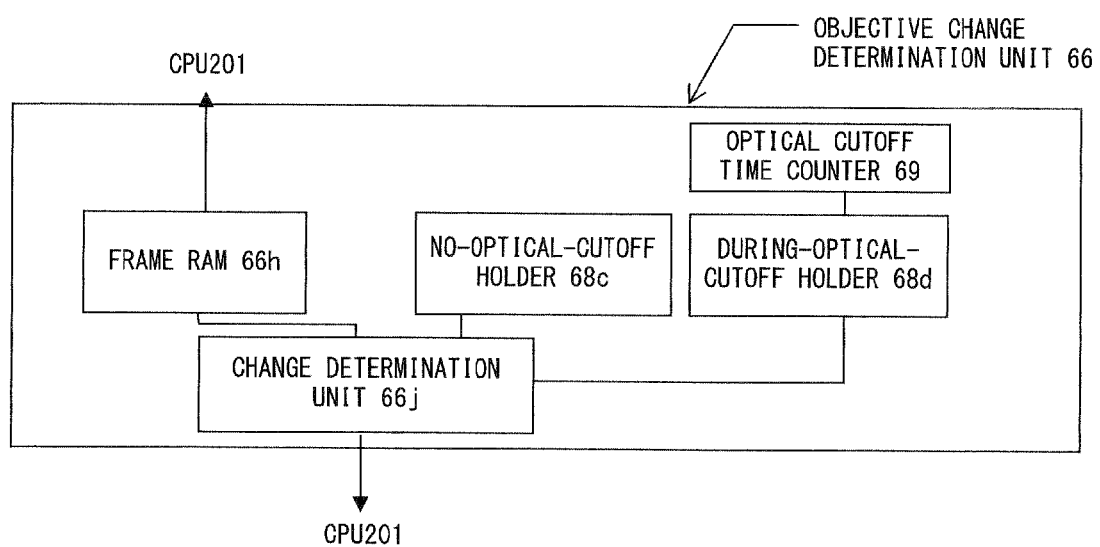
F I G. 16

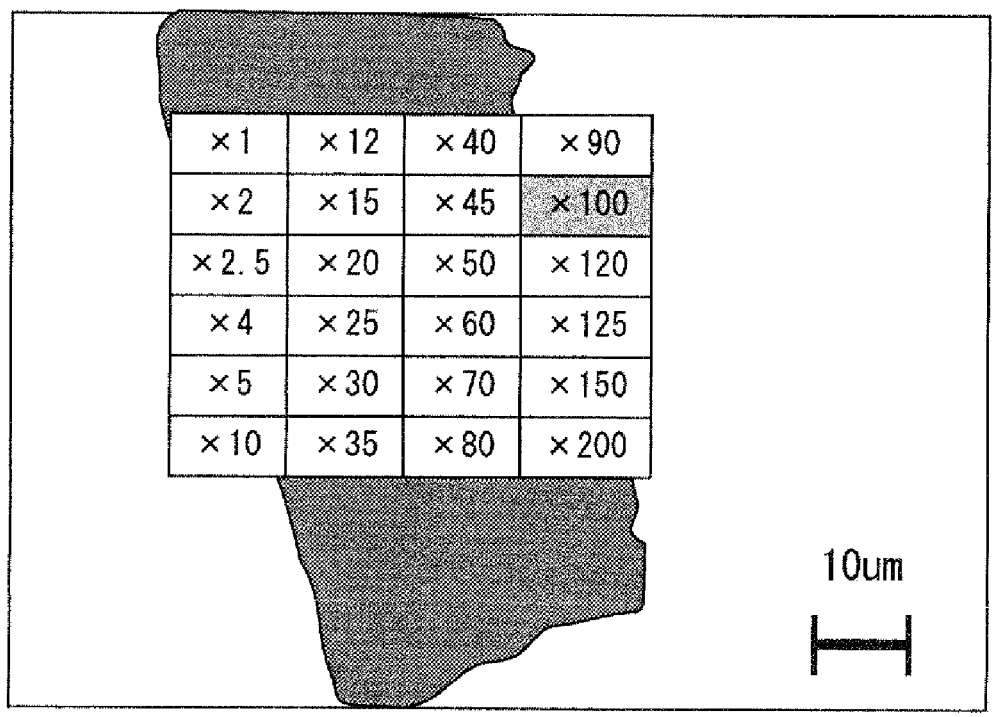
F I G. 2 1

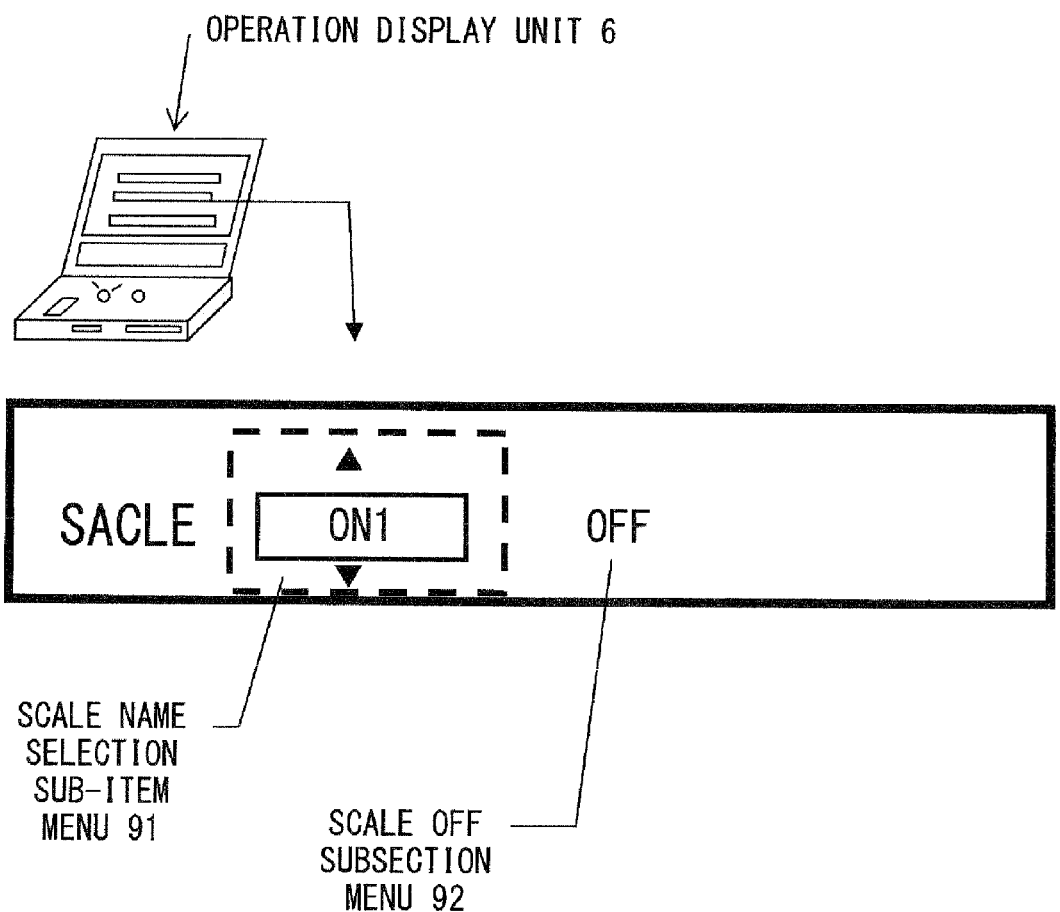
F I G. 2 2

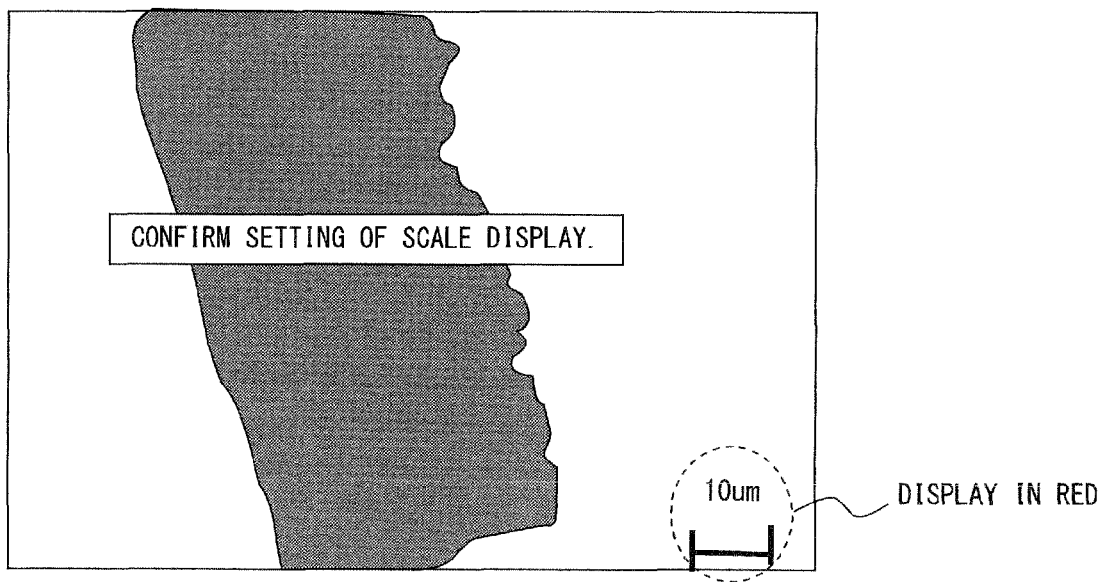
F I G. 3 0

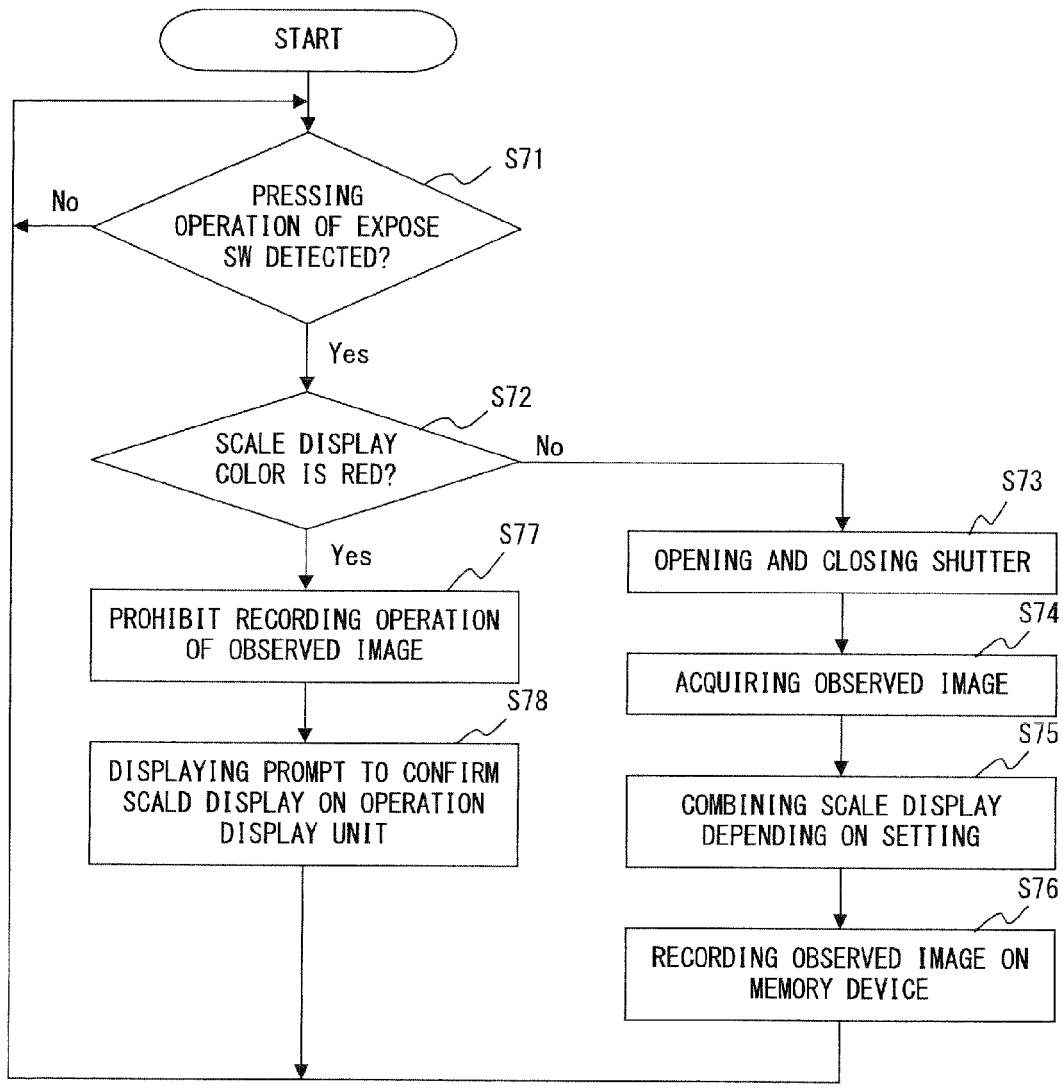
F I G. 3 1

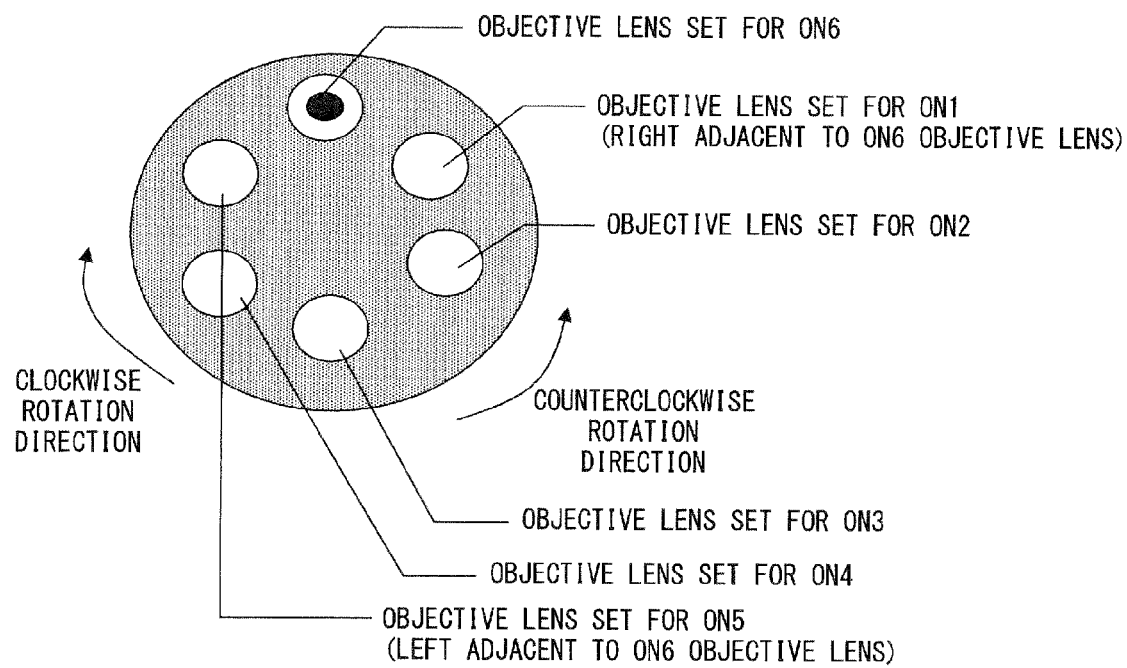
F I G. 36

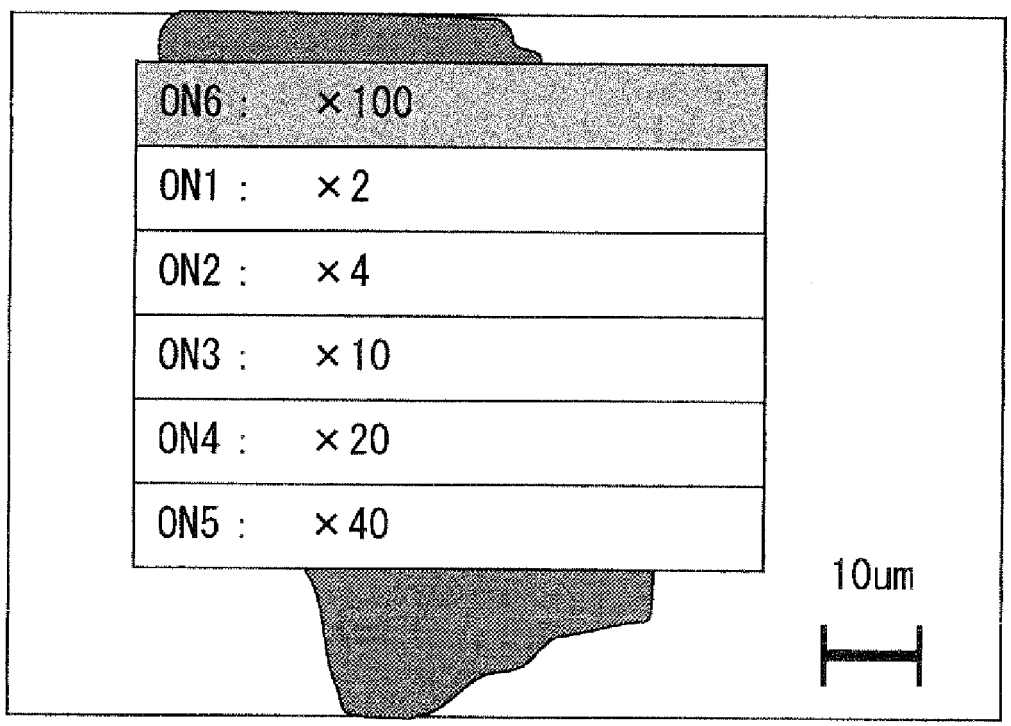
F I G. 3 7

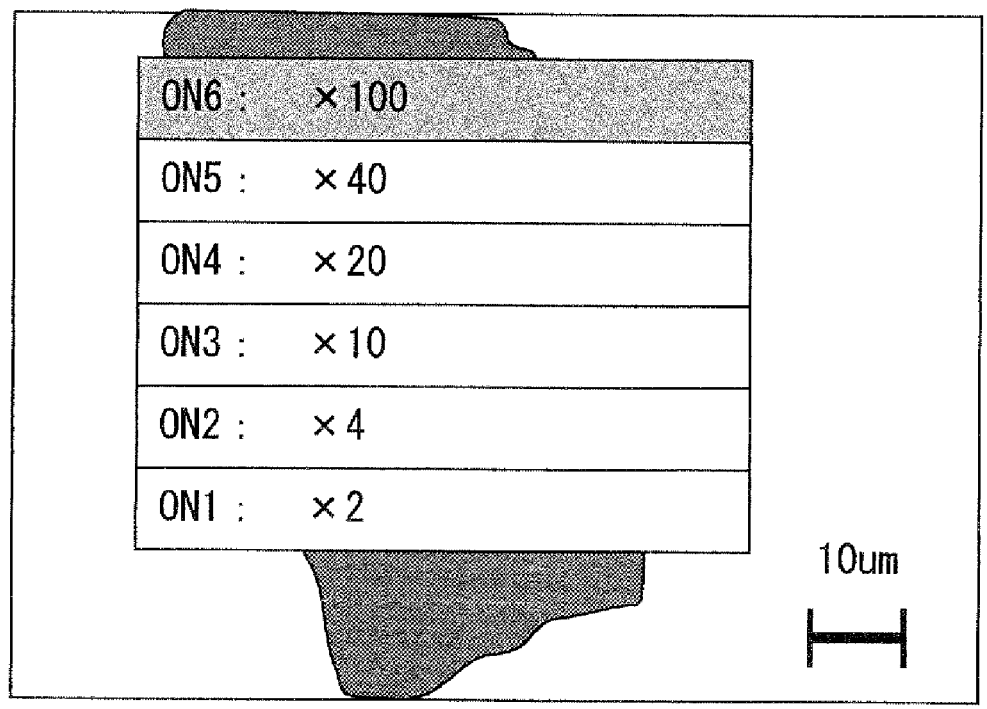
F I G. 3 8

CAMERA FOR MICROSCOPE

CROSS REFERENCE TO RELATED APPLICATIONS

This application claims benefit of Japanese Application No. 2007-256259, filed Sep. 28, 2007, the contents of which are incorporated by this reference.

BACKGROUND OF THE INVENTION

1. Field of the Invention

The present invention relates to the technology of a microscope, and more specifically to the technology of a camera for a microscope for shooting an observed image on the microscope.

2. Description of the Related Art

A camera for a microscope can be equipped with a scale function for easily grasping the practical size of a sample displayed on an observed image, and a measure function for measuring the distance between any two points in the observed image. In the above-mentioned functions, the scale function is to show an observer an image of graphics indicating a ruler with a scale, an image of a character indicating the magnification of a microscope, etc. to allow the observer to grasp the size of the observed image. The notifying method normally displays these images by superposing them on the observed image.

Relating to the scale function of a camera for a microscope, for example, the technology disclosed by the Japanese Published Patent Application No. 2004-258495 is widely known. In this technology using a camera for a microscope capable of displaying a scale, a CCU (camera control unit) acquires the information about a microscope objective lens being used to optimize the magnification and scale of a scale image included in the observed image by generating a scale image according to the information.

In addition, for example, the technology disclosed in the Japanese Published Patent Application No. 2003-32524 is also well known. The technology enables a scale to be displayed on an image of the camera, thereby realizing the display of a scale appropriate for the observed image, and superposing the scale on both live image and still image recorded.

Furthermore, as the technology related to the present invention, for example, the technology disclosed by the Japanese Published Patent Application No. 2005-37683 is well known. This technology is to suppress the high intensity illumination, generated by the optical path of the microscope being released after temporary optical cutoff in a microscope operation for switching the objective lens of the microscope, of moving pictures captured by a camera for the microscope. This technology suppresses the over-exposure (over-bright) state while the optical cutoff is released that is caused by the exposure control during the cutoff of an optical path after temporary stop of the exposure control upon detection of the cutoff of an optical path by the camera. In addition, for example, the technology disclosed by the Japanese Patent Publication No. 3909928 is also well known. This technology controls the over-bright state of an image while the optical cutoff is released by temporarily stopping the AGC (automatic gain control) when the optical path of a microscope is cut off by the rotating operation of an objective revolver for holding the objective lens of the microscope.

SUMMARY OF THE INVENTION

A camera for a microscope as an aspect of the present invention includes: an observed image display unit for displaying an observed image acquired by the microscope; a detection unit for detecting a change of the observed image; and a notification unit for outputting the notification information about a detection result of a change of the observed image by the detection unit.

BRIEF DESCRIPTION OF THE DRAWINGS

The present invention will be more apparent from the following detailed description when the accompanying drawings are referenced.

FIG. 1 shows the configuration of a microscope system;
FIG. 3 shows the configuration of a camera head unit;
FIG. 4 shows the apparent configuration of the operated portion of the operation display unit;
FIG. 7 shows the configuration of the display portion of the operation display unit;
FIG. 8 shows an example of the scale-superposed display of a live image;
FIG. 10 shows an example of a screen (2) for setting the display of a scale;
FIG. 15 is a flowchart showing the flow of the processing operation of the objective change determination unit according to the embodiment 2;
FIG. 16 shows the fourth example of the configuration of the objective change determination unit;
FIG. 21 shows the second display example of a list of display magnification of an observed image;
FIG. 22 shows an example of a screen (3) for setting the display of a scale.

FIG. 30 shows an example of a live image notifying that an instruction to select a display magnification has not been acquired when the operation of pressing EXPOSE SW is acquired;

FIG. 31 is a flowchart showing a part of the flow of the processing operation of the digital camera for a microscope according to the embodiment 7;

FIG. 36 shows an example of the relationship between a scale name and the attachment hole of the revolver;

FIG. 37 shows the sixth display example of a list of display magnification of an observed image;

FIG. 38 shows the seventh display example of a list of display magnification of an observed image;

DESCRIPTION OF THE PREFERRED EMBODIMENTS

Figure 2:
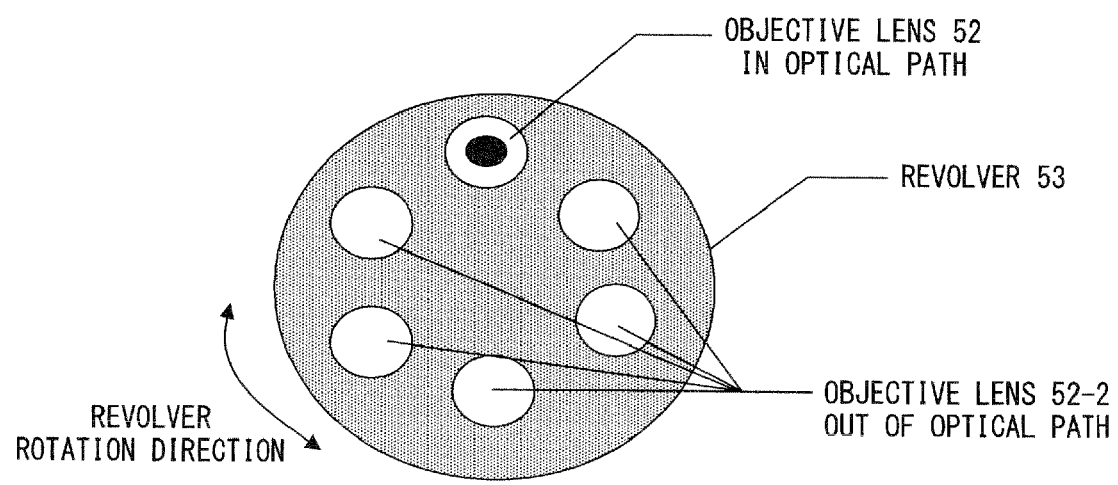
FIG. 2 shows the detailed configuration of a revolver.

Each embodiment as a mode for embodying the present invention is described below with reference to the attached drawings.

Embodiment 1

FIG. 1 shows the configuration of a microscope system including a camera for a microscope for embodying the present invention. FIG. 1 shows that a digital camera 3 for a microscope as an embodiment of the present invention is attached to a microscope body 1.

First, the microscope body 1 is described.

The microscope body 1 is configured by including a stage 51, an objective lens 52, a revolver 53, an eyepiece 54 an image forming lens 55, and a half mirror 56.

The stage 51 is loaded with a sample 50. The objective lens 52 enlarges an image of the sample 50. The half mirror 56 reflects a part of the light expressing the image of the sample 50, and introduces it to the eyepiece 54. The eyepiece 54 forms the light reflected by the half mirror 56 as a sample image to be watched by an observer. The image forming lens 55 forms the light passing through the half mirror 56 as a sample image at the photoreceiver of a camera head portion 2.

The revolver 53 holds the objective lens 52 on the optical path (observation optical axis) of the microscope body 1. The revolver 53 has a rotating mechanism, and can switch the objective lens 52 to be held on the optical path for observation of the sample 50 to another lens attached on the revolver 53 by rotating the revolver. In FIG. 1, the objective lens 52 is held on the optical path, and an objective lens 52-2 is held outside the optical path.

FIG. 2 shows the detailed configuration of the revolver 53. In FIG. 2, the optical path is perpendicular to the paper surface.

As shown in FIG. 2, the revolver 53 has the configuration for attachment of a maximum of 6 objective lenses 52. For example, the objective lens 52 having six different magnifications such as ×4, ×10, ×20, ×40, ×100, etc. can be attached to the revolver 53. When an observer performs a rotating operation of the revolver 53 as necessary, any one of the objective lenses 52 attached to the revolver 53 is disposed on the optical path.

The revolver 53 has a light-proof structure except the attachment portion (shaded area shown in FIG. 2) of the objective lens 52. That is, when the objective lens 52 is switched by rotating the revolver 53, the optical cutoff state is generated on the optical path until the objective lens 52 is removed from the optical path and another lens is disposed on the optical path.

Described next is the digital camera 3 for a microscope.

The digital camera 3 for a microscope is configured by the camera head portion 2 including a shutter 25 and an operation display unit 6 as a structure separate from the camera head portion 2. The camera head portion 2 and the operation display unit 6 are connected via a cable 7.

The camera head portion 2 is disposed on the optical path of the light emitted from the microscope body 1 and indicating a sample image.

The shutter 25 cuts off the light from the image forming lens 55 to the photoreceiver of the camera head portion 2 at any time. The shutter 25 can be an electronic shutter for cutting off the light according to an electric signal.

The operation display unit 61 is configured by a unitary construction of an operated portion 4 operated by an observer and a display portion 5 for displaying a sample image introduced from the camera head portion 2. The display portion 5 also has the function of displaying various setting states etc. relating to the shooting operation of an observer for the operated portion 4.

The camera head portion 2 and the operation display unit 6 can transmit and receive an electric signal between them through the cable 7 connecting them. Therefore, although the operation display unit 6 is disposed as separate from the camera head portion 2 within the range of the cable 7, the digital camera 3 for a microscope can shoot a sample image.

In the operation display unit 6, the operated portion 4 and the display portion 5 can hold a predetermined angle. Therefore, when the operation display unit 6 is placed on, for example, a desk, the operated portion 4 can be held substantially parallel to the surface of the desk, and the display portion 5 can be held at an angle at which the observer can easily perform an operation within the range from 0° to 90° relative to the surface of the desk, for example, at about 90°. The state at 0° indicates the state in which the operated portion 4 and the display portion 5 are horizontal, that is, the operated portion 4 and the display portion 5 are disposed on the same plane.

By connecting the operation display unit 6 to a PC 100 via a communication cable 101, various instructions for operations of the digital camera 3 for a microscope can be issued from the PC 100, and also the PC 100 can record and display a sample image.

Described next is the configuration shown in FIG. 3. FIG. 3 shows the configuration of the camera head portion 2.

The camera head portion 2 is configured by an image pickup device 20, a sampling circuit 21, an A/D converter 22, and an image processing unit 23.

The image pickup device 20 is a photoreceiver in the camera head portion 2, and performs an optoelectronic conversion on the sample image (observed image) formed on the photo-reception surface by the image forming lens 55. The image pickup device 20 can be, for example, a CCD (charge coupling device).

The sampling circuit 21 samples an electric signal output from the image pickup device 20 at predetermined time intervals, and outputs a resultant sampling signal.

The A/D (analog to digital) converter 22 converts a sampling signal as an analog electric signal into digital data.

The image processing unit 23 generates data of an observed image showing a sample image on the basis of the digital data converted by the A/D converter 22.

By continuously generating observed images regardless of a shoot instruction of an observer, the current observed images (moving pictures) can be displayed on the display portion 5 substantially in real time.

Described next is the configuration shown in FIG. 4. FIG. 4 shows the apparent configuration of the operated portion 4 in the operation display unit 6.

The operated portion 4 is configured by an EXPOSE SW 31, a mode SW 32, an exposure correction SW 33, a memory device 34, a power source SW 60, a left selection SW 61, a right selection SW 62, a communication terminal 37, and an objective change warning LED 72.

The EXPOSE SW 31 is a switch operated to instruct the digital camera 3 for a microscope to perform a shooting operation by the digital camera 3 for a microscope, and is a shoot instruction acquisition unit for acquiring a shoot instruction of an observed image obtained by the microscope body 1.

The mode SW 32 is a switch operated to issue an instruction to switch the operation state (operation mode) of the digital camera 3 for a microscope. The digital camera 3 for a microscope is provided with the operation mode including at least a "shooting mode" (REC), a "reproduction mode" (PLAY) and a "PC mode" (PC). The "shooting mode" is an operation mode for performing a shooting mode, and the "reproduction mode" is an operation mode for reproducing and displaying an already stored image. The "PC mode" is an operation mode for the PC 100 issuing various instructions and displaying an image for operating the digital camera 3 for a microscope.

The exposure correction SW 33 is a switch operated for setting a correction value of the exposure while shooting an image.

The memory device 34 records and stores the data of an image showing an observed image of the sample 50 transmitted from the camera head portion 2, and is an observed image record unit for recording an observed image when the pressing operation on the EXPOSE SW 31 is acquired. The memory device 34 has a removable medium 35 and a memory read/write unit 36. The removable medium 35 is a removable data record medium that can be, for example, a flexible disk and flash memory widely used for a PC etc. The memory read/write unit 36 accesses the removable medium 35 to write and read image data.

The power source SW 60 is a switch operated for issuing an instruction for supplying power to each unit of the digital camera 3 for a microscope.

The left selection SW 61 and the right selection SW 62 are switches operated to instruct the digital camera 3 for a microscope to switch various settings, etc.

The communication cable 101 for connecting the operation display unit 6 to the PC 100 is connected to the communication terminal 37.

The objective change warning LED 72 is a light emitting diode, and is a notification unit for outputting notification information indicating the occurrence of a change in an observed image when the change occurs. In the present embodiment, the objective change warning LED 72 is turned on when a change in the optical cutoff state of an observed image is detected and gives a warning of the detection.

As described above, when an observer rotates the revolver 53 to switch the objective lens 52, there occurs a state in which the optical path is cut off until the objective lens 52 slips off the optical path and another lens is disposed on the optical path. At this time, there temporarily occurs the outstanding reduction of the intensity of an observed image. That is, the objective change warning LED 72 gives a warning that the objective lens 52 has been switched by turning on the LED when the reduction of the intensity is detected.

Figure 5:
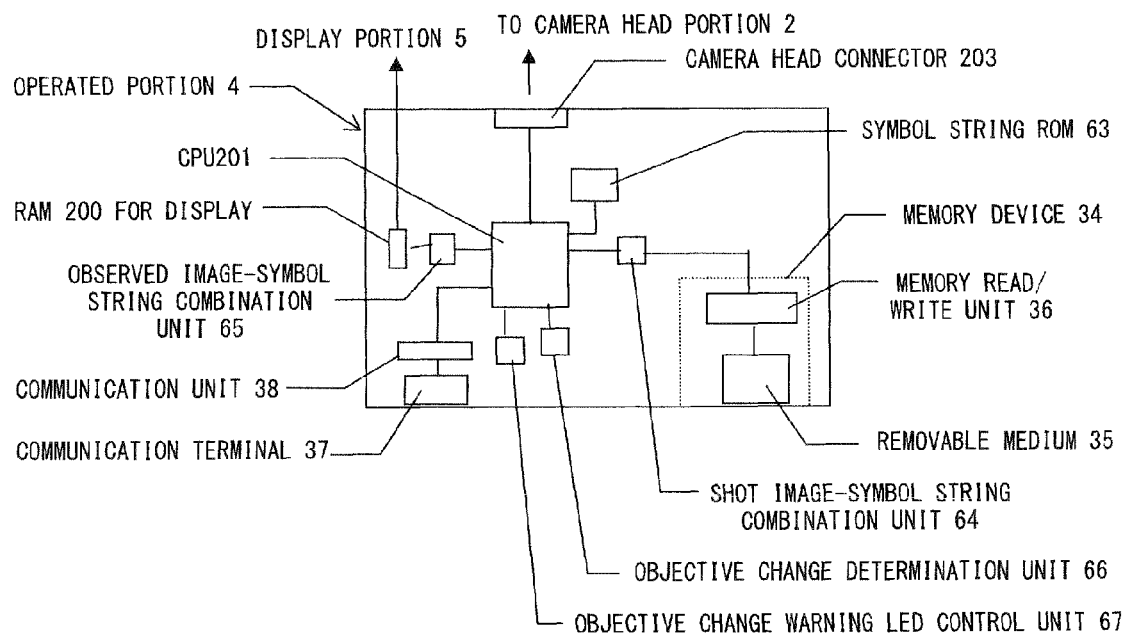
FIG. 5 shows the electric configuration of the operated portion of the operation display unit.

Described next is the configuration shown in FIG. 5. FIG. 5 shows the electrical configuration of the operated portion 4 in the operation display unit 6.

A control circuit (hereinafter referred to as a CPU) 201 includes: a central calculation unit; ROM storing a control program for directing the central calculation unit to perform various controlling processes described later; RAM used as a working storage area by the central calculation unit in executing the control program; and nonvolatile memory for storing the information about a list of magnifications (display magnifications of an observed image) of the entire microscope system described later and shown in FIG. 1. The operation for each switch of the operated portion 4 shown in FIG. 4 is analyzed and processed by the CPU 201.

For example, when an observed image etc. is displayed on the display portion 5, the CPU 201 writes data for display on RAM 200 for display. Then, the display portion 5 performs display on the basis of the data. In the control relating to shooting, the CPU 201 first performs the process of generating a predetermined control signal for issuing an instruction about shooting corresponding to the operation on each switch of the operated portion 4. Next, the CPU 201 transmits the generated control signal from a camera head connector 203 to the camera head portion 2 through the cable 7. Then, the operation of the camera head portion 2 (including the shutter 25) is controlled at the instruction. In addition, the CPU 201 records the image data of the observed image transmitted from the image processing unit 23 of the camera head portion 2 through the cable 7 on the removable medium 35 as a record medium. When the CPU 201 performs the recording process, it transmits the image data to the memory read/write unit 36 in the memory device 34 after converting the data into a predetermined file format. In the present embodiment, assume that the data file in the removable medium 35 is managed using the FAT (file allocation table) file system of MS-DOS (registered trademark).

A symbol string ROM 63 is connected to the CPU 201. The symbol string ROM 63 stores symbol string font data such as letters, numerals, various symbols, etc. used when a symbol string such as calibration marks etc. in an image.

Furthermore, a shot image-symbol string combination unit 64 is inserted between CPU 201 and the memory read/write unit 36, and an observed image-symbol string combination unit 65 is inserted between the connection of the CPU 201 and the RAM 200. The shot image-symbol string combination unit 64 performs an image combining process of writing the above-mentioned symbol string to the observed image recorded on the removable medium 35. The observed image-symbol string combination unit 65 performs an image combining process of writing the above-mentioned symbol string to an observed image displayed on the display portion 5.

In addition, a communication unit 38 is inserted between the connection of the CPU 201 and the communication terminal 37. The communication unit 38 manages various data communications performed with the PC 100 connected through the communication cable 101 to the communication terminal 37.

Furthermore, an objective change determination unit 66 and an objective change warning LED control unit 67 are connected to the CPU 201. Described next are the objective change determination unit 66 and the objective change warning LED control unit 67.

Figure 6:
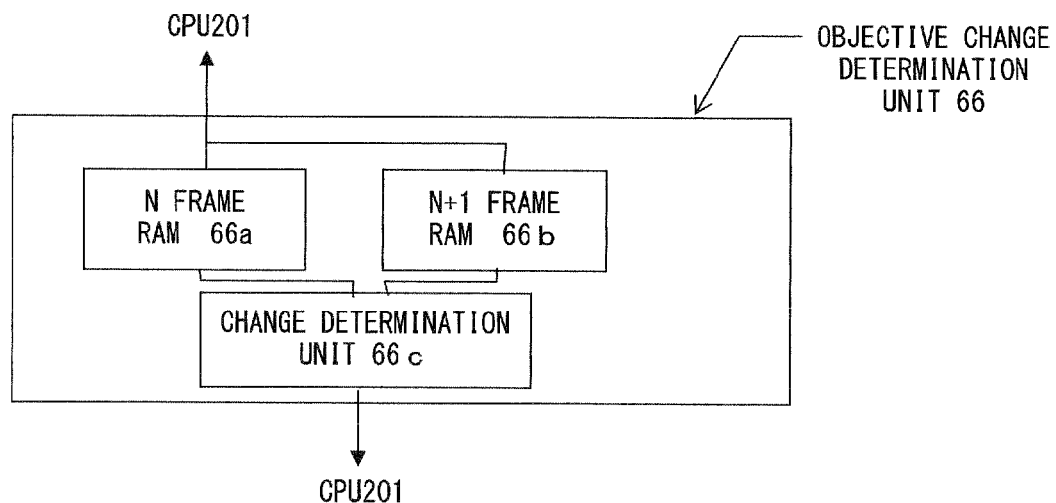
FIG. 6 shows the first example of the configuration of the objective change determination unit.

First, the configuration shown in FIG. 6 is described. FIG. 6 shows the first example of the configuration of the objective change determination unit 66.

The objective change determination unit 66 shown in FIG. 6 is a detection unit for detecting a change of an observed image, and includes an N frame RAM 66a, an N+1 frame RAM 66b, and a change determination unit 66c.

The N frame RAM 66a and the N+1 frame RAM 66b alternately store a frame of (image data of) observed image acquired by the microscope body 1.

The change determination unit 66c compares the observed image stored in the N frame RAM 66a with the observed image stored in the N+1 frame RAM 66b, and determines whether or not there is a difference between the images. If it is determined that there is no difference between the images (that is, there is no change between the images), the objective change determination unit 66 notifies the CPU 201 of flag information indicating "being observed" as a determination result. On the other hand, if it is determined that there is a difference between the images (that is, there is a change between the images), the objective change determination unit 66 notifies the CPU 201 of the flag information indicating "objective being changed" as a determination result.

In the present embodiment, the objective change determination unit 66 detects a change of an observed image by determining whether or not the intensity of an observed image acquired at a given time has been outstandingly changed from an image acquired immediately before.

Assume that an observed image at a given time is stored in the N frame RAM 66a, and the image in the next frame is stored in the N+1 frame RAM 66b. At this time, the objective change determination unit 66 can determine that (the average value of) the image intensity value of the N+1 frame RAM 66b is smaller than (the average value of) the image intensity value of the N frame RAM 66a by a predetermined value or more. In this case, it is determined that the observed image has changed into an optical cutoff state, and notifies the CPU 201 of the flag information indicating "objective being changed".

For example, assume that the maximum intensity value (intensity value in the brightest state) of each pixel of the observed image is "255", and the minimum intensity value (intensity value in the darkest state) is "0". At this time, (the average value of) the image intensity value of the N+1 frame RAM 66b of the image of the next frame can be smaller than (the average value of) the image intensity value of the N frame RAM 66a by a predetermined value or more. In this case, the change determination unit 66c notifies the CPU 201 of the flag information indicating "objective being changed".

The objective change warning LED control unit 67 controls the drive of the objective change warning LED 72. If the detection result of a change of the observed image, that is, the flag information received from the objective change determination unit 66, is "being observed", the CPU 201 instructs the objective change warning LED control unit 67 to turn off the objective change warning LED 72. If the flag information is "objective being changed", the CPU 201 instructs the objective change warning LED control unit 67 to turn on the objective change warning LED 72 (for example, a red lamp is turned on).

Described below is the configuration shown in FIG. 7. FIG. 7 shows the configuration of the display portion 5 in the operation display unit 6.

The display portion 5 is an observed image display unit for displaying an observed image acquired by the microscope body 1. The display portion 5 is provided with an Image display panel 41, an information display panel 42, and a D/A converter 24.

The image display panel 41 displays an observed image acquired by the microscope body 1, and reproduces and displays an observed image stored as image data in the memory device 34.

The information display panel 42 displays shooting information about an exposure time, an amount of exposure correction, etc. for a shooting operation by the information display panel 42 and the digital camera 3 for a microscope, and reproduction information such as an image file etc. to be reproduced during reproduction and display.

The D/A (digital to analog) converter 24 converts a digital image data signal into an analog signal to display the digital image data stored in the RAM 200 for display on the image display panel 41.

Described next is the operation of the digital camera 3 for a microscope with the above-mentioned configuration.

The image forming lens 55 forms a sample image (observed image) of the sample 50 acquired by the microscope body 1 on the photoreception surface of the image pickup device 20. The image pickup device 20 converts the observed image into an electric signal. The electric signal showing the observed image is space sampled and time sampled by the sampling circuit 21, and then converted into digital data by the A/D converter 22. The image processing unit 23 performs predetermined image processing on the digital data, thereby generating digital image data of the sample 50 from which the original observed image can be reproduced. The generated digital image data is transmitted to the CPU 201 of the operation display unit 6 through the cable 7.

The CPU 201 stores the digital image data transmitted from the camera head portion 2 in the RAM 200 for display. The stored digital image data signal is then read and transmitted to the display portion 5, converted into an analog signal by the D/A converter 24, and input to the image display panel 41. Then, the image display panel 41 displays an observed image.

Thus, moving pictures can be displayed by continuously performing the above-mentioned display operation of the observed image (updating the display image at a rate of 10 to 30 frames per second) In the following descriptions, the observed image of the moving pictures displayed on the display portion 5 is hereinafter referred to as a "live image". Each observed image configuring the live image is not recorded on the removable medium 35 unless an observer issues an instruction (to press the EXPOSE SW 31).

When an observed image is displayed on the image display panel 41, it is necessary that at least the "shooting mode" and the "reproduction mode" are selected by the mode SW 32. When the "shooting mode" is selected, one of the at least two operation states of the "live image state" and the "shooting state (REC VIEW)" is set for the camera head portion 2.

When the "shooting mode" is selected by the mode SW 32, and the camera head portion 2 is placed in the "live image state", the camera head portion 2 captures a live image of the sample 50 in real time, and the image display panel 41 displays the live image.

On the other hand, when the mode SW 32 selects the "shooting mode", and the camera head portion 2 is placed in the "live image state", the shutter 25 is opened and closed depending on the appropriate exposure time when an observer presses the EXPOSE SW 31, and the camera head portion 2 shoots an observed image (a microscope photo as a still image) of the sample 50.

The shot image obtained at this time replaces the live image and is displayed on the image display panel 41. The information about the shooting condition etc. in the shooting process is displayed on the information display panel 42. Furthermore, the digital image data indicating the obtained shot image is recorded on the removable medium 35 in the memory device 34 and the shot image is stored.

The display of the observed image (still image) on the image display panel 41 in the "shooting state (REC VIEW)" is erased after a lapse of a predetermined time, and the display of a live image is resumed. The predetermined time can be, for example, the time required until a shot image is recorded and stored, and can be the time 10 seconds after the observer has pressed the EXPOSE SW 31.

When the setting of the "display of scale" is "ON" for the digital camera 3 for a microscope, digital image data is generated by writing a desired symbol string indicating a scale (in the form of a calibrated ruler) on the shot image.

That is, when the CPU 201 detects a pressing operation on the EXPOSE SW 31, it controls the shot image-symbol string combination unit 64 to perform the image combining process. The image combining process is to add the data selected by the observer from the symbol string data stored in the symbol string ROM 63 to the digital image data transmitted from the camera head portion 2. Thus, the symbol string relating to the selection is overlaid to the lower right of the shot image expressed by the digital image data. Then, the digital image data after the image combining process is stored on the removable medium 35 by the memory device 34.

At this time, the CPU 201 also controls the observed image-symbol string combination unit 65 to perform the image combining process of adding the data selected by the observer in the symbol string data stored in the symbol string ROM 63 to the digital image data transmitted from the camera head portion 2. The digital image data after the image combining process is stored in the RAM 200 for display. Thus, the scale is also superimposed on the live image displayed on the image display panel 41.

When the setting of "display of scale" is "OFF", a desired symbol string indicating a scale is not overlaid on the shot image recorded on the removable medium 35 or the live image displayed on the image display panel 41.

The value (scale calibration) of the unit length of the scale combined on an observed image or a live image depends on the total magnification (display magnification of an observed image) of the entire microscope system shown in FIG. 1 that is determined by the magnification (observation magnification) of the microscope body 1 and the magnification of the digital camera 3 for a microscope. The method of calculating the scale calibration is described below.

First, assume that the total magnification is N, the rate of the scale width to the observation view is Srate, and the scale calibration Sval is calculated as follows.

$$Sval = Srate / N \times n$$

where n indicates the size of the observation view.

The obtained scale lines for the scale width rate Srate are overlaid on the image, and the value indicate by Sval is superimposed as the scale calibration.

FIG. 8 shows an example of a live image with a scale superimposed.

The image shown in FIG. 8 includes the display of "10 um" as the scale calibration, and indicates that one marking of the scale lines in the ruler form on the image corresponds to 10 micrometer in the sample image displayed in the image. That is, the display shows the relationship between the sample 50 and the image of the sample 50 displayed in the observed image. Therefore, the actual length of the observed portion in the image can be easily known.

The above-mentioned total magnification N is calculated as follows.

$$N = Nm \times Nc$$

where Nm indicates the magnification (observation magnification) of the microscope body 1, and Nc indicates the magnification of the digital camera 3 for a microscope.

An observer uses the digital camera 3 for a microscope to specify the value of the total magnification N. Upon receipt of the specification of the value of the total magnification N, the CPU 201 calculates the scale calibration and the scale lines of the appropriate (rounded) unit length depending on the value, and performs a process of combining them with the image. With the above-mentioned configuration, even the microscope body 1 not having the function of informing of the observation magnification Nm can record and display an observed image with the display of a scale overlaid using the digital camera 3 for a microscope shown in FIG. 1.

However, in the microscope observation, an observer normally frequently changes the magnifications of the observation magnification Nm of the microscope body 1, especially the magnification of the objective lens 52. Therefore, to correspond with the change of the total magnification N with the change of the observation magnification Nm, the digital camera 3 for a microscope is configured so that the CPU 201 can perform the process of predetermining the values of plural types of total magnifications N and storing the information in nonvolatile memory not shown in the attached drawings. When the observer switches the objective lens 52 to change the observation magnification Nm, the observer issues an instruction to select a desired magnification selected from a list of the total magnifications N stored in advance to the digital camera 3 for a microscope. Upon receipt of the instruction, the CPU 201 calculates the scale calibration and the scale lines on the basis of the selected total magnification N and performs the process of combining the results with the image. With the configuration, although there occurs a change of the total magnification N of the microscope body 1 by a change etc. of the objective lens 52, a write of the display of a scale to the image can be easily performed at a correct total magnification N.

Figure 9:
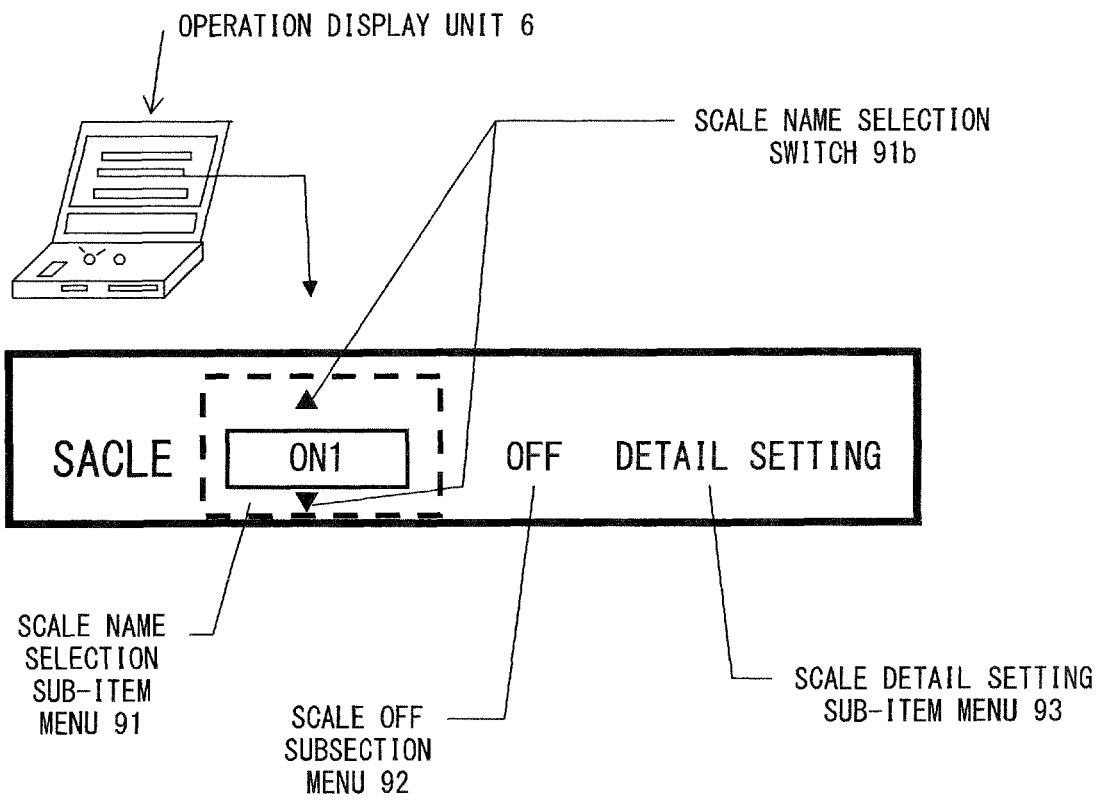
FIG. 9 shows an example of a screen (1) for setting the display of a scale.

Described below are the configurations shown in FIGS. 9 and 10. FIGS. 9 and 10 show examples of scale display setting screens. These setting screens are displayed in the display portion 5 of the operation display unit 6.

If an observer performs a predetermined operation on the operated portion 4 of the operation display unit 6 to call the scale display setting screen when an observed image or a live image is displayed in the display portion 5, then the setting screen shown in FIG. 9 is displayed on the display portion 5.

If an observer performs a predetermined operation on the operated portion 4 when the setting screen shown in FIG. 9 is displayed, then one of a scale name selection sub-item MENU 91, a scale OFF subsection MENU 92, and a scale detail setting sub-item MENU 93 is selected.

FIG. 9 shows according to the rectangle indicated by broken lines that the scale name selection sub-item MENU 91 has been selected. When the scale name selection sub-item MENU 91 is selected, the display of a scale is written to the image. When the scale OFF subsection MENU 92 is selected, the display of a scale is not written to the image.

In the scale name selection sub-item MENU 91, the name (scale name) corresponding to the predetermined total magnification N is selected. In this example, seven types of scale names, that is, "ON1", "ON2", "ON3", "ON4", "ON5", "ON6", and "TEMP" are defined in advance, and the scale name selection sub-item MENU 91 selects one of them. The screen shown in FIG. 9 shows the state in which the scale name "ON1" is selected.

If an observer performs a pressing operation on the left selection SW 61 or the right selection SW 62 of the operated portion 4, then the selection of the scale name is switched. The right selection SW 62 corresponds to the downward of a scale name selection switch 91b shown in FIG. 9, and the selection of the scale name is switched in the order of "ON1", "ON2", "ON3", . . . each time the pressing operation is performed. On the other hand, the left selection SW 61 corresponds to the upward of the scale name selection switch 92b shown in FIG. 9, and the selection of the scale name is switched in the order of "ON1", "TEMP", "ON6", . . . each time the pressing operation is performed.

In the meanwhile, on the setting screen shown in FIG. 9, when the scale detail setting sub-item MENU 93 is selected, the setting screen shown in FIG. 10 is displayed on the display portion 5. The setting screen shown in FIG. 10 is to set the details of the display of a scale.

A scale detail setting item 94 shown on the setting screen shown in FIG. 10 has a scale name shown in the scale name selection sub-item MENU 91, and an input column of the total magnification N corresponding to the scale name. In the screen example shown in FIG. 10, the setting for associating the scale name "ON1" with "100.00" as the total magnification N.

As described above, since seven types of scale names are predetermined, an observer can store the seven types of total magnifications (in the nonvolatile memory not shown in the attached drawings) in the CPU 201. Among the seven types, the six types of scale names from "ON1" to "ON6" are held until the observer sets again the corresponding total magnification regardless of the power supply state. Therefore, the observer sets the total magnification N corresponding to each of the six frequently used objective lenses 52 attached to the revolver 53 for each scale name of "ON1" to "ON6". With the configuration, when the objective lens 52 is switched by rotating the revolver 53, the display of a scale to be overlaid on an observed image can be quickly changed into appropriate display only by selecting the scale name corresponding to the objective lens 52 after the switch in the scale name selection sub-item MENU 91 on the setting screen shown in FIG. 9.

On the other hand, relating to the scale name "TEMP", when the power supply of the digital camera 3 for a microscope is turned off (OFF), the information about the corresponding total magnification is configured to be lost. Therefore, the scale name "TEMP" can be used when an exceptional microscope observation is performed at the total magnification N different from the magnification corresponding to each of the scale names from "ON1" to "ON6". With the configuration, the trouble of temporarily changing (and returning to the original setting) the settings for correspondence between each of the normally used scale names from "ON1" to "ON6" and the total magnification N can be solved.

When an observed image is shot when the scale name selection sub-item MENU 91 is selected on the setting screen shown in FIG. 9, the data file of the shot image with the display of a scale overlaid is recorded on the removable medium 35.

The operations described above are the operations in the "shooting mode".

Described next is the operation in the "reproduction mode" of the digital camera 3 for a microscope.

If an observer selects the "reproduction mode" by switching the mode SW 32 of the operated portion 4 in the operation display unit 6, then the CPU 201 first controls the memory read/write unit 36 of the memory device 34 to read the data file of the shot image recorded on the removable medium 35. Then, the shot image about the read data file is displayed on the image display panel 41, and the reproduced image information such as a file name etc. of the data file is displayed on the information display panel 42. If a scale display overlay process is performed while recording the data file, the display of a scale is superimposed on an image displayed on the image display panel 41.

When an observer performs the pressing operation on the left selection SW 61 and the right selection SW 62 of the operated portion 4 in the above-mentioned state, the CPU 201 first performs a process of reading a data file about another shot image recorded on the removable medium 35. Then, after the reading process, a process of displaying the shot image about the read data file on the image display panel 41, and a process of displaying reproduced image information such as the file name etc. of the data file on the information display panel 42 are sequentially performed.

Described next is the operation in the "PC mode" of the digital camera 3 for a microscope.

If an observer selects the "PC mode" by switching the mode SW 32 of the operated portion 4 in the operation display unit 6, then the operation of the digital camera 3 for a microscope that can be performed in the "shooting mode" and the "reproduction mode" is controlled by the PC 100. In the "PC mode", the image stored on the removable medium 35 in the memory device 34 can be stored in the memory device of the PC 100, or displayed on the display device of the PC 100. Furthermore, the display contents in the display portion 5 can also be displayed on the display device in the "PC mode". It is obvious if a scale display overlay process is performed on the image stored on the removable medium 35, then the display of a scale is superimposed on the image displayed on the display device.

Although the removable medium 35 is removed from the memory device 34 of the digital camera 3 for a microscope, and the image recorded thereon is read and displayed by another PC, the display of a scale can be superimposed on the image displayed on the PC if the scale display overlay process is performed on the image stored on the removable medium 35.

The flow of the operation of the process performed by the digital camera 3 for a microscope according to the present embodiment is described below with reference to the flowchart shown in FIG. 11.

Figure 11:
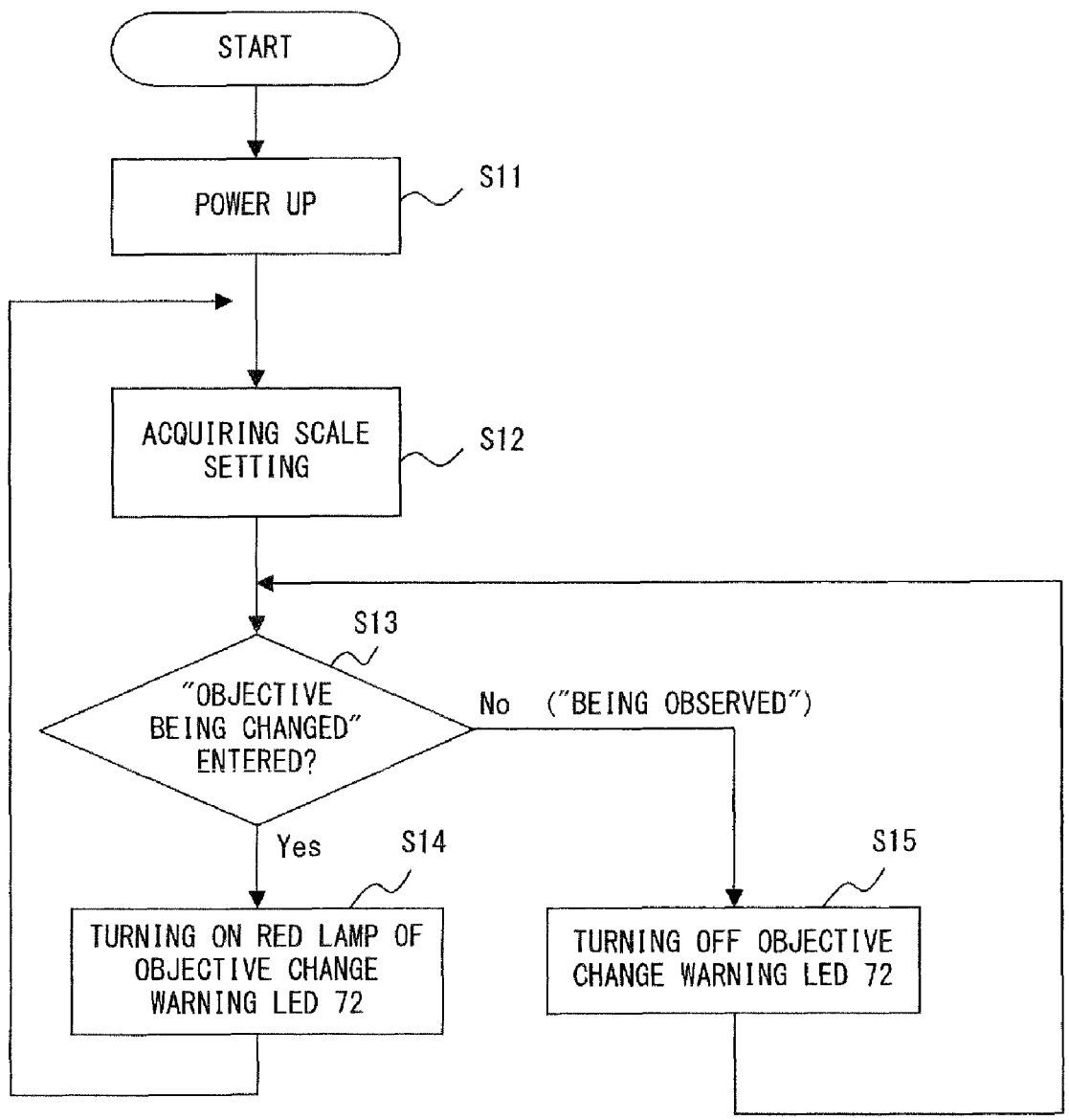
FIG. 11 is a flowchart showing the flow of the processing operation of the digital camera for a microscope according to the embodiment 1.

In FIG. 11, first in step S11, an observer turns on the power source SW 60 of the operated portion 4 in the operation display unit 6, electric power is supplied to each component of the digital camera 3 for a microscope as necessary. When the supply of the electric power is started, the CPU 201 reads a predetermined control program from the ROM, and starts executing the program to perform a predetermined initializing process. The initializing process includes a process of starting the display of an image acquired from the microscope body 1 on the display portion 5 of the operation display unit 6, and a process of controlling the objective change warning LED control unit 67 to turn off the objective change warning LED 72.

Next, in step S12, the scale display setting process for displaying the scale display setting screen exemplified in FIGS. 9 and 10 on the display portion 5 to allow an observer to set each scale name with the total magnification N, and for storing the setting result on the nonvolatile memory not shown in the attached drawings is performed by the CPU 201.

When the setting of the display of a scale is completed, control is passed to step S13, and the CPU 201 acquires flag information about the determination result notified by the objective change determination unit 66 that detects a change of an observed image, and determines whether or not the flag information indicates "objective being changed". If it determines that the acquired flag information indicates "objective being changed" (when the determination result is YES), control is passed to step S14. On the other hand, if the CPU 201 determines that the acquired flag information indicates "being observed" (when the determination result is NO), control is passed to step S15.

In step S14, the CPU 201 issues an instruction to the objective change warning LED control unit 67 to place the objective change warning LED 72 in the turn-on state (for example, a red lamp is turned on), and then control is returned to step S13 to repeat the above-mentioned processes.

In step S15, the CPU 201 issues an instruction to the objective change warning LED control unit 67 to turn off the objective change warning LED 72, and then control is returned to step S13 to repeat the above-mentioned processes.

Thus, when the objective change warning LED 72 is turned on or off, the objective change determination unit 66 outputs the notification information indicating the detection result about a change of an observed image. That is, the objective change warning LED 72 is turned on when the objective lens 52 of the microscope body 1 is switched. Therefore, by recognizing that the 72 has been turned on, an observer can issue a change instruction for setting the display of a scale on the digital camera 3 for a microscope without fail that is to be synchronously performed in switching the objective lens 52.

A change of an observed image by the objective change determination unit 66 is detected (determination of "being observed" and "objective being changed" on the basis of an observed image) as follows.

First, the CPU 201 sequentially copies (replicates) the image data of a live image transmitted from the camera head portion 2, and alternately stores the N frame RAM 66a and the N+1 frame RAM 66b frame by frame. The N frame RAM 66a and the N+1 frame RAM 66b can have a capacity of a 1-frame image. That is, when a subsequent frame is newly stored, the image of the stored preceding frame is overwritten and lost.

The change determination unit 66c compares the intensity of the images stored in the N frame RAM 66a and the N+1 frame RAM 66b. The comparison is performed by calculating the difference between the average intensity of the pixels configuring the respective images. For example, assume that the average intensity of the images of the N frame RAM 66a is Nave, and the average intensity of the images of the N+1 frame RAM 66b is N+1ave. The determination is made on the basis of the value d calculated by the following equation.

$$|(Nave)-(N+1ave)|=d$$

If the value of D is larger than a predetermined value, that is, if the possible range of the intensity is 0 to 255, and if d is larger than 100 (d>100), the change determination unit 66c of the objective change determination unit 66 determines that the objective lens 52 has been switched by the rotating operation of the revolver 53, and outputs "objective being changed" as flag information. If the value of d is equal to or less than the threshold, that is, for example, d≦100, the change determination unit 66c outputs "being observed" as flag information.

During the rotating operation of the revolver 53, all objective lenses 52 deviate from the optical path and the cutoff portion of the 53 is on the optical path. Therefore, a live image becomes an optical cutoff image. The optical cutoff image is quite different in intensity from the observed image immediately before the optical cutoff image. Therefore, if d>10 for the value d indicating the difference in intensity of the images stored in the N frame RAM 66a and the N+1 frame RAM 66b, then the objective change determination unit 66 assumes that there is an outstanding difference between the intensity of them, and determines "objective being changed".

That is, when the objective lens 52 of the microscope body 1 is switched by the rotating operation of the revolver 53, the cutoff structure of the revolver 53 occurring for some time on the optical path is acquired as a optical cutoff image by the camera head portion 2. When the change of the optical cutoff image is detected by the objective change determination unit 66 and objective change determination unit 66 determines "objective being changed" as a determination result, the objective change warning LED 72 is turned on (red). By an observer recognizing that the objective change warning LED 72 has been turned on, it recognizes again that the objective lens 52 of the microscope body 1 has been switched.

Since the digital camera 3 for a microscope according to the present embodiment operates as described above, the digital camera 3 for a microscope can recognize the setting state and the setting change of the microscope body 1 although there is no electric communication means between the microscope body 1 and the digital camera 3 for a microscope. Therefore, the system configuration of the microscope system can be easily realized, and especially since the digital camera 3 for a microscope can grasp a change of the setting of the microscope body 1 without an electric microscope body 1, the system cost of the microscope system can be reduced.

In addition, according to the digital camera 3 for a microscope of the present embodiment, an observer can grasp the setting state or the setting change of the microscope body 1 while concentrating on the operation of a camera or a live observation. Therefore, the operability can be improved.

Furthermore, according to the digital camera 3 for a microscope of the present embodiment, when a setting change of the display of a scale is to be made by switching the objective lens 52 of the microscope body 1, the objective change warning LED 72 raises warning display to urge a setting change of the display of a scale. Therefore, an operation for a setting change of the display of a scale on a camera can be performed without fail or error.

In the present embodiment described above, the objective change determination unit 66 detects a change of an observed image on the basis of a change of the average intensity of an observed image of two consecutive frames in a live image. Instead, by comparing the average intensity of an image of one frame with a predetermined threshold, a change of an observed image can be detected.

Figure 12:
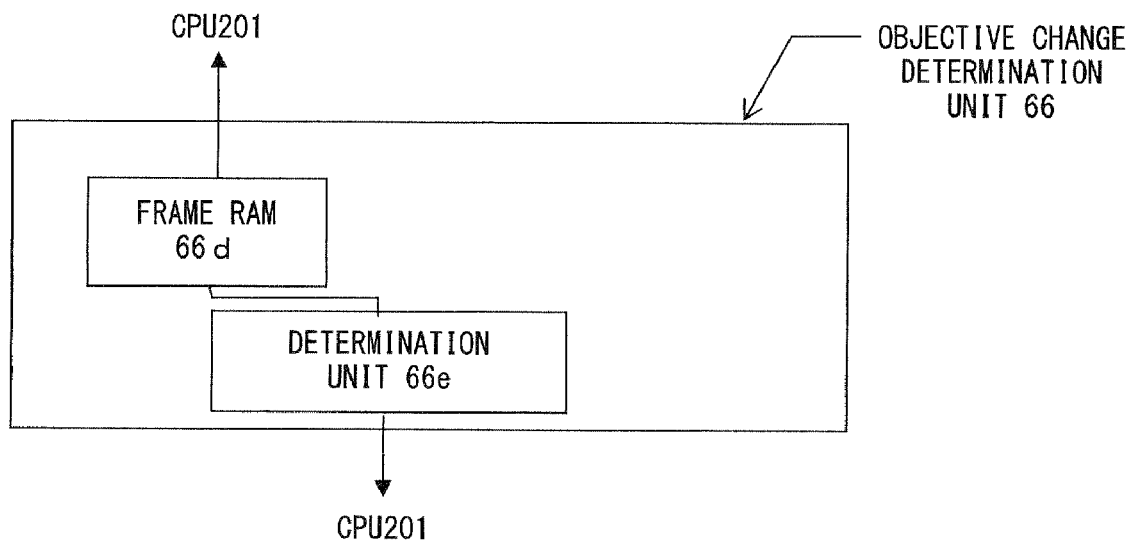
FIG. 12 shows the second example of the configuration of the objective change determination unit.

Described below is the configuration shown in FIG. 12. FIG. 12 shows the second example of the configuration of the objective change determination unit 66.

The objective change determination unit 66 shown in FIG. 12 is a detection unit for detecting a change of an observed image, and includes a frame RAM 66d and a determination unit 66e.

The frame RAM 66d stores (the image data of) an observed image acquired by the microscope body 1.

The determination unit 66e calculates the average intensity Nave of an image stored in the frame RAM 66d. When the value of Nave is smaller than a predetermined threshold, that is, when the possible range of the value of the intensity is 0 to 255, and if Nave<10, then the determination unit 66e of the objective change determination unit 66 determines that the objective lens 52 has been switched by the rotating operation of the revolver 53, and outputs "objective being changed" as flag information. On the other hand, when the value of Nave is not smaller than the threshold, that is, for example, Nave≧10, then the determination unit 66e outputs "being observed" as flag information.

As described above, during the rotating operation of the revolver 53, all objective lenses 52 deviate from the optical path and the cutoff portion of the 53 is on the optical path. Therefore, a live image becomes an optical cutoff image. The determination unit 66e is to directly detect the optical cutoff image on the basis of the average intensity Nave of an image.

An ideal optical cutoff image is to have the intensity of "0". However, actually by the influence of noise, leakage of light, etc., a optical cutoff image can frequently have the value of Nave other than "0". Considering this situation, the determination unit 66e determine whether or not Nave<10 as the determination condition in detecting a change of an observed image.

When the digital camera 3 for a microscope is configured using the objective change determination unit 66 shown in FIG. 12, only one frame RAM is required to store an observed image. Therefore, the reduction of a cost and a smaller space for mounting parts can be further realized.

In the present embodiment, the objective change warning LED 72 displays a warning to urge a setting change of display of a scale. Instead, the warning can be displayed on the image display panel 41 of the display portion 5 in the operation display unit 6.

Figure 13:
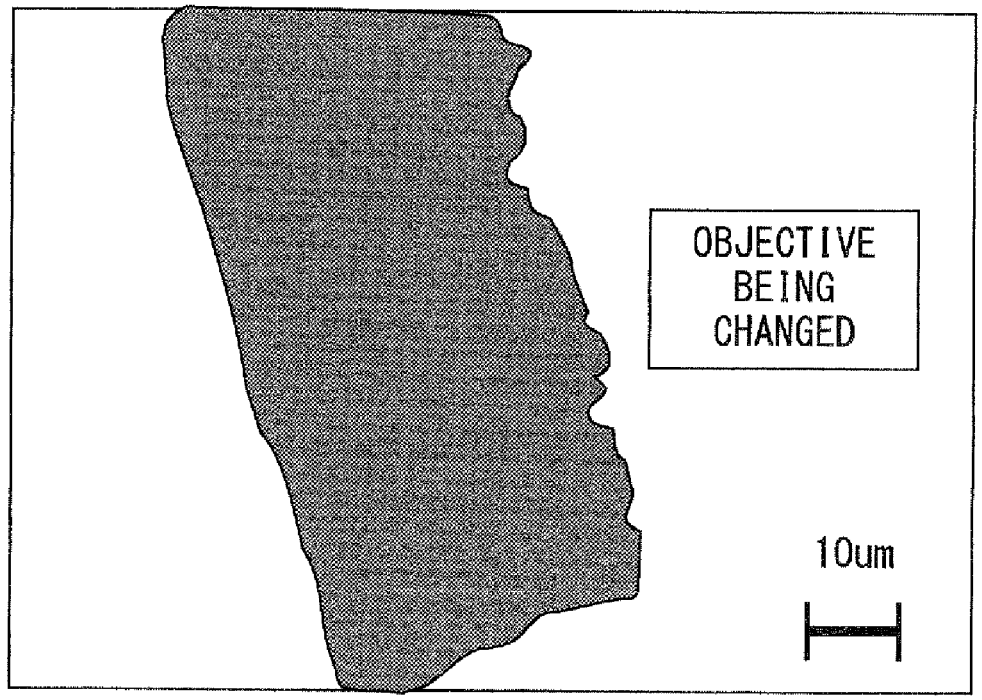
FIG. 13 shows an example of the live image in which a warning character string is superposed and displayed.

That is, in step S5 shown in FIG. 11, the CPU 201 instructing the objective change warning LED control unit 67 to turn on the objective change warning LED 72 can be replaced with the CPU 201 controlling the observed image-symbol string combination unit 65 to perform an image combining process. The image combining process is to add a character string indicating "objective being changed" in the symbol string data stored in the symbol string ROM 63 to the digital image data transmitted from the camera head portion 2. Then, the digital image data after the image combining process is stored in the RAM 200 for display. Thus, as shown in FIG. 13, a character string "objective being changed" is superimposed on the image displayed on the image display panel 41.

Thus, when a warning is displayed on the image display panel 41 in the configuration of the digital camera 3 for a microscope, the objective change warning LED 72 can be deleted. Therefore, the reduction of a cost and a smaller space for mounting parts can be further realized. Furthermore, when an observer regards the image display panel 41 for observation, a warning of a setting change of the display of a scale for a switch of the objective lens 52 is rarely overlooked.

In addition, the digital camera 3 for a microscope shown in FIG. 1 is provided with the shot image-symbol string combination unit 64 included in the operated portion 4 of the operation display unit 6, the observed image-symbol string combination unit 65, and the objective change determination unit 66 separately in addition to the CPU 201. Instead, all or a part of the functions of the components can be provided by the CPU 201. For this configuration, a control program for directing the central calculation unit of the CPU 201 to perform the control process for realizing these functions is generated and stored in the ROM in advance, and the central calculation unit can read the control program from the ROM for execution.

Embodiment 2

In the digital camera 3 for a microscope according to the present embodiment, the configuration of the objective change determination unit 66 as a detection unit of the embodiment 1 is changed, an observed image is temporarily changed into an optical cutoff state, and then the recovery from the optical cutoff state is detected.

In the descriptions of the present embodiment, the descriptions also made in the embodiment 1 are partly omitted.

Figure 14:
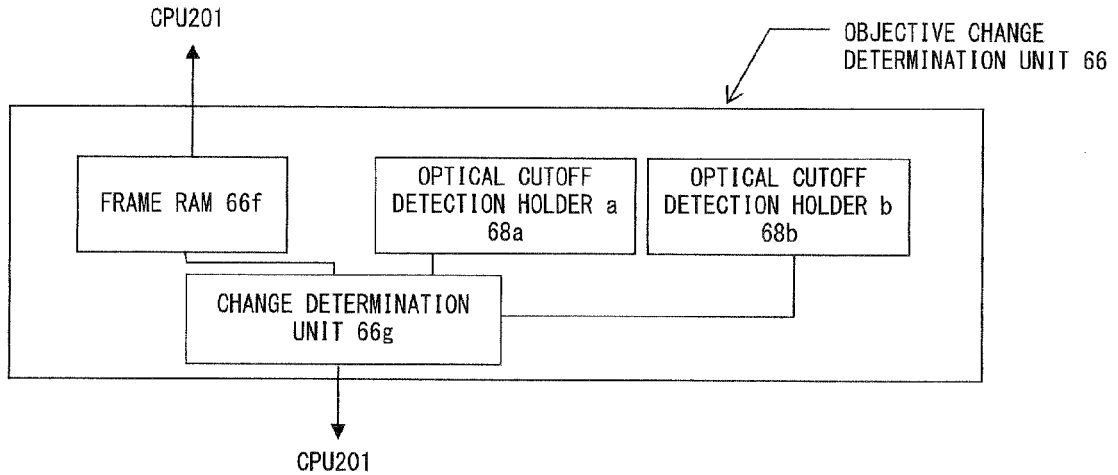
FIG. 14 shows the third example of the configuration of the objective change determination unit.

The configuration shown in FIG. 14 is described below. FIG. 14 shows the third example of the configuration of the objective change determination unit 66.

A change determination unit 66g of the objective change determination unit 66 shown in FIG. 14 determines "objective being changed" only when the optical cutoff state is changed into the observation state in which the objective lens 52 is arranged on the optical path after the observation state is temporarily changed into the optical cutoff state by the rotation of the revolver 53.

A frame RAM 66f stores the image data of an observed image as a live image transmitted from the camera head portion 2 after the image data is copied (replicated) by the CPU 201 frame by frame.

The change determination unit 66g calculates the average intensity Nave of an image stored in the frame RAM, 66f, and then compares Nave with a predetermined threshold like the determination unit 66e shown in FIG. 12, thereby determining whether or not there has occurred the optical cutoff state in the observed image.

The optical cutoff detection holder a68a and the optical cutoff detection holder b68b alternately holds each frame of the state information (about "during optical cutoff" or "no optical cutoff") indicating the determination result about the observed image by the change determination unit 66g. The optical cutoff detection holder a68a and the optical cutoff detection holder b68b are to hold the state information while the power is supplied to each component of the digital camera 3 for a microscope (that is, while the power source SW 60 is turned on).

For example, assume that the optical cutoff detection holder a68a of the change determination unit 66g holds the state information depending on the Nave_t as a Nave value about the observed image in the Nt-th frame in the live image. At this time, the optical cutoff detection holder b68b of the change determination unit 66g holds the state information depending on the Nave_t+1 as a Nave value about the observed image in the next Nt+1-th frame. Thus, the change determination unit 66g alternately allows the optical cut off detection holder a68a and the optical cutoff detection holder b68*b* to hold the state information depending on the Nave value relating to the observed image of each frame configuring a live image.

Next, the flow of the operation of the process performed by the objective change determination unit 66 according to the present embodiment is described below with reference to the flowchart shown in FIG. 15.

In the present embodiment, it is assumed that the possible range of the intensity of an observed image is 0 to 255.

The processes in steps S21 and S22 shown in FIG. 15 are performed depending on the operation in step S11 in the flow of the operations of the digital camera 3 for a microscope shown in FIG. 11. That is, first, in step S21, an observer performs an operation of turning on the power source SW 60 of the operated portion 4 in the operation display unit 6. Then, the supply of electric power to each component of the digital camera 3 for a microscope is started as necessary, and the operation of the change determination unit 66*g* is started correspondingly. In the next step S22, the change determination unit 66*g* initializes the optical cutoff detection holder a68*a* and the optical cutoff detection holder b68*b*. In this initializing process, the state information indicating "during optical cutoff" is set for both optical cutoff detection holder a68*a* and optical cutoff detection holder b68*b*.

The processes from steps S23 after step S22 to step S30 are to detect a change of an observed image. The CPU 201 performs a determining process in step S13 in FIG. 11 according to the flag information given as a result of the process.

First, in step S23, the change determination unit 66*g* reads the image data stored by the CPU 201 in the frame RAM 66*f*, and calculates the average intensity Nave of an observed image represented by the image data.

Then, in step S24, the change determination unit 66*g* determines whether or not the average intensity Nave calculated in the process in step S23 is equal to or exceeds a predetermined threshold ("10" in this example). If it determines that the average intensity Nave is equal to or exceeds the threshold (YES as a result of the determination), control is passed to step S27. If it determines that the average intensity Nave is less than the threshold (NO as a result of the determination), control is passed to step S25.

In step S25, since the average intensity Nave is less than the threshold, the change determination unit 66*g* holds the state information currently stored in the optical cutoff detection holder a68*a* and the optical cutoff detection holder b68*b* as the state information indicating "during optical cutoff". The objective change determination unit 66 according to the present embodiment passes control to the process in step S26 after step S25 because it does not determine that an observed image has been changed only by detecting the temporary change of the observed image to the optical cutoff state.

In step S26, the change determination unit 66*g* outputs the flag information indicating "being observed" as a determination result of the objective change determination unit 66 and notifies the CPU 201 of the information. Then, it returns control to step S23, and repeats the above-mentioned processes.

In step S27, since the average intensity Nave is equal to or exceeds the threshold, the change determination unit 66*g* refers to the state information held in the optical cutoff detection holder a68*a* and the optical cutoff detection holder b68*b*, and determines whether or not the second previous state information refers to "no optical cutoff", and the previous state information refers to "during optical cutoff". The "second previous state information" refers to the image data in the second previous frame read from the frame RAM 66*f* in step S23. The "previous state information" refers to the image data in the previous frame read from frame RAM 66*f* in step S23.

If it is determined in the determining process in step S27 that the second previous state information refers to "no optical cutoff", and the previous state information refers to "during optical cutoff" (YES as a result of determination), control is passed to step S28. On the other hand, when any other determination result is output (NO as a result of determination), control is passed to step S30.

In the above-mentioned process, it is determined that the conditions imposed by the objective change determination unit 66 according to the present embodiment to determine that an observed image has changed has been satisfied. Then, in step S28, the change determination unit 66*g* initializes the optical cutoff detection holder a68*a* and the optical cutoff detection holder b68*b* (sets the state information indicating "no optical cutoff" for both holders). In the subsequent step S29, the change determination unit 66*g* outputs the flag information indicating "objective being changed" as a result of the determination of the objective change determination unit 66, and notifies the CPU 201 of the information. After the completion of the process, control is returned to step S23, and the above-mentioned process is repeated on the observed image in the next frame.

In the process above, the condition that the objective change determination unit 66 according to the present embodiment determines that the observed image has changed is not satisfied, but it is determined in the determining process in step S24 that the average intensity Nave is equal to or exceeds the threshold. Then, in step S30, the change determination unit 66*g* holds the state information currently stored in the optical cutoff detection holder a68*a* and the optical cutoff detection holder b68*b* as the state information indicating "being observed". After the process is performed, control is passed to step S26, and the change determination unit 66*g* outputs the flag information indicating "being observed" as a determination result of the objective change determination unit 66 and notifies the CPU 201 of the information. Afterwards, control is returned to step S23, and the above-mentioned process is repeated on the observed image in the next frame.

When the observed image is temporarily changed into the optical cutoff state by the objective change determination unit 66 according to the present embodiment performing the above-mentioned operation process, and is recovered from the optical cutoff state, the flag information indicating "objective being changed" is transmitted from the objective change determination unit 66 to the CPU 201. Otherwise, the flag information indicating "being observed" is transmitted from the objective change determination unit 66 to the CPU 201. The CPU 201 performs the determining process in step S13 shown in FIG. 11 according to the flag information. When the flag information indicates "objective being changed", the process in step S14 is subsequently performed to turn on the objective change warning LED 72 (for example, a red lamp is turned on). On the other hand, when the flag information indicates "being observed", the process in step S15 is subsequently performed to turn off the objective change warning LED 72.

Therefore, like the switch of the objective lens 52 by the rotating operation of the revolver 53, the objective change warning LED 72 is turned on when the optical path changes in the order of "no optical cutoff"→"during optical cutoff"→"no optical cutoff". On the other hand, for example, in the optical cutoff state of the optical path not caused by the switch of the objective lens 52 by the rotating operation of the revolver 53 like when the light source of the microscope body 1 not shown in the attached drawings is turned off, the optical cutoff state continues, thereby maintaining the turn-off state of the objective change warning LED 72.

The digital camera 3 for a microscope according to the present embodiment is operated as described above. Therefore, the effect acquired according to the embodiment 1 can be obtained. Furthermore, the warning raised by turning on the objective change warning LED 72 is possibly made by the switch of the objective lens 52 by the rotating operation on the revolver 53 of the microscope body 1. Therefore, an observer can more correctly grasp the setting state and the setting change of the microscope body 1.

Embodiment 3

The digital camera 3 for a microscope according to the present embodiment changes the configuration of the objective change determination unit 66 as a detection unit in the embodiment 2 to detect that the observed image has recovered from the optical cutoff state within a predetermined time after it has temporarily changed into the optical cutoff state.

In the descriptions of the present embodiment, the descriptions also made in the embodiments 1 and 2 are partly omitted.

The configuration shown in FIG. 16 is described below. FIG. 16 shows the fourth example of the configuration of the objective change determination unit 66.

A change determination unit 66j of the objective change determination unit 66 shown in FIG. 16 determines "objective being changed" only when the optical cutoff state is changed into the observation state in which the objective lens 52 is arranged on the optical path after the observation state is temporarily changed into the optical cutoff state by the rotation of the revolver 53 within a predetermined time (2 seconds in the present embodiment). On the other hand, although the objective lens 52 temporarily changes from the observation state to the optical cutoff state, the change determination unit 66j determines "being observed" when the objective lens 52 changes into the observation state after the predetermined time.

A frame RAM 66h stores frame by frame the image data of an observed image as a live image transmitted from the camera head portion 2 and copied (replicated) by the CPU 201.

The change determination unit 66j calculates the average intensity Nave of an image stored in the frame RAM 66h, and then compares the Nave with a predetermined threshold as with the determination unit 66e shown in FIG. 12, thereby determining whether or not there has occurred the optical cutoff state on the observed image.

A no-optical-cutoff holder 68c holds the state information "no optical cutoff" when the state information indicating the determination result about the observed image by the change determination unit 66g refers to "no optical cutoff". A during-optical-cutoff holder 68d holes the state information "during optical cutoff" when the state information indicating the determination result about the observed image by the change determination unit 66g refers to "during optical cutoff". The no-optical-cutoff holder 68c and the during-optical-cutoff holder 68d have to hold the state information while the power is supplied to each component of the digital camera 3 for a microscope (that is, while the power source SW 60 is turned on).

An optical cutoff time counter 69 clears the held state information by controlling the during-optical-cutoff holder 68d a predetermined time (2 seconds in the present embodiment) after the during-optical-cutoff holder 68d starts holding the state information "during optical cutoff".

Figure 17:
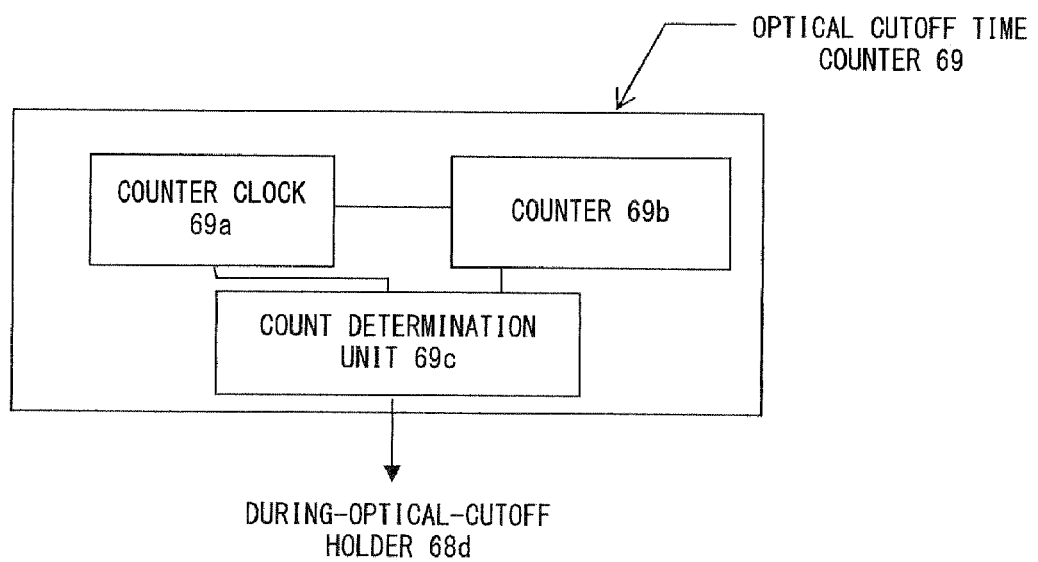
FIG. 17 shows the configuration of the cutoff time counter.

The configuration shown in FIG. 17 is described below. FIG. 17 shows the configuration of the optical cutoff time counter 69.

A counter clock 69a keeps time.

A counter 69b counts a split time (a lapse of time from a given time to another given time) by using the timekeeping result of the counter clock 69a.

A count determination unit 69c performs the controlling process of initializing the counter 69b, and clearing the state information "during optical cutoff" held by the during-optical-cutoff holder 68d.

When the during-optical-cutoff holder 68d of the change determination unit 66j holds the state information "during optical cutoff", the count determination unit 69c transfers the time of the holding process from the counter clock 69a to the counter 69b. The counter 69b records the time t and simultaneously starts monitoring the time-keeping of the counter clock 69a. When the counter clock 69a keeps a predetermined time (2 seconds in the present embodiment) after the time t, the counter 69b notifies the count determination unit 69c of the time-keeping. Upon receipt of the notification, the count determination unit 69c performs the controlling process of clearing the state information "during optical cutoff" held by the during-optical-cutoff holder 68d.

Although the change determination unit 66j performs the process of allowing the during-optical-cutoff holder 68d to hold the state information "during optical cutoff" until the lapse of predetermined time from the time t recorded by the counter 69b, the time t of the counter 69b is prevented from being overwritten. That is, if the counter 69b once records the time t, the record of the time t is suppressed until the lapse of the predetermined time from the time t. Therefore, although the change determination unit 66j reports a determination result "during optical cutoff" on the observed image sequentially written (for example, 15 to 30 frames per second) to the frame RAM 66h, the during-optical-cutoff holder 68d holds the state information "during optical cutoff" only for a predetermined time period (2 seconds) from the time t.

Next, the flow of the processing operation of the objective change determination unit 66 according to the present embodiment is described below with reference to the flowchart shown in FIG. 18.

In the present embodiment, it is assumed that the possible range of the intensity of an observed image is 0 to 255.

Figure 18:
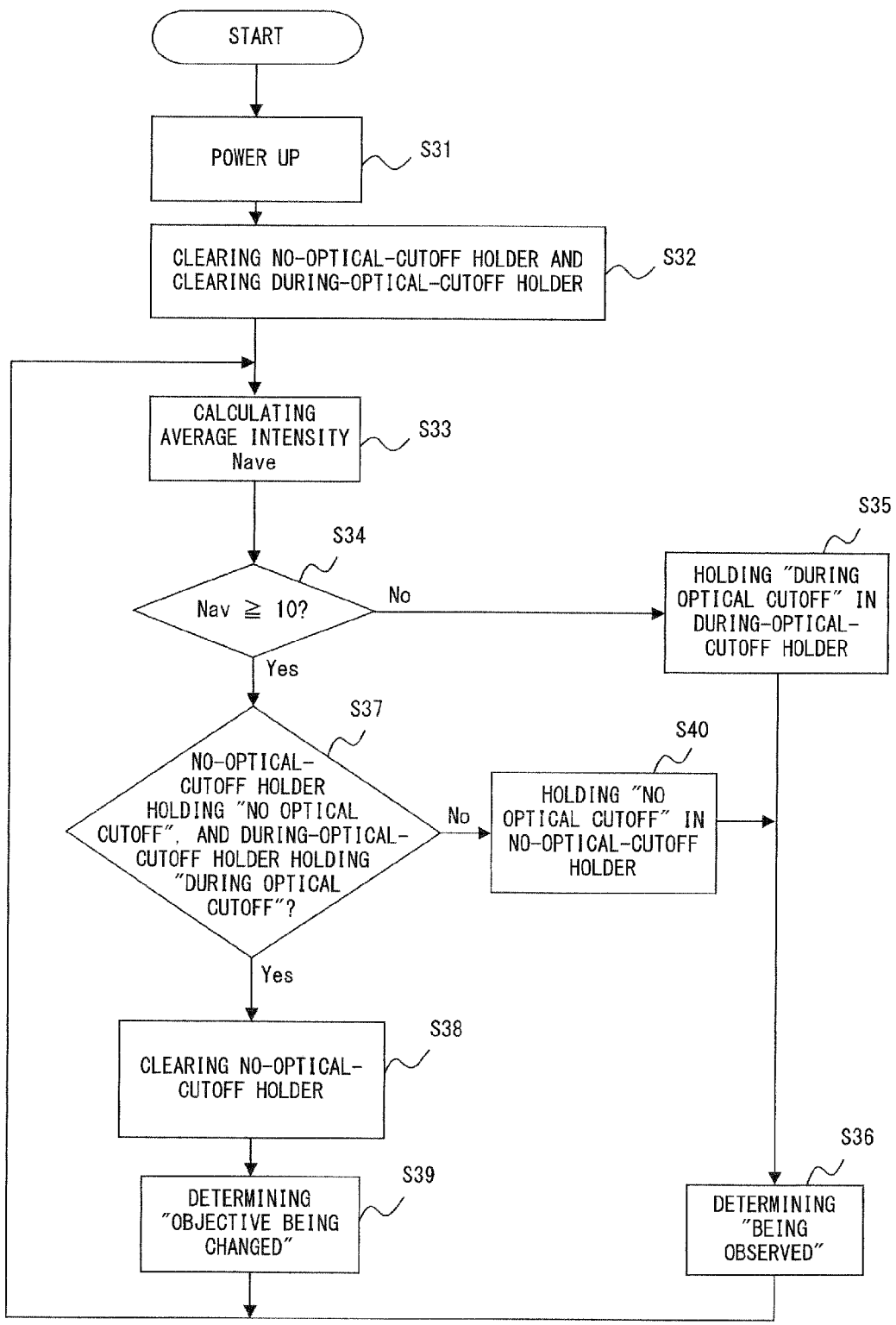
FIG. 18 is a flowchart showing the flow of the processing operation of the objective change determination unit according to the embodiment 3.

The processes in step S31 and S32 shown in FIG. 18 are performed depending on the operations shown in step S11 in the flow of the operations of the digital camera 3 for a microscope. That is, first, in step S31, an observer performs the operation of turning on the power source SW 60 by the operated portion 4 of the operation display unit 6. Then, the supply of power to each component of the digital camera 3 for a microscope is started as necessary. Correspondingly, the operations of the change determination unit 66j are started. Then, in the subsequent step S32, the change determination unit 66j initializes the no-optical-cutoff holder 68c and the during-optical-cutoff holder 68d. In the initializing process, the held contents of the no-optical-cutoff holder 68c and the during-optical-cutoff holder 68d are cleared, and they enters a state in which no state information is held.

In the processes in the subsequent steps S33 after step S32 to S40, a change of an observed image is ted. The CPU 201 performs the determining process in step S13 shown in FIG. 11 according to the flag information given as a result of the process.

First, in step S33, the change determination unit 66j performs the process of the CPU 201 reading image data stored in the frame RAM 66h, and calculating the average intensity of the observed image represented by the image data.

Next, in step S34, the change determination unit 66j determines whether or not the average intensity Nave calculated in the process in step S33 is equal to exceeds a predetermined threshold ("10" in this embodiment. If it is determined that the average intensity Nave is equal to or exceeds the threshold (the determination result is YES), then control is passed to step S37. If it is determined that the average intensity Nave is less than the threshold (the determination result is NO), then control is passed to step S35.

In step S35, since the average intensity Nave is less than the threshold, the change determination unit 66j holds the state information indicating "during optical cutoff" in the during-optical-cutoff holder 68d. Since the objective change determination unit 66 according to the present embodiment does not determine that an observed image has been changed only when it is temporarily changed into the optical cutoff state, control is passed to step S36 after step S35.

In step S36, the change determination unit 66j notifies the CPU 201 by outputting the flag information indicating "being observed" as a determination result of the objective change determination unit 66. Then, control is returned to step S33, and the above-mentioned processes are repeated on the observed image in the next frame.

Since the average intensity Nave is equal to or exceeds the threshold in step S37, the change determination unit 66j determines whether or not the no-optical-cutoff holder 68c and the during-optical-cutoff holder 68d hold the respective state information. If the change determination unit 66j determines that the no-optical-cutoff holder 68c holds the state information indicating "no optical cutoff", and the during-optical-cutoff holder 68d holds the state information indicating "during optical cutoff" (that is, a predetermined time (for example, 2 seconds) has not passed since the during-optical-cutoff holder 68d acquired the state information) (if the determination result is YES), then control is passed to step S38. On the other hand, if other determinations are reported (if the determination result is NO), control is passed to step S40.

In step S38, since the conditions that the objective change determination unit 66 according to the present embodiment determines that an observed image has changed are satisfied, the change determination unit 66j initializes the no-optical-cutoff holder 68c (the held contents are cleared and no state information is held). Then in step S39, the change determination unit 66j outputs the flag information indicating "objective being changed" as a determination result of the objective change determination unit 66, and notifies the CPU 201 of the information. After performing the process, control is returned to step S33, and the above-mentioned processes are repeated on the observed image in the next frame.

On the other hand, after the above-mentioned process, it can be determined in the determining process in step S34 that the average intensity Nave is equal to or exceeds the threshold although the conditions on which the objective change determination unit 66 according to the present embodiment determines that an observed image has been changed are not satisfied. At this time, in step S40, the change determination unit 66j holds the state information indicating "no optical cutoff" in the no-optical-cutoff holder 68c. After the process, control is passed to step S36, and the change determination unit 66j outputs the flag information indicating "being observed" as a determination result of the objective change determination unit 66, and notifies the CPU 201 of the information. Afterwards, control is returned to step S33, and the above-mentioned processes are repeated.

When the objective change determination unit 66 according to the present embodiment performs the above-mentioned operating process, an observed image is temporarily changed into the optical cutoff state. After the image is recovered from the optical cutoff state, the flag information indicating the "objective being changed" is given from the objective change determination unit 66 to the CPU 201. Otherwise, the flag information indicating the "being observed" is given from the objective change determination unit 66 to the CPU 201. The CPU 201 performs the determining process in step S13 shown in FIG. 11 based ob the flag information. If the flag information refers to "objective being changed", the process in step S14 is consecutively performed to place the objective change warning LED 72 in the turn-on state (for example, a red lamp is turned on). On the other hand, if the flag information indicates "being observed", then the process in step S15 is consecutively performed and the objective change warning LED 72 enters the turn-off process.

Therefore, like the switch of the objective lens 52 by the rotating operation of the revolver 53, the objective change warning LED 72 is turned on when the optical path changes in the order of "no optical cutoff"→"during optical cutoff"→"no optical cutoff" within the predetermined time (within about 1 second, by ordinary). On the other hand, in the optical cutoff state of the optical path not caused by the switch of the objective lens 52 by the rotating operation of the revolver 53 for a long time (exceeding the predetermined time), the optical cutoff state continues, thereby maintaining the turn-off state of the objective change warning LED 72. In this operation, for example, when there are a filter exchange mechanism, an optical cutoff mechanism, etc. for the microscope body 1 but not shown in the attached drawings, the optical cutoff for a long time caused by the operations of these mechanisms can be prevented from allowing an observer to incorrectly determining a switch of the objective lens 52.

The digital camera 3 for a microscope according to the present embodiment operates as described above. Therefore, the effect obtained by each of the embodiments 1 and 2 can also be obtained. Furthermore, since the determination accuracy of a switch of the objective lens 52 can be improved, the operability of an observer can be further improved.

Embodiment 4

In the embodiments 1 through 3 described above, the objective change warning LED 72 is used as a notification unit for outputting notification information indicating a detection result of a change of an observed image. On the other hand, the objective change warning LED 72 is deleted from the digital camera 3 for a microscope according to the embodiment 4. Instead, a list of display magnifications of an observed image (that is, the total magnification of the entire microscope system) stored in advance in (the nonvolatile memory (not shown in the attached drawings) of) the CPU 201 is displayed on the display portion 5 of the operation display unit 6, thereby detecting a change of the observed image.

When an observer selects the display magnification of the observed image after the change of the observation state from the list of display magnifications, the digital camera 3 for a microscope according to the present embodiment overlays the display of a scale (scale calibration and scale lines) based on the selected display magnification on the observed image and displays or records them.

In the descriptions of the present embodiment, the descriptions also made in any of the embodiments 1 through 3 are partly omitted.

Figure 19:
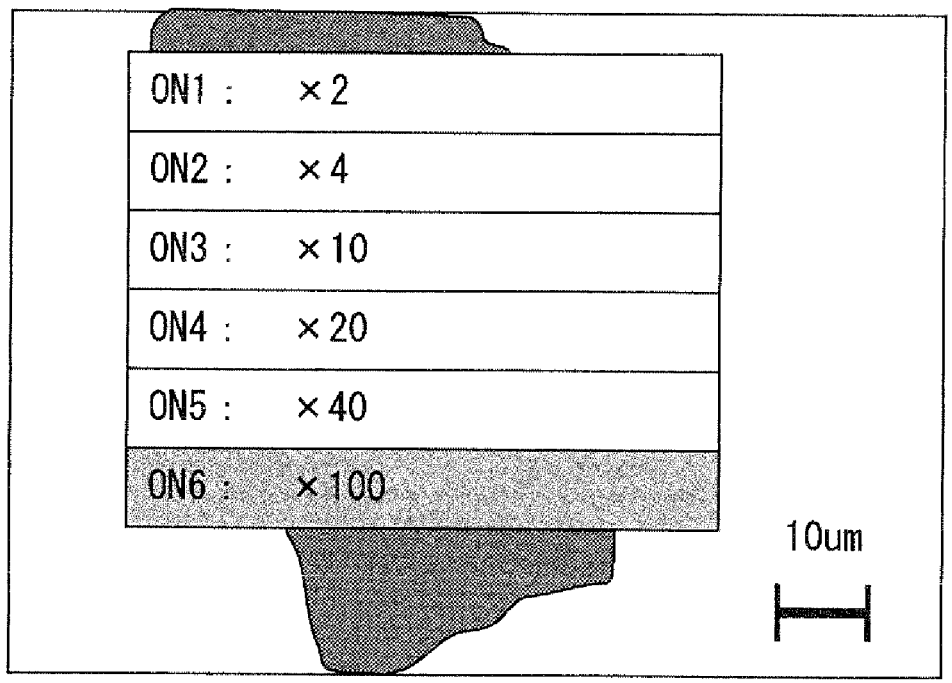
FIG. 19 shows the first display example of a list of display magnification of an observed image.

Described first is the configuration shown in FIG. 19. FIG. 19 shows the first example of the display of a list of display magnifications of an observed image.

In the display example shown in FIG. 19, the column of "ON6: ×100" is displayed as a shaded area. It indicates that the display magnification has been selected by the observer. If the observer presses the left selection SW 61 or the right selection SW 62 when the list is displayed, the selection of the display magnification is switched to another.

That is, when the observer switches the objective lens 52 in the rotating operation of the revolver 53, the list of the display magnifications as shown in FIG. 19 is superimposed on the observed image being displayed on the image display panel 41 of the display portion 5. If the observer selects the display magnification corresponding to the switched objective lens 52, the display of a scale overlaid on the observed image is appropriate corresponding to the display magnification of the observed image.

Figure 20:
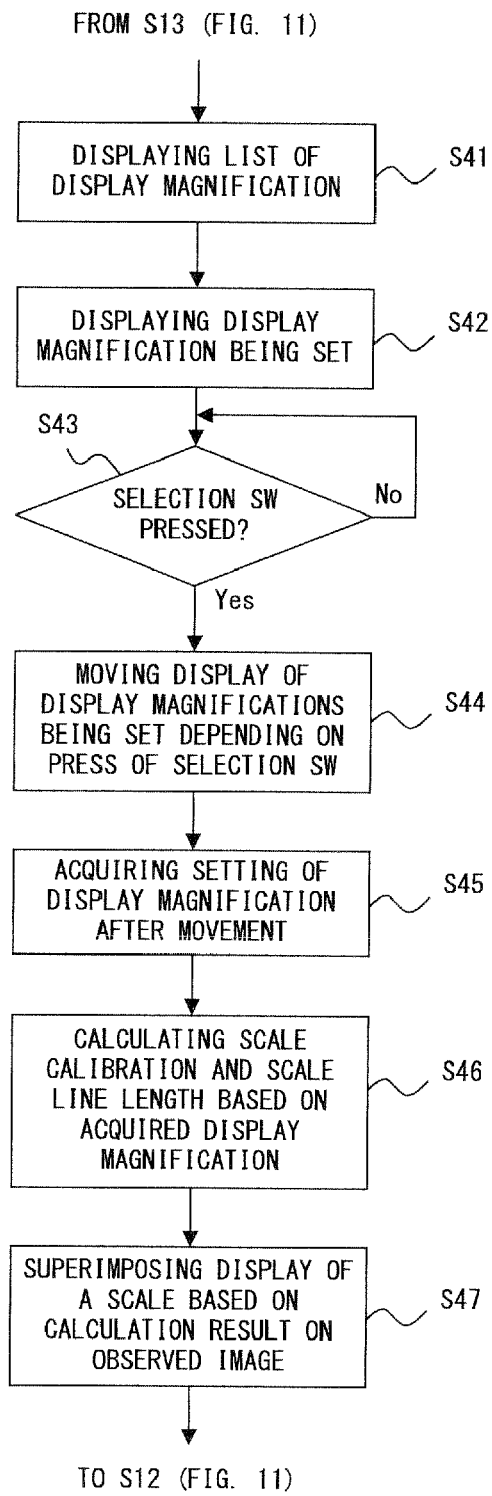
FIG. 20 is a flowchart showing a part of the flow of the processing operation of the digital camera for a microscope according to the embodiment 3.

Described below is the configuration shown in FIG. 20. FIG. 20 is a flowchart showing a part of the flow of the processing operation of the digital camera 3 for a microscope according to the present embodiment. The processing operation is performed instead of the process in S14 according to the flowchart shown in FIG. 11.

If it is determined that the result of the determining process in step S13 shown in FIG. 11 is YES, and the flag information transmitted from the objective change determination unit 66 refers to "objective being changed", the CPU 201 reads the display magnification (that is, the total magnification N of the microscope system) for each scale name stored in the non-volatile memory not shown in the attached drawings in step S41. Then, the CPU 201 displays the display magnification list on the image display panel 41 of the display portion 5 as a notification unit according to the present embodiment.

Next, in step S42, the CPU 201 displays the display magnification (that is, the display magnification corresponding to the display of a scale overlaid on the observed image) currently being set (the shaded display in the example shown in FIG. 20) to the display magnification list.

In step S43, the CPU 201 determines whether or not the pressing operation has been performed on the left selection SW 61 or the right selection SW 62 of the operated portion 4. If it is determined that the pressing operation has been performed (YES as a determination result), then it is assumed that the left selection SW 61 or the right selection SW 62 has acquired a select instruction by an observer from the list of display magnifications, and control is passed to step S44. On the other hand, if it is determined that the pressing operation has not been performed (NO as a determination result), the determining process in step S43 is repeated.

In step S44, the CPU 201 moves the display specifying the display magnification currently being set in the list of the display magnifications being displayed depending on the situation of the pressing operation on the left selection SW 61 or the right selection SW 62.

In step S45, the CPU 201 acquires the value of the display magnification indicated by the display after the movement in the process in step S44.

In step S46, on the basis of the value of the display magnification acquired in the process in step S45, the CPU 201 calculates the scale calibration and scale lines of an appropriate unit length as described above. In the subsequent step S47, the CPU 201 performs the controlling process of controlling the shot image-symbol string combination unit 64 and the observed image-symbol string combination unit 65 and overlaying the display of a scale according to the calculation result on the observed image. Afterwards, control is passed to step S12 shown in FIG. 11.

In the above-mentioned processing operation, the display of a scale overlaid on the observed image being displayed on the display portion 5 is changed into the display of a scale corresponding to the display magnification relating to the select instruction of an observer.

The digital camera 3 for a microscope according to the present embodiment operates as described above. Therefore, the effect obtained according to the embodiments 1 through 3 can be obtained in this embodiment. Furthermore, since a list of the display magnifications of an observed image is displayed on the display portion 5 of the operation display unit 6 when the objective lens 52 is switched by the rotating operation of the revolver 53 of the microscope body 1, the setting operation of the display magnification on the digital camera 3 for a microscope, that is required to change the display of a scale overlaid on the observed image into appropriate display, can be easily performed.

In the above-mentioned present embodiment, only a list of display magnifications depending on the objective lens 52 attached to the revolver 53 and stored in advance in the nonvolatile memory of the CPU 201 is displayed on the display portion 5. Instead, a list of all display magnifications acquired when the microscope system shown in FIG. 1 is used can be displayed on the display portion 5.

FIG. 21 shows the second display example of a list of display magnifications of an observed image, and shows a display example of a list of display magnifications of all display magnification acquired when the microscope system is used.

In the list of the display example, the display magnifications of "×1", "×2", "×2.5", . . . , and "×200" are superimposed on a live image. In the display example, the display portion of "×100" are displayed as a shaded area. The display magnification is selected by an observer. If an observer performs a pressing operation on the left selection SW 61 or the right selection SW 62 of the operated portion 4 when the list is displayed, the selected display magnification is switched to another display magnification.

That is, when an observer switches the objective lens 52 in the rotating operation of the revolver 53, a list of the display magnifications as shown in FIG. 21 is displayed on the image display panel 41 of the display portion 5. If the observer selects the display magnification corresponding to the switched objective lens 52 from the list, the display of a scale overlaid on the observation magnification is appropriate corresponding to the display magnification of the observed image.

Thus, by displaying on the display portion 5 the list of all display magnifications acquired when the microscope system is used, it is not necessary to set details of the display of a scale on the setting screen as shown in FIG. 10. Therefore, the operation of the digital camera 3 for a microscope can be simplified, and the operability can be improved.

Described below is the configuration shown in FIG. 22. FIG. 22 shows an example of the setting screen of the display of a scale, and is an example of the setting screen when the display magnifications shown in FIG. 21 are displayed as a list.

If an observer performs a predetermined operation on the operated portion 4 when the setting screen shown in FIG. 22 is displayed, then one of a scale ON subsection MENU 91c and the scale OFF subsection MENU 92 is selected. The screen example shown in FIG. 22 indicates by the rectangle in broken lines that the scale ON subsection MENU 91c has been selected.

When the scale ON subsection MENU 91c is selected, a scale can be displayed on a live image as shown in FIG. 9. If the scale OFF subsection MENU 92 is selected, the display of a scale is not written on an image of the display of a scale.

For example, it is assumed that a live image on which display of a scale is superimposed is displayed on the image display panel 41 by selecting the scale ON subsection MENU 91c. At this time, if the objective change determination unit 66 determines "objective being changed", then a list of the display magnifications shown in FIG. 21 is displayed on the image display panel 41 to notify that a change of an observed image has been detected. At this time, an observer performs an pressing operation on the left selection SW 61 or the right selection SW 62 of the operated portion 4, and an appropriate display magnification is selected in the observation state of the microscope body 1. Then, the display of a list of the display magnifications disappears and the display of a scale to be overlaid on the observed image is appropriate corresponding to the display magnification of the observed image.

If the scale ON subsection MENU 91c is selected on the setting screen shown in FIG. 22, a list of the display magnifications shown in FIG. 21 can be immediately displayed on the image display panel 41 to prompt the observer to select a display magnification.

Embodiment 5

The digital camera 3 for a microscope according to the present embodiment displays a list of the display magnifications displayed when a change of an observed image is detected in the embodiment 4 by rearranging the display magnification relating to the select instruction ad in the pressing operation on the left selection SW 61 or the right selection SW 62 of the operated portion 4 in a specific order.

In the description of the present embodiment, the descriptions also made in any of the embodiments 1 through 4 are partly omitted.

Figure 23:
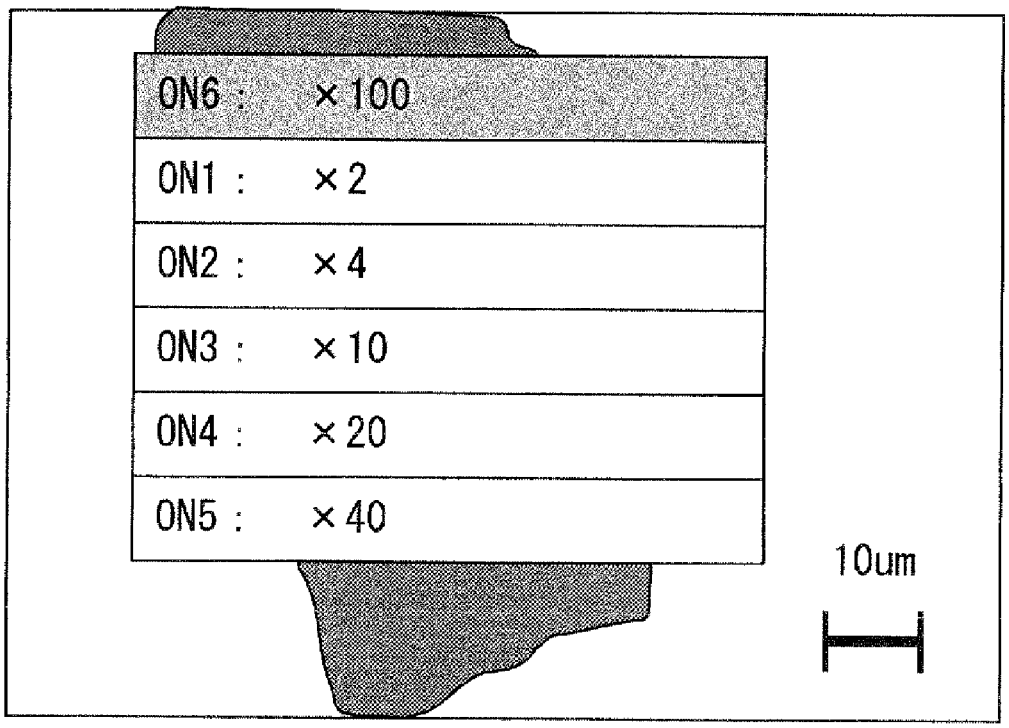
FIG. 23 shows the third display example of a list of display magnification of an observed image.

First, the configuration shown in FIG. 23 is described. FIG. 23 shows the third display example of a list of the display magnifications of an observed image.

In the display example shown in FIG. 23, in the display magnifications displayed as a list on the display portion 5 of the operation display unit 6, the column ("ON6: ×100") displayed as a shaded area indicating that it is selected by the observer is arranged at the top (that is, as a leader in the order) of the list display. That is, in the digital camera 3 for a microscope according to the present embodiment, when a pressing operation is performed by an observer on the left selection SW 61 or the right selection SW 62 of the operated portion 4 to select "ON6: ×100", the arrangement order of the display column of each display magnification in the list display is set in the descending order of "ON6: ×100", "ON1: ×2", "ON2: ×4", "ON3: ×10", . . . from the top order.

For example, when an observer performs a pressing operation on the left selection SW 61 or the right selection SW 62 of the operated portion 4 to select "ON3: ×10", the arrangement order of the display column of each display magnification in the list display is arranged in the order of "ON3: ×10", "ON1: ×2", "ON2: ×4", "ON4: ×20", . . . sequentially from the header.

Thus, if the display order of a list display is sorted and displayed so that the display magnification selected according to the instruction of an observer can be a specific order (header in this example), the observer selects a display magnification from the list, thereby improving the operability.

Figure 24:
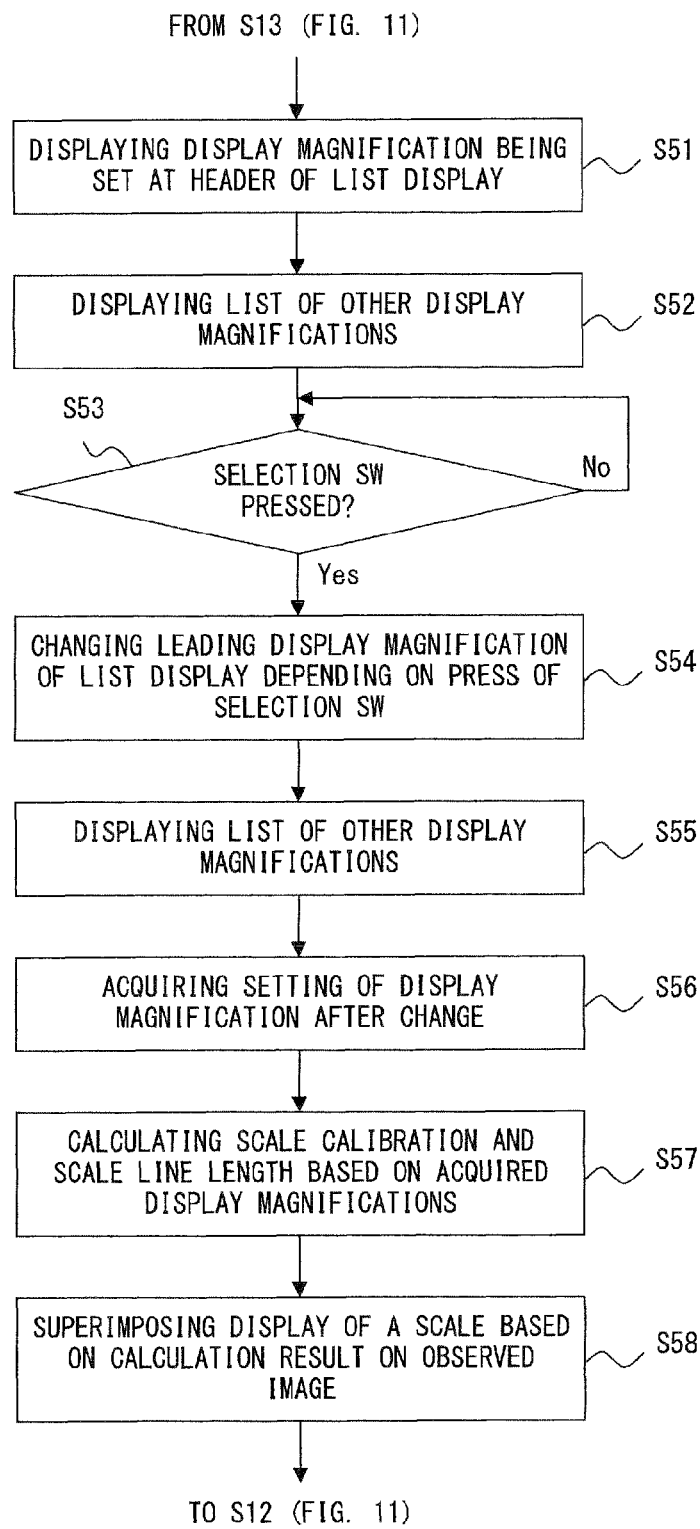
FIG. 24 is a flowchart showing a part of the flow of the processing operation of the digital camera for a microscope according to the embodiment 5.

Described below is the configuration shown in FIG. 24. FIG. 24 is a flowchart showing a part of the flow of the processing operation of the digital camera 3 for a microscope according to the present embodiment. The processing operation is performed instead of the process in S14 in the flowchart shown in FIG. 11.

If the result of the determining process in step S13 is YES, and it is determined that the flag information given by the objective change determination unit 66 refers to "objective being changed", then in step S51 the CPU 201 reads the display magnification (that is, the total magnification N of the above-mentioned microscope system) for each scale name stored in the nonvolatile memory not shown in the attached drawings. Then, the display magnification currently being set (that is, the display magnification corresponding to the display of a scale currently overlaid on an observed image) and its scale name are arranged at the top (header in the order) of the list of the display magnifications, and displayed (as a shaded area in the example shown in FIG. 24) on the image display panel 41 of the display portion 5 as a notification unit in the present embodiment by the CPU 201.

Next, in step S52, the CPU 201 arranges the list of the display magnifications other than the magnification displayed in the process in step S51 in the display magnifications with the respective scale names read from the nonvolatile memory not shown in the attached drawings at the lower portion of the display with the display magnification in the process in step S51, and displays it on the image display panel 41.

In step S53, the CPU 201 determines whether or not the pressing operation has been performed on the left selection SW 61 or the right selection SW 62 of the operated portion 4. If it is determined that the pressing operation has been performed (YES as a determination result), it is assumed that the left selection SW 61 or the right selection SW 62 has acquired a select instruction by an observer from the list of display magnifications, and control is passed to step S54. On the other hand, if it is determined that the pressing operation has not been performed (NO as a determination result), the determining process in step S53 is repeated.

In step S54, the CPU 201 changes the display magnification arranged at the top of the list of display magnifications into any of other magnifications read from the nonvolatile memory not shown in the attached drawings depending on the state of the pressing operation on the left selection SW 61 or the right selection SW 62, and displays the magnification on the image display panel 41.

Next, in step S55, the CPU 201 arranges the list of the display magnifications other than the magnification displayed in the process in step S54 in the display magnifications with the respective scale names read from the nonvolatile memory not shown in the attached drawings at the lower portion of the display with the display magnification in the process in step S54, and displays it on the image display panel 41.

In step S56, the CPU 201 acquires a value of the display magnification arranged at the top of the list display after the change in the process in steps S54 and S55.

In step S57, the CPU 201 calculates the scale calibration and scale lines of appropriate unit lengths on the basis of the value of the display magnifications acquired in the process in step S56. Then, in step S58, the CPU 201 controls the shot image-symbol string combination unit 64 and the observed image-symbol string combination unit 65, and overlays the display of a scale according to the calculation result on an observed image. Afterwards, control is passed to step S12 shown in FIG. 11.

In the above-mentioned processing operations, a list of display magnifications displayed when a change of an observed image is detected so that the display magnification according to the select instruction of an observer can be placed in a specific order (as a header) and displayed.

The digital camera 3 for a microscope according to the present embodiment operates as described above. Therefore, the effect acquired relating to each of the embodiments 1 through 4 is obtained. Furthermore, if the display order of a list display is sorted and displayed so that the display magnification selected according to the instruction of an observer can be a specific order, the observer selects a display magnification from the list, thereby improving the operability.

In the present embodiment described above, a list of display magnifications displayed when a change of an observed image is detected is rearranged and displayed with the display magnification according to the select instruction of the observer arranged as the header. Instead, the list can be realized and displayed with the display magnification according to the select instruction of the observer arranged substantially at the center of the arrangement.

Figure 25:
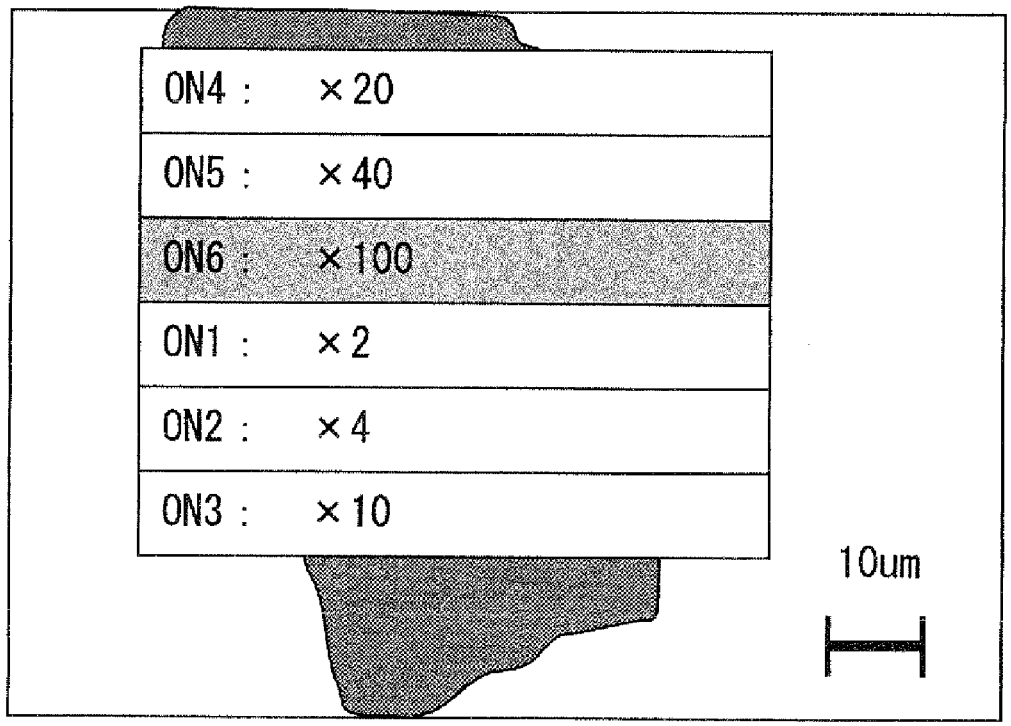
FIG. 25 shows the fourth display example of a list of display magnification of an observed image.

Described below is the configuration shown in FIG. 25. FIG. 25 shows the fourth display example of a list of display magnifications of an observed image, and a display example of rearranging the display magnifications with the display magnification relating to the select instruction placed subsequent at the center of the arrangement.

In the display example shown in FIG. 25, the list display is arranged from the top in the order of "ON4: ×20", "ON5: ×40", "ON6: ×100", "ON1: ×2", "ON2: ×4", and "ON3: ×10".

As described above, the display magnification is determined depending on the observation magnification of the microscope body 1 especially the magnification of the objective lens 52. In the microscope body 1, the objective lens 52 is attached to the six attachment holes of the circular revolver 53.

Assume that, in the revolver 53, the objective lens 52 as the base of the display magnification of the scale name "ON2" is mounted next to the objective lens 52 as the base of the display magnification of the scale name "ON1", and subsequently the objective lens 52 as the base of each display magnification of each of the scale names "ON3" through "ON6" is sequentially mounted. That is, under the assumption, the objective lens 52 having the scale name "ON1" is mounted next to the objective lens 52 having the scale name "ON6". In addition, the objective lens 52 having the scale name "ON5" is mounted by the other side of the objective lens 52 having the scale name "ON6".

In the list of the display magnifications shown in FIG. 25, the display magnification of "ON5" is arranged immediately above the display magnification of "ON6" selected by the observer, and the display magnification of "ON1" is arranged immediately below the display magnification of "ON6". In on pressing operation on the left selection SW 61 or the right selection SW 62 of the operated portion 4, the selection of a display magnification is changed from the one currently being selected into the adjacent immediately above or below the current display magnification in the list display shown in FIG. 25. Therefore, depending on the amount of rotating operation of the revolver 53, the switch of the display magnification can be selected with a smaller amount of operation for a switching operation of the objective lens 52 having a smaller amount of operation.

For example, assume that the objective lens 52 is switched to an adjacent lens in a rotating operation of the revolver 53. Assume that the objective lens 52 on the optical path before the rotating operation has the scale name "ON6". The objective lens 52 on the optical path after the rotating operation has the scale name "ON1" or "ON5". Therefore, if a list of display magnifications shown in FIG. 25 is displayed, the display magnification of "ON1" or "ON5" can be selected with the smallest amount of operation from the display magnification of the "ON6" currently being selected.

Figure 26:
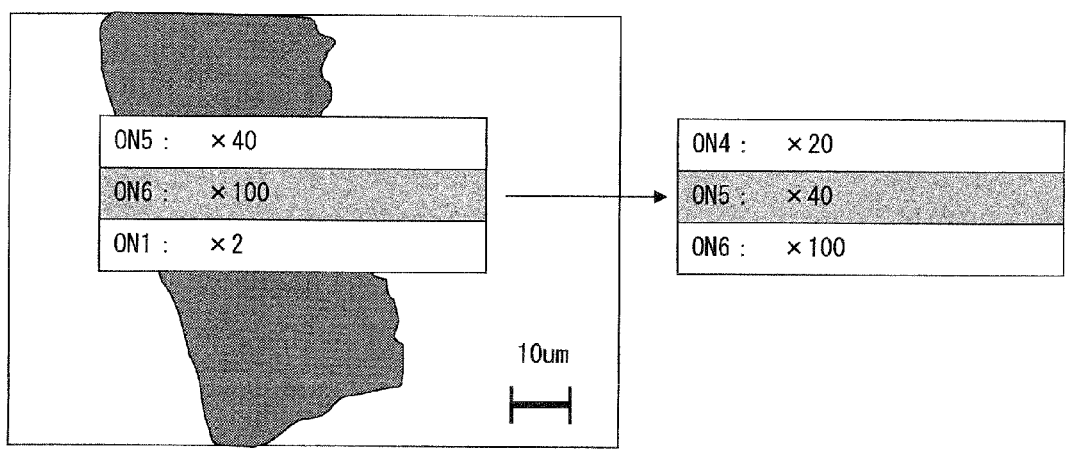
FIG. 26 shows the fifth display example of a list of display magnification of an observed image.

In addition, as shown in FIG. 25, instead of displaying a list of all display magnifications on "ON6", the fifth display example of the list of display magnifications of the observed image shown in FIG. 26 can be used. That is, as in the example shown in FIG. 26, with the currently selected display magnification arranged at the center, only the display magnifications of the objective lens 52 adjacent to the objective lens 52 of the selected display magnifications can be displayed as a list of the display magnifications below and above.

In the list of the display magnifications shown in FIG. 26, the display magnification of "ON5" is arranged above the display magnification of "ON6" selected by the observer, and the display magnification of "ON1" is arranged below the display magnification of "ON6". That is, in the display example shown in FIG. 26, the arrangement order of the list display is "ON5: ×40", "ON6: ×100", and "ON1: ×2" in this order from the top.

In one pressing operation on the left selection SW 61 of the operated portion 4, when the selection for upward display magnification is specified in the list display, the list display is chanced to the arrangement displayed on the right of FIG. 26, that is, "ON4: ×40", "ON5: ×40", and "ON6: ×100" in this order from the top.

That is, in the display example shown in FIG. 26, only the recent display magnification selected depending on the rotating operation of the revolver 53 is displayed. Therefore, incorrect selection of a display magnification can be suppressed. In addition, as a result of decreasing the number of display magnifications in the list display, the size of the list display on the image display panel 41 can be reduced. Accordingly, the list display can be easily observed, and the visibility of the live image (observed image) functioning as a background image of the list display can be improved.

In the digital camera 3 for a microscope according to the present embodiment, although a predetermined time has passed since a list of display magnifications was displayed, the select instruction by the pressing operation on the left selection SW 61 or the right selection SW 62 of the operated portion 4 may not be acquired. In this case, the list of the display magnification can be stopped.

Figure 27:
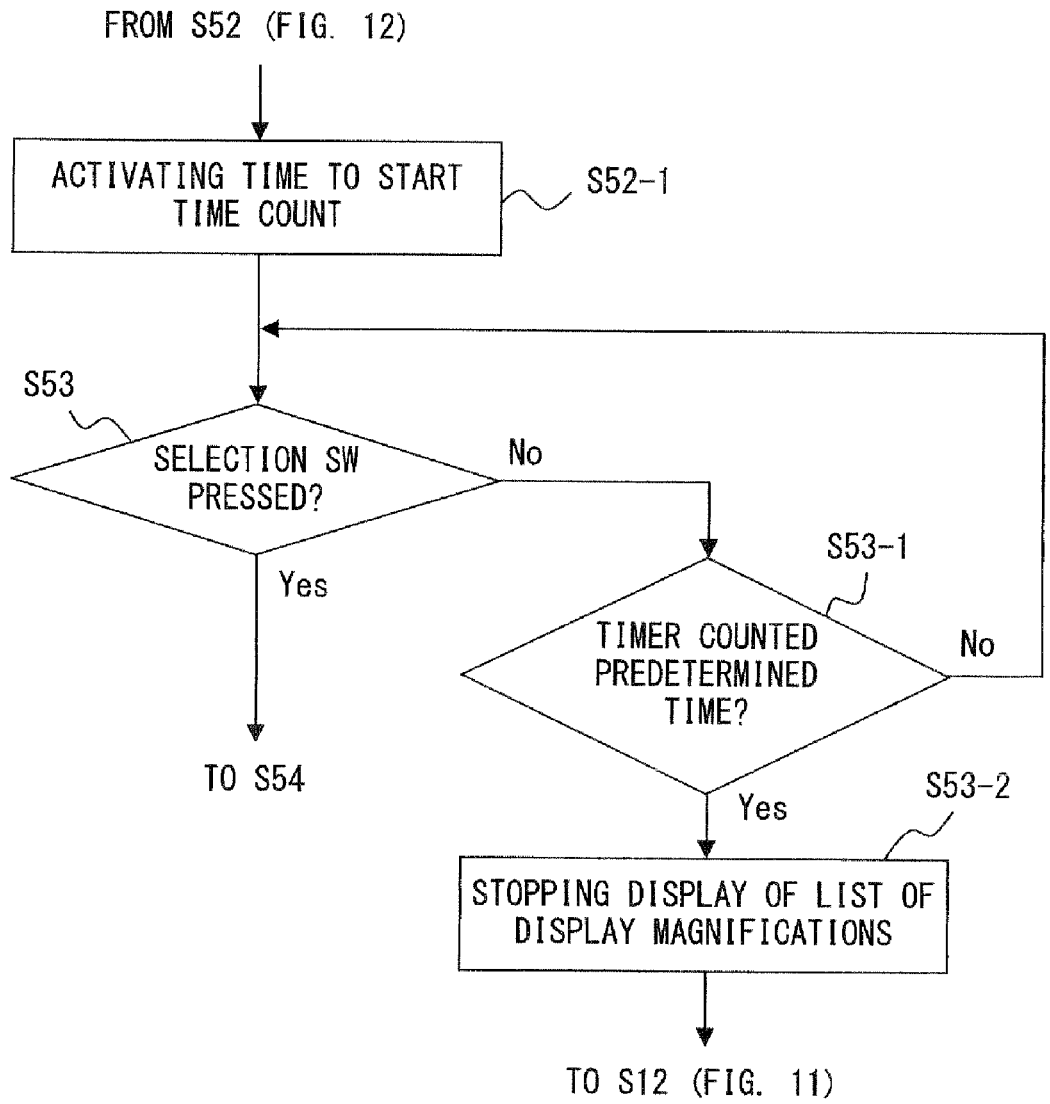
FIG. 27 shows a first variation example of the flowchart shown in FIG. 24.

The configuration shown in FIG. 27 is described below. FIG. 27 shows a variation example of the flowchart shown in FIG. 24, and shows the processing operation of the digital camera 3 for a microscope for stopping the display of a list of display magnifications in the case above.

FIG. 27 shows that the process instruction S52-1 is inserted between steps S52 and S53 in the flowchart shown in FIG. 24. Furthermore, it shows that the processes in steps S53-1 and S53-2 are performed when the process result of the determining process in step S53 is NO.

In step S52-1 after the process in step S52 shown in FIG. 24, the CPU 201 activates the timer function of the central calculation unit of the CPU to start counting time.

In step S53, the CPU 201 performs the process of determining whether or not the pressing operation has been performed on the left selection SW 61 or the right selection SW 62 of the operated portion 4. If it is determined that the pressing operation has been performed (YES as a determination result), it is assumed that the select instruction by the observer from the list of display magnifications has been acquired by the left selection SW 61 or the right selection SW 62, and control is passed to step S54. On the other hand, if it is determined that the pressing operation has not been performed (NO as a determination result), control is passed to step S53-1.

In step S53-1, the CPU 201 determines whether or not the time count by the timer function activated in step S52-1 has reached a predetermined value (for example, 5 seconds). If it is determined that the predetermined time count has been reached (YES as a determination result), control is passed to step S53-2. On the other hand, if it is determined that the predetermined time count has not been reached (NO as a determination result), control is returned to step S53, and the above-mentioned processes are performed again.

In step S53-2, the CPU 201 performs the process off stopping displaying the list of display magnifications displayed on the image display panel 41 of the display portion 5 as a notification unit according to the present embodiment in the processes in step S51 and S52 shown in FIG. 24. Afterwards, control is passed to step S12 shown in FIG. 11.

Although a predetermined time (for example, 5 seconds) has passed since the display of a list of display magnifications was started on the image display panel 41 of the display portion 5 as a notification unit according to the present embodiment in the above-mentioned processing operations, the list of display magnifications is stopped and automatically cleared if a select instruction in the pressing operation on the left selection SW 61 or the right selection SW 62 is not acquired. Therefore, when it is not necessary to change the selection of display magnifications, the list display of display magnifications is cleared although the observer does not perform any special operation, thereby further improving the operability.

Embodiment 6

Although a change of an observed image is detected and a list of display magnifications is displayed according to the embodiment 4, and a select instruction of a display magnification is not acquired in the pressing operation on the left selection SW 61 and the right selection SW 62 of the operated portion 4, the digital camera 3 for a microscope according to the present invention notifies and warns of the information.

In the descriptions of the present embodiment, the descriptions also made in any of the embodiments 1 through 5 are partly omitted.

Figure 28:
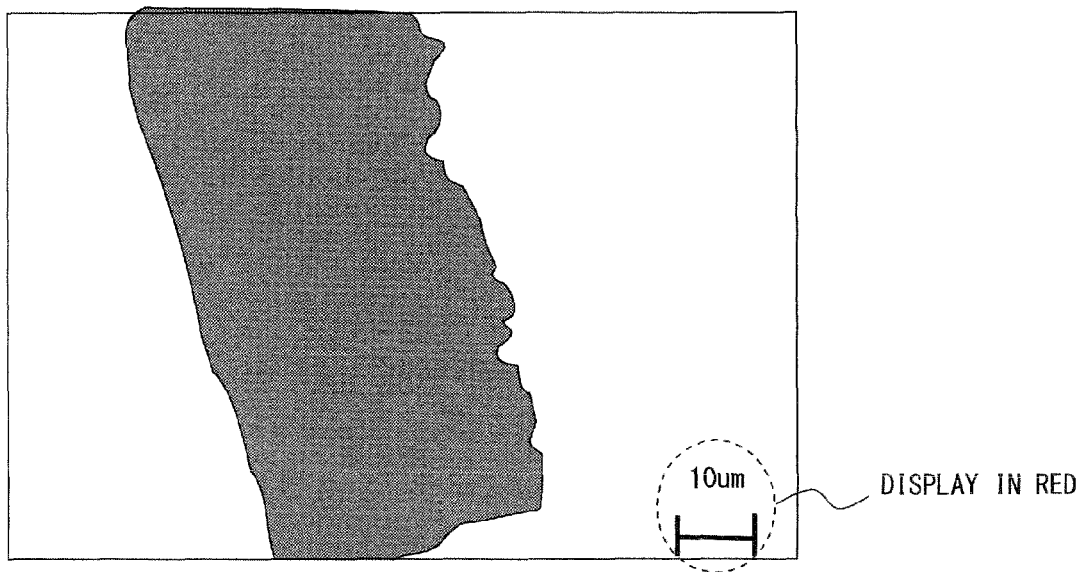
FIG. 28 shows an example of a live image notifying that an instruction to select a display magnification has not been acquired.

Described first is an example shown in FIG. 28. FIG. 28 shows an example of a live image for which a select instruction of a display magnification has not been acquired. As described with reference to FIG. 28, the live image is different from other live images (FIGS. 8, 13, etc.) in that the composite display of a scale (scale calibration and scale lines) is displayed in red. In the image example shown in FIG. 28, the red display informs of the information that a select instruction of a display magnification has not been acquired (the display of a scale in other live images is white).

Figure 29:
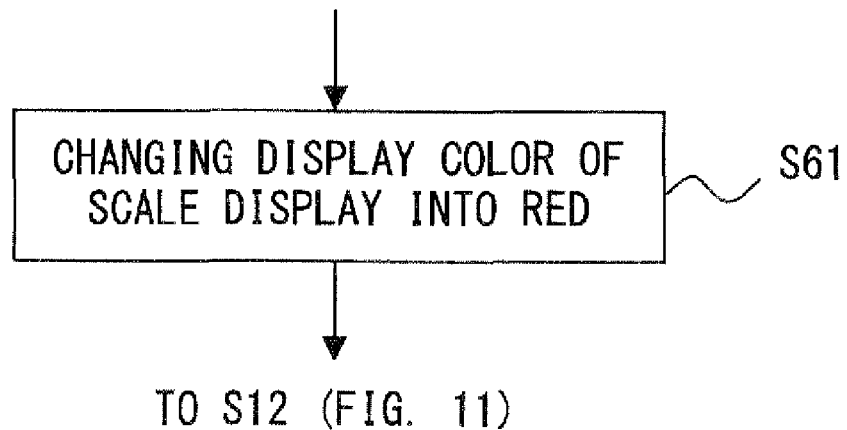
FIG. 29 shows a variation example of the flowchart shown in FIG. 27.

Described below is an example shown in FIG. 29. FIG. 29 shows a variation example of the flowchart shown in FIG. 27. The example shows a processing operation of the digital camera 3 for a microscope for notifying of the information that a select instruction of a display magnification has not been acquired when a list display of a display magnification is stopped by the left selection SW 61 and the right selection SW 62 not acquiring a select instruction by an observer.

FIG. 29 shows that the process in step S61 is inserted between step S53-1 in the flowchart shown in to FIG. 27 and step S12 in the flowchart shown in FIG. 11.

As described above, in the process in step S53-2 shown in FIG. 27, if a select instruction by the pressing operation on the left selection SW 61 or the right selection SW 62 of the operated portion 4 is not acquired although a predetermined time (for example, 5 seconds) has passed since a list of display magnifications was displayed on the image display panel 41 of the display portion 5, then the list display of the display magnification is stopped and automatically cleared. After the process, in step S61 shown in FIG. 29, the CPU 201 changes the display color of the display of a scale combined on the observed image displayed on the image display panel 41 from white to red, informs an observer of the information that the select instruction has not been acquired, and warns of the information. Afterwards, control is passed to step S12 shown in FIG. 11.

In the processing operation, when the list display of display magnifications is stopped by the left selection SW 61 and the right selection SW 62 not acquiring a select instruction although a predetermined time has passed since the list display of display magnifications was started, an information that a select instruction of a display magnification has not been acquired is reported. Thus, an observer can be warned of the possibility that the setting state of the objective lens 52 arranged on the optical path of the microscope body 1 is different from the setting state of the display of a scale in the digital camera 3 for a microscope. Therefore, an incorrect operation or a setting forgotten by an observer can be prevented.

Embodiment 7

In the above-mentioned embodiment 6, the information that a select instruction of a display magnification is reported when a list of display magnifications is stopped by any of the left selection SW 61 and the right selection SW 62 not acquiring a select instruction although a change of an observed image and a predetermined time has passed since list display was started. On the other hand, the digital camera 3 for a microscope according to the present embodiment first prohibits the execution of a shooting operation if any of the left selection SW 61 and the right selection SW 62 does not acquire a select instruction after a change of an observed image is detected and list display of display magnifications is started, the EXPOSE SW 31 is pressed, and the digital camera 3 for a microscope acquires an instruction to execute a shooting operation. Then, a notifying that a select instruction of a display magnification has not been acquired is reported to an observer.

In the descriptions of the present embodiment, the descriptions also made in any of the embodiments 1 through 6 are partly omitted.

Described below is an example shown in FIG. 30. FIG. 30 shows an example of a live image notifying that a select instruction of a display magnification is not acquired when a pressing operation of the EXPOSE SW 31 is acquired.

As described above, in the live image shown in FIG. 28, the display of a scale is displayed in red, and a notification that a select instruction of a display magnification has not been acquired. At this time, although an observer performs a pressing operation and an instruction to perform a shooting operation is issued, the image capturing operation is prohibited and an observed image is not recorded by the memory device 34. On the other hand, as shown in FIG. 30, the character string "Confirm the setting of display of a scale." is overlaid on the display portion 5 being displayed. Thus, the EXPOSE SW 31 notifies that a shoot instruction of an observed image has been acquired without any of the left selection SW 61 and the right selection SW 62 acquiring a select instruction of a display magnification after starting list display of display magnifications, thereby issuing a warning to an observer.

Described below is a flowchart shown in FIG. 31. FIG. 31 is a flowchart of the operation of the shooting process of the digital camera 3 for a microscope according to the present embodiment.

The process shown in FIG. 31 is started when the mode SW 32 of the operated portion 4 in the operation display unit 6 is placed in the "shooting mode".

First, in step S71, the CPU 201 determines whether or not a pressing operation on the EXPOSE SW 31 has been performed. If it is determined whether or not the pressing operation has been performed (YES as a determination result), then it is assumed that a shoot instruction of an observed image has been acquired, and control is passed to step S72. On the other hand, if it is determined that the pressing operation has not been performed (NO as a determination result), the determining process in step S71 is repeated.

Next, in step S72, the CPU 201 determines whether or not the display color of the display of a scale combined with the observed image (live image) currently being displayed on the image display panel 41 of the display portion 5 is red. If it is determined that the display color of the display of a scale is red (YES as a determination result), control is passed to step S77. On the other hand, if it is determined that the display color of the display of a scale is not red (if the color is white) (NO as a determination result), then control is passed to step S73.

The processes from step S73 to step S76 refer to a recording operation.

That is, first in step S73, the CPU 201 controls the shutter 25 to set an appropriate exposure time.

Next in step S74, the CPU 201 reads and acquires the image data of the observed image acquired depending on the open and close of the shutter 25 stored in the RAM 200 for display. Then, in step S75, the CPU 201 controls the shot image-symbol string combination unit 64 to combines an observed image with a display of a scale when a write is set depending on the setting of a write of display of a scale.

In step S75, the CPU 201 controls the memory device 34 to record the image data of an observed image on the removable medium 35, and then control is returned to step S71 to repeat the above-mentioned processes.

On the other hand, the processes in steps S77 and S78 are performed when it is determined in the determining process in step S72 that the display color of the display of a scale is red (YES as a determination result). That is, the processes are performed when it is regarded that the EXPOSE SW 31 has acquired a shoot instruction of an observed image without the left selection SW 61 and the right selection SW 62 of the operated portion 4 acquiring the operation of the select instruction after a list display of display magnifications is started.

First, in step S77, the CPU 201 prohibits the execution of the recording operation of an observed image. Then, in the subsequent step S78, the CPU 201 displays the character string " " shown in FIG. 30 on the image display panel 41 of the display portion 5. Afterwards, control is returned to step S71, and the above-mentioned processes are repeated.

By the above-mentioned shooting operations performed by the digital camera 3 for a microscope according to the present embodiment, the EXPOSE SW 31 notifies that a shoot instruction of an observed image has been acquired without acquiring a select instruction of a display magnification of a display magnification by any of the left selection SW 61 and the right selection SW 62 after starting list display of display magnifications. As a result, a warning of the possibility that the setting state of the objective lens 52 arranged on the optical path of the microscope body 1 is different from the setting state of the display of a scale in the digital camera 3 for a microscope is transmitted to an observer as a warning. Therefore, shooting an observed image with wrong settings is suppressed, an incorrect operation is reduced, and the operability can be improved. An observed image can also be shot with warning display shown in FIG. 30.

Embodiment 8

The digital camera 3 for a microscope according to the present embodiment changes the configuration of the objective change determination unit 66 as a detection unit to detect a change into the optical cutoff state of an observed image, and recognizes the direction of an rotating operation of the revolver 53 on the basis of the state of a change of the observed image when the observed image changes from the observation state to the optical cutoff state. When a change of the observed image is detected, it is informed that a change of an observed image is detected by displaying a list of display magnifications of the observed image on the display portion 5 of the operation display unit 6 as the above-mentioned embodiment 4.

In the descriptions of the present embodiment, the descriptions also made in any of the embodiments 1 through 7 are partly omitted.

Figure 32:
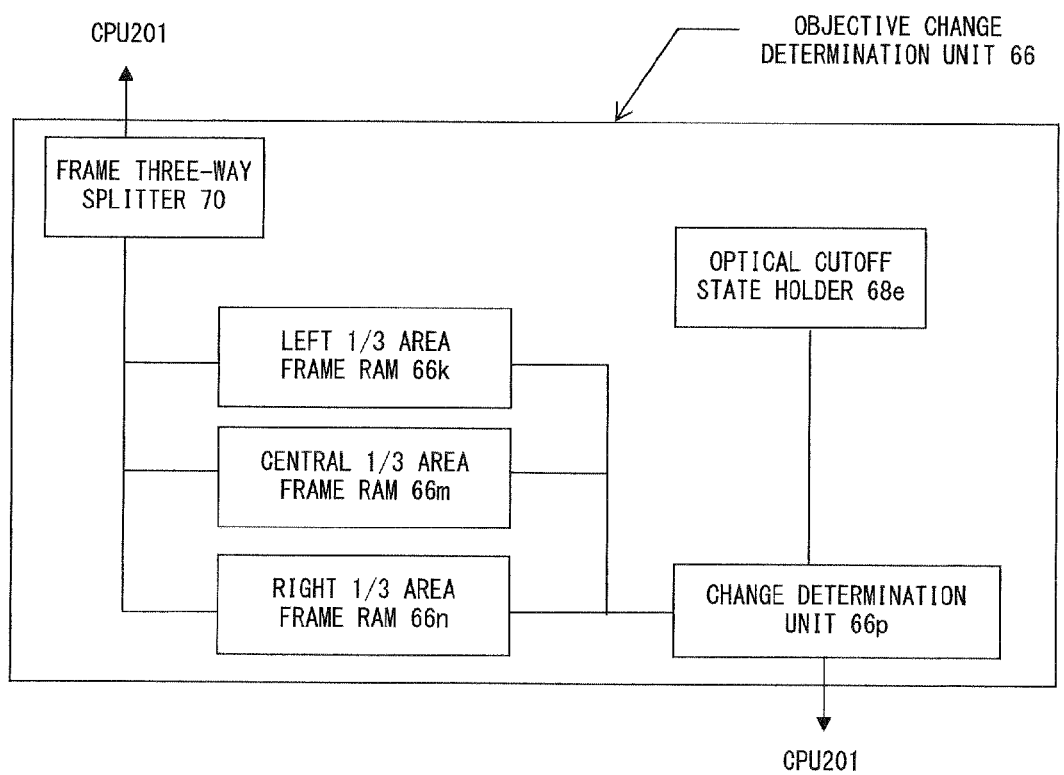
FIG. 32 shows the fifth example of the configuration of the objective change determination unit.

Described below is the example shown in FIG. 32. FIG. 32 shows the filth example of the configuration of the objective change determination unit 66.

The objective change determination unit 66 shown in FIG. 32 functions as a detection unit for detecting a change of an observed image into an optical cutoff state, and also functions as a rotation direction recognition unit for recognizing the relationship, based on the observed image, between the change of the observed image and the rotation direction in the rotation of the revolver 53 that has caused the chance by switching the objective lens 52. The objective change determination unit 66 includes a frame three-way splitter 70, a left ⅓ area frame RAM 66k, a central ⅓ area frame RAM 66m, a right ⅓ area frame RAM 66n, an optical cutoff state holder 68e, and a change determination unit 66p.

The frame three-way splitter 70 divides a 1-frame observed image acquired by the microscope body 1 into three partial area images, that is, a left area, a central area, and a right area. The state of the division is described below with reference to FIG. 33.

Figure 33:
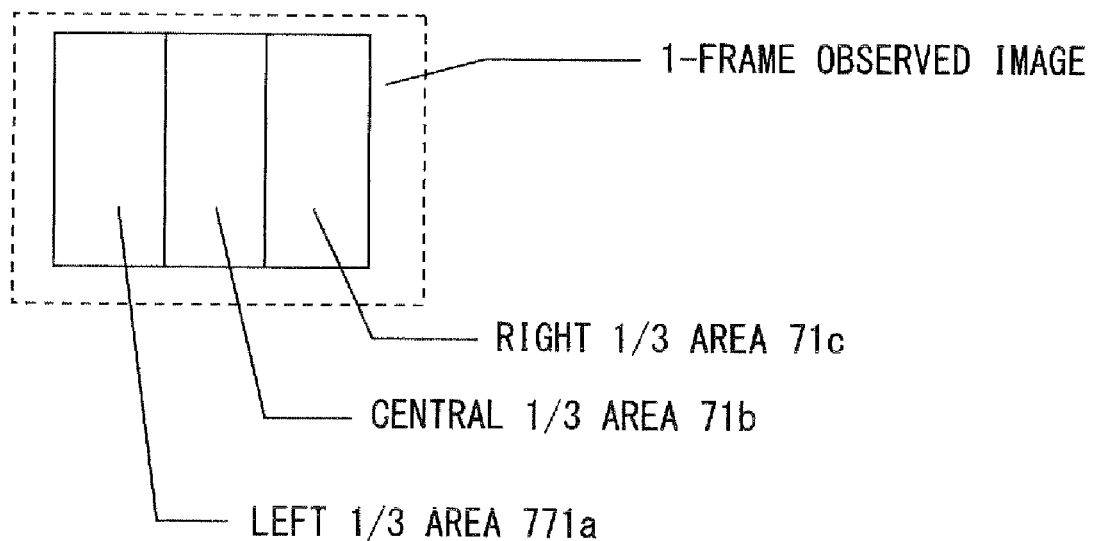
FIG. 33 is an explanatory view of the division of an observed image.

As shown in FIG. 33, the frame three-way splitter 70 vertically divides a 1-frame observed image into three parts. The partial image areas formed by the three-way split are hereinafter referred to as a left ⅓ area 71a, a central ⅓ area 71b, and a right ⅓ area 71c.

The left ⅓ area frame RAM 66k, the central ⅓ area frame RAM 66m, and the right ⅓ area frame RAM 66n stores (the image data of) the partial area images of the observed image divided into three parts by the frame three-way splitter 70. That is, the left ⅓ area frame RAM 66k stores a partial area image of the left ⅓ area 71a, the central ⅓ area frame RAM 66m stores the partial area image of the central ⅓ area 71b, and the right ⅓ area frame RAM 66n stores a partial area image of the right ⅓ area 71c.

The change determination unit 66p calculates the average intensity Nave of a partial area image stored in each of the left ⅓ area frame RAM 66k, the central ⅓ area frame RAM 66m, and the right ⅓ area frame RAM 66n. When the value of Nave is smaller than a predetermined threshold, that is, if the following expression holds when the possible range of the intensity is 0 through 255, the change determination unit 66p of the objective change determination unit 66 outputs the flag information "during optical cutoff".

Nave<10

On the other hand, if the value of Nave is smaller than the above-mentioned threshold, that is, for example, the following expression holds, then the change determination unit 66p outputs the flag information "no optical cutoff".

Nave≧10

The optical cutoff state holder 68e holds the state information indicating the determination result about each partial area image by the change determination unit 66p (information about "during optical cutoff" or "no optical cutoff").

Figure 34:
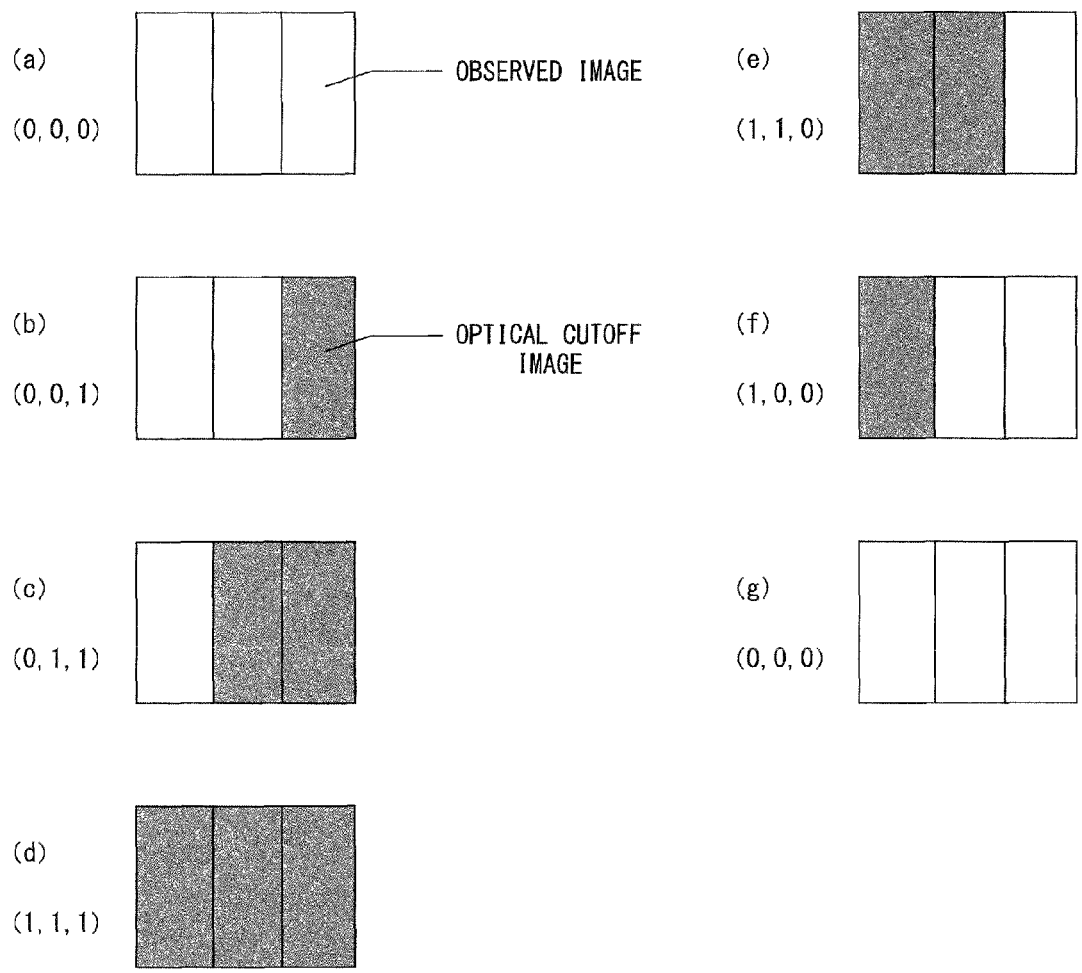
FIG. 34 shows the change of the light-proof state of an observed image when the revolver is rotated counterclockwise.

Described next is the state transition shown in FIG. 34. FIG. 34 shows the state transition of the optical cutoff state of an observed image when the revolver 53 is rotated counterclockwise.

In the description below, "during optical cutoff" is expressed by "1", and "no optical cutoff" is expressed by "0" about the above-mentioned flag information.

In FIG. 34, the observed image of (a) indicates the state in which flag information is (0, 0, 0), that is, all of the three partial image areas indicate "no optical cutoff".

At this time, an observer starts the counterclockwise operation of the revolver 53. Then, the observed image enters the state (b), and the flag information indicates (0, 0, 1), that is, only the partial area image of the right ⅓ area 71c is changed into the state "with cutoff of an optical path". Then, a change into the optical cutoff state of the observed image further develops from (c) to (d), and the flag information indicates (1, 1, 1), that is, all of the three divisional image areas change into the state of "with cutoff of an optical path". Afterwards, the recovery of the observed image starts from the optical cutoff state and proceeds with (e), (f), and (g) sequentially, and the flag information indicates (0, 0, 0), that is, the same as the state of (a). All of the three divisional image areas enters the state "with cutoff of an optical path". At this time, the rotating operation of the revolver 53 corresponding to the switch of one of the objective lens 52 is completed, and the microscope body 1 is placed in the state in which an adjacent objective lens to the right of the lens before the rotating operation is placed in the optical path.

As shown in FIG. 34, the change of the optical cutoff state of the observed image accompanying the counterclockwise rotation operation of the revolver 53 occurs in the following order.

(a) (0, 0, 0), (b) (0, 0, 1),
(c) (0, 1, 1), (d) (1, 1, 1),
(e) (1, 1, 0) (f) (1, 0, 0),
(g) (0, 0, 0)

In the change of the optical cutoff state of the observed image, the states of (a) (0, 0, 0) and (g) (0, 0, 0) are constant state in which the objective lens 52 is appropriately arranged in the optical path. (However, in the states (a) and (g), there are different kinds of objective lens 52 arranged in the optical path.) In addition, the states (b) through (f) are transition state in the counterclockwise operation of the revolver 53.

The optical cutoff state holder 68e stores in advance the state transition (each optical cutoff transition states (a) through (g) shown in FIG. 34 including the order) In the subsequent descriptions, the storage contents are referred to as "counterclockwise initial value".

The change determination unit 66p determines which is the optical cutoff state of three-way split partial area image in the states (a) through (g) shown in FIG. 34 relating to an observed image in each frame, and notifies the optical cutoff state holder 68e of the determined state.

The optical cutoff state holder 68e holds at least seven past frames of each optical cutoff state from the change determination unit 66p, and compares them with the "counterclockwise initial value". If all of them match the "counterclockwise initial value", the optical cutoff state holder 68e notifies the change determination unit 66p of "objective being changed". Otherwise, the optical cutoff state holder 68e notifies the 66p of "being observed". The change determination unit 66p that has received the notification outputs the flag information indicating "being observed" or "objective being changed", and notifies the CPU 201 of the information.

In the description above, the method of recognizing the counterclockwise operation of the revolver 53, but the clockwise rotating operation of the revolver 53 can be similarly recognized. However, in the clockwise rotating operation of the revolver 53, the transition of the optical cutoff state of an observed image is inverse to that of the counterclockwise rotating operation, and changes in the following order.

(g) (0, 0, 0), (f) (1, 0, 0),
(e) (1, 1, 0), (d) (1, 1, 1),
(e) (0, 1, 1) (b) (0, 0, 1),
(a) (0, 0, 0)

The optical cutoff state holder 68e stores in advance the above-mentioned state transition. In the subsequent description, the storage contents are referred to as a "clockwise rotation initial value".

The flow of the pressing operation of the objective change determination unit 66 according to the present embodiment is described below with reference to the flowchart shown in FIG. 35.

In the present embodiment, it is assumed that the possible range of the value of the intensity of an observed image is 0 to 255.

Figure 35:
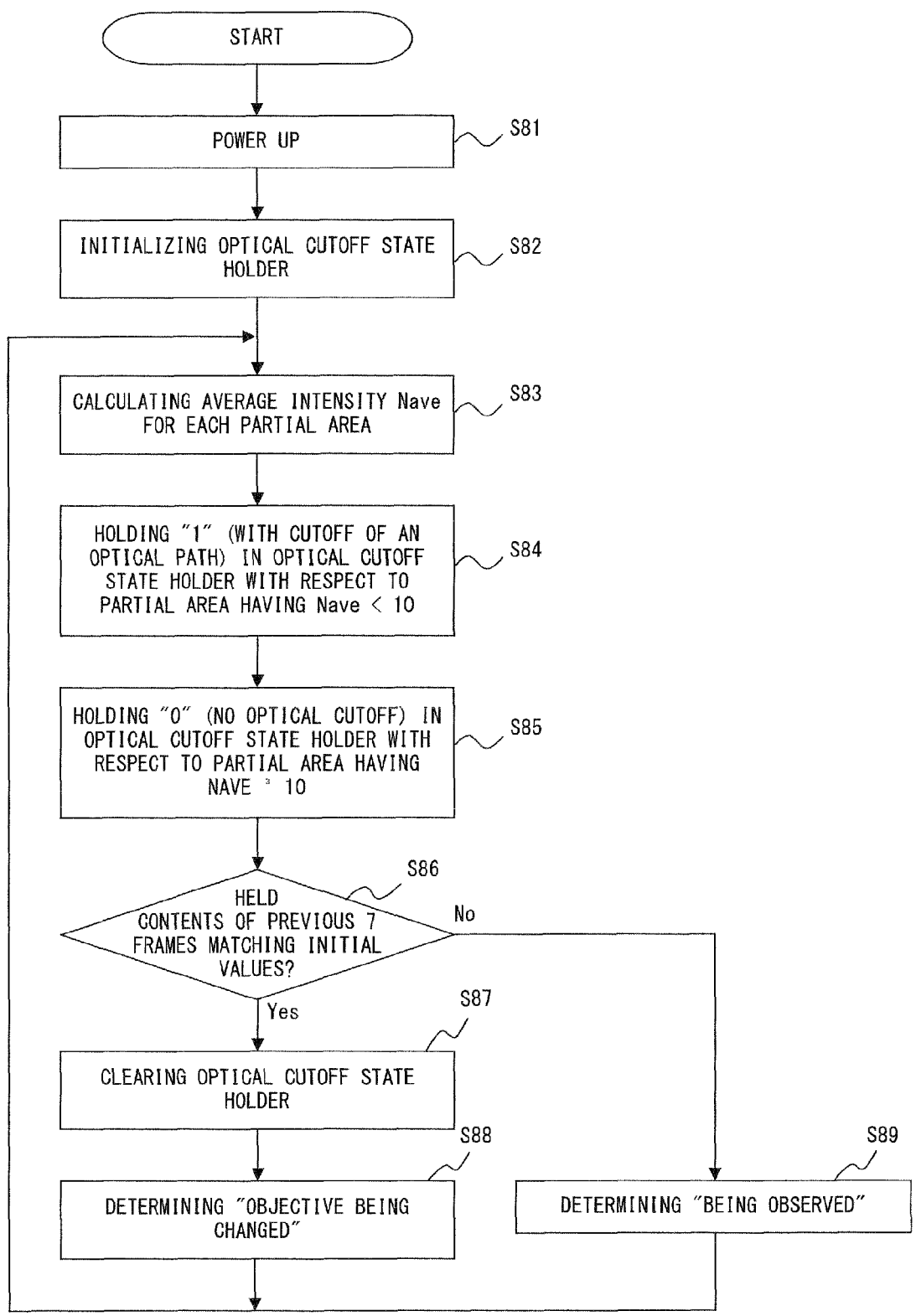
FIG. 35 is a flowchart showing the flow of the processing operation of the objective change determination unit according to the embodiment 8.

The processes in steps S81 and S82 shown in FIG. 35 are performed depending on the operation in step S11 in the flow of the operation of the digital camera 3 for a microscope shown in FIG. 11. That is, first in step S81, an observer turns on the power source SW 6G of the operated portion 4 in the operation display unit 6. Then, the supply of power to each component of the digital camera 3 for a microscope is started as necessary, and the operation of the change determination unit 66p is also started correspondingly. Then, in step S82, the change determination unit 66p performs the initializing process of the optical cutoff state holder 68e. In this initializing process, the held contents of the optical cutoff state holder 68e are cleared to enter the state in which no state information is held, and the above-mentioned "counterclockwise rotation initial value" and the "clockwise rotation initial value" are stored in the optical cutoff state holder 68e.

The processes from step S83 after step S82 to step S89 are the process for detecting a change of an observed image. The CPU 201 performs the determining process in step S13 shown in FIG. 11 according to the flag information notified as a result of the process.

First in step S83, the CPU 201 reads the image data of each partial area of the three-way split observed images stored in the frame three-way splitter 70, the left ⅓ area frame RAM 66k, the central ⅓ area frame RAM 66m, and the right ⅓ area frame RAM 66n. Then, the change determination unit 66p performs the process of calculating the average intensity Nave of the partial area image expressed by the image data on each partial area.

In step S84, relating to a partial area whose average intensity Nave of a partial area image is less than a predetermined threshold ("10" in this example), the change determination unit 66p holds the flag information "1" indicating "during optical cutoff" in the optical cutoff state holder 68e.

In step S85, relating to a partial area whose average intensity Nave of the partial area image is equal to or exceeds a predetermined threshold, the change determination unit 65p holds the flag information "0" indicating "no optical cutoff" in the change determination unit 66p.

In step S86, the optical cutoff state holder 68e determines whether or not the held contents in the optical cutoff state of an observed image in the past 7 frames in the optical cutoff state holder 68e match any of the "counterclockwise rotation initial value" and the "clockwise rotation initial value" stored in the optical cutoff state holder 68e. If the held contents in the optical cutoff state match one of the initial values (YES as a determination result), then control is passed to step S87.

On the other hand, if the held contents in the optical cutoff state do not match any initial value (NO as a determination result), control is passed to step S89.

In step S87, since the determination that an observed image has changed satisfies the condition of the objective change determination unit 66 relating to the present embodiment, the optical cutoff state holder 68e clears the history of the flag information about each partial area. Then, in step S88, the optical cutoff state holder 68e outputs the flag information indicating "objective being changed" as a determination result of the objective change determination unit 66 through the change determination unit 66p, and notifies the CPU 201 of the information. After the process is completed, control is returned to step S83, and the above-mentioned process is repeated relating to the observed image in the next frame.

On the other hand, in step S89, the optical cutoff state holder 68e outputs the flag information indicating "being observed" as a determination result of the objective change determination unit 66 through the change determination unit 66p, and notifies the CPU 201 of the information. Afterwards, control is returned to step S83, and the above-mentioned processes are repeated on the observed image in the next frame.

When an observed image is temporarily changed into the optical cutoff state and then recovered from the optical cutoff state by the objective change determination unit 66 according to the present embodiment performing the above-mentioned operation process, the objective change determination unit 66 notifies the CPU 201 of the flag information indicating "objective being changed". On the other hand, in other cases, the objective change determination unit 66 notifies the CPU 201 of the flag information indicating "being observed". The CPU 201 performs the determining process in step S13 shown in FIG. 11 according to the flag information.

When the CPU 201 receives the flag information indicating "objective being changed", the objective change warning LED 72 can be turned on as in the embodiment 1 to output the notification information showing a detection result of a change of an observed image. In addition, as in the embodiment 4, a list of display magnifications of an observed image is displayed on the display portion 5 of the operation display unit 6, thereby indicating that a change of the observed image has been detected.

Since the digital camera 3 for a microscope according to the present embodiment operates as described above, a setting state and a setting change of the microscope body 1 can be recognized by the digital camera 3 for a microscope without electric communication means between the microscope body 1 and the digital camera 3 for a microscope. Therefore, the microscope system can be easily configured, and especially a change of the setting of the microscope body 1 can be grasped by the digital camera 3 for a microscope, thereby obtaining an effect of reducing the cost of the microscope system.

According to the digital camera 3 for a microscope of the present embodiment, although an observer concentrates on the operation of a camera or the live observation, the observer can grasp the setting state and the setting change of the microscope body 1, thereby improving the operability.

Furthermore, according to the digital camera 3 for a microscope of the present embodiment, when a setting change is made to the display of a scale while switching the objective lens 52 of the microscope body 1, a warning to prompt a setting change of display of a scale. Therefore, an operation for a setting change of display of a scale for a camera is not forgotten or incorrectly performed.

In the digital camera 3 for a microscope according to the present embodiment, a list of display magnifications of an observed image displayed on the display portion 5 of the operation display unit 6 by the CPU 201 that has received the flag information indicating "objective being changed" can be rearranged on the basis of the recognition result of the rotation direction of the revolver 53.

Assume that the total magnification (that is, display magnification of an observed image) set for each of six scale names from "ON1" to "ON6" on the detail setting screen of the display of a scale shown in FIG. 10, and the attachment position (each attachment hole) of the revolver 53 on which the objective lens 52 is mounted have the relationship shown in FIG. 36. That is, the nonvolatile memory of the CPU 201 stores in advance the information about the display magnification of the observed image with each piece of information associated with the attachment position of the objective lens 52 in the revolver 53, and the order information indicating the switching order of the objective lens 52 when the revolver 53 is rotated is also stored in advance.

The optical cutoff state holder 68e of the objective change determination unit 66 according to the present embodiment detects that an observed image has temporarily changed, then has recovered from the optical cutoff state, and that the rotation direction in the rotating operation of the revolver 53 is counterclockwise rotation. Then, the CPU 201 displays what is shown in FIG. 37 as a list of display magnifications of the observed image on the display portion 5 of the operation display unit 6. In addition, when it is detected that the rotation direction in the rotating operation of the revolver 53 is clockwise rotation, the CPU 201 displays a list of display magnifications of the observed image shown in FIG. 38 on the display portion 5 of the operation display unit 6.

FIGS. 37 and 38 show the arrangement of the objective lens 52 about the scale name "ON6" in the optical path with the column of "ON6" as a shaded area arranged at the top of the list.

As clearly shown in FIG. 36, with the objective lens 52 having the scale name "ON6", when the revolver 53 is rotated counterclockwise, the right adjacent objective lens 52 having the scale name "ON1" is arranged in the optical path. Afterwards, the objective lens 52 in the optical path is switched in the order of the attachment positions (clockwise) "ON2", "ON3", "ON4", and "ON5". In the sixth example of the list of display magnifications shown in FIG. 37, each scale name is arranged in this order.

Relating to the objective lens 52 having the scale name "ON6", when the revolver 53 is rotated clockwise, the objective lens 52 having the left adjacent scale name "ON5" is switched in the optical path in the order of the attachment positions (counterclockwise) "ON4", "ON3", "ON2", and "ON1" as clearly shown in FIG. 36. In the seventh example of the list of the display magnifications exemplified in FIG. 38, each scale name is arranged in this order, that is, in the reverse order of the counterclockwise rotation of the revolver 53 shown in FIG. 37.

That is, depending on the result of the determination by the optical cutoff state holder 68e on the rotation direction in the rotating operation of the revolver 53, the CPU 201 displays a list of display magnifications on the display portion 5 in the above-mentioned order, thereby further improving the operability of the microscope system.

Described next is a processing operation performed by the digital camera 3 for a microscope according to the present embodiment to rearrange and display a list of display magnifications of an observed image on the basis of the recognition result of the rotation direction of the revolver 53.

Figure 39:
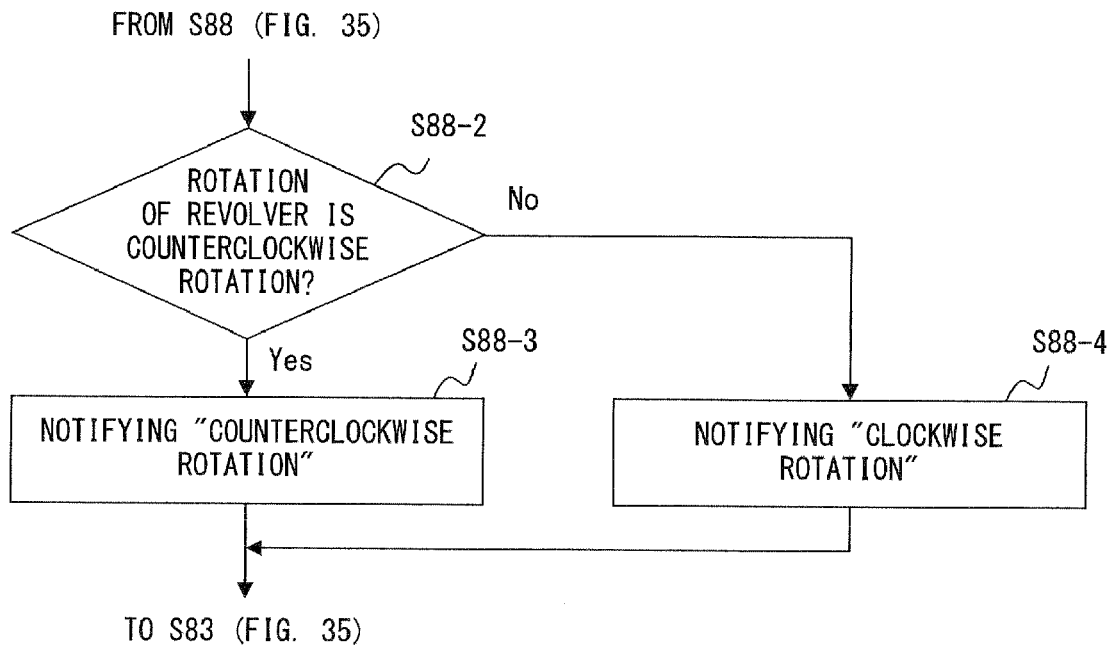
FIG. 39 shows a variation example of the flowchart shown in FIG. 35.

Described first below is an example shown in FIG. 39. FIG. 39 shows a variation example of a flowchart shown in FIG. 35, and shows a part of the flow of the processing operations performed by the objective change determination unit 66 to rearrange and display a list of display magnifications of an observed image on the basis of the recognition result of the rotation direction of the revolver 53. The processing operation is performed after the process in step S88 in the flowchart shown in FIG. 35.

In step S88 shown in FIG. 35, the optical cutoff state holder 68e notifies the CPU 201 of the flag information indicating "objective being changed". Then, in step S88-2 shown in FIG. 39, the optical cutoff state holder 68e determines whether or not the rotation direction in the rotating operation of the revolver 53 is counterclockwise rotation, that is, whether or not the value determined in step S86 shown in FIG. 35 as matching the held contents of the optical cutoff state of the observed image in the optical cutoff state holder 68e is a "counterclockwise rotation initial value". If it is determined that the rotation direction is counterclockwise rotation (YES as a determination result), control is passed to step S88-3. On the other hand, if it is determined that the rotation direction is clockwise rotation (NO as a determination result), control is passed to step S88-4.

In step S88-3, the optical cutoff state holder 68e outputs the information indicating "counterclockwise rotation" through the change determination unit 66p, and then control is returned to step S83 shown in FIG. 35.

In step S88-4, the optical cutoff state holder 68e outputs the information indicating "clockwise rotation" through the change determination unit 66p to notify the CPU 201 of the information. Afterwards, control is returned to step S83 shown in FIG. 35.

In the above-mentioned operating process, the information indicating the rotation direction in the rotating operation of the revolver 53 is provided for the CPU 201.

Figure 40:
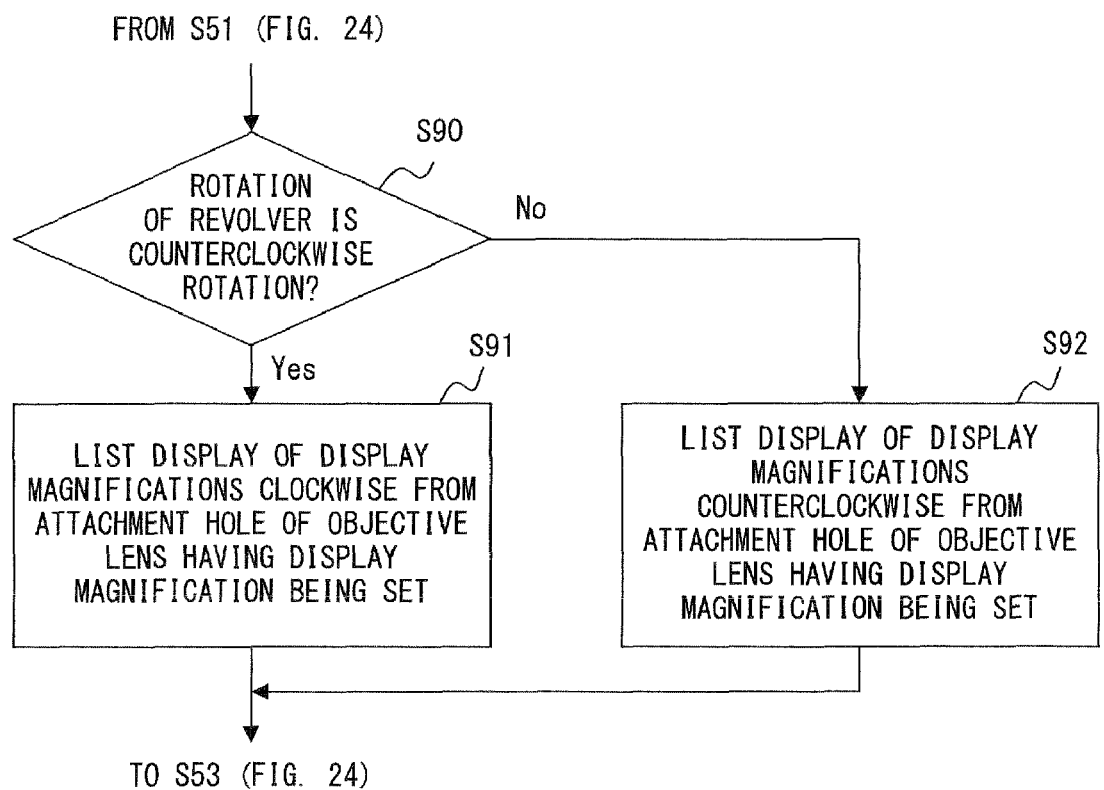
FIG. 40 shows a second variation example of the flowchart shown in FIG. 24.

Described next is an example shown in FIG. 40. FIG. 40 shows the second variation example of the flowchart shown in FIG. 24, and shows a part of the flow of the processing operation performed by the digital camera 3 for a microscope to rearrange and display a list of display magnifications of an observed image on the basis of the recognition result of the rotation direction of the revolver 53. The processing operation is performed depending on the processing operation of the objective change determination unit 66 shown in FIG. 39, and is performed instead of the process in S52 in the flowchart shown in FIG. 24.

In step S51 shown in FIG. 24, the CPU 201 arranges the display magnification currently being set and its scale name at the top (header in the arrangement order) of the list of display magnifications, and displays them on the image display panel 41. Then, in step S90 shown in FIG. 40, the CPU 201 determines whether or not the information about the rotation direction of the revolver 53 received from the objective change determination unit 66 refers to "counterclockwise rotation". If the information determines that the information refers to "counterclockwise rotation" (YES as determination result), control is passed to step S91. On the other hand, if the information refers to "clockwise rotation" (NO as a determination result), control is passed to step S92.

In step S91, the CPU 201 first reads a display magnification of each scale name stored in the nonvolatile memory not shown in the attached drawings, a list of display magnifications other than the magnification displayed in the process in step S51 arranged clockwise (when the revolver 53 is rotated counterclockwise) according to the above-mentioned order information stored in the nonvolatile memory is arranged at the lower portion of the display of display magnifications, and displayed on the image display panel 41 of the display portion 5. Afterwards, control is passed to step S53 shown in FIG. 24.

In step S92, the CPU 201 reads the display magnification of each scale name stored in the nonvolatile memory not shown in the attached drawings, a list of display magnifications other than the magnification displayed in the process in step S51 arranged counterclockwise (when the revolver 53 is rotated clockwise) according to the above-mentioned order information stored in the nonvolatile memory is arranged at the lower portion of the display of display magnifications, and displayed on the image display panel 41 of the display portion 5. Afterwards, control is passed to step S53 shown in FIG. 24.

In the above-mentioned processing operation, a list of display magnifications displayed on the image display panel 41 is displayed with the arrangement order of the display magnifications changed according to the rotation direction of the revolver 53 recognized by the objective change determination unit 66 and the information stored in the nonvolatile memory. Thus, the operability of the microscope system is further improved.

In the digital camera 3 for a microscope, instead of displaying a list of display magnifications with the arrangement order changed on the basis of the rotation direction of the revolver 53 as described above, the setting state of display of a scale can be directly changed and combined with an observed image and displayed on the basis of the recognition result.

That is, for example, assume that the objective change determination unit 66 has recognized the counterclockwise rotation of the revolver 53 in the state shown in FIG. 36, that is, in the state in which the objective lens 52 having the scale name "ON6" is arranged on the optical path. In this case, the setting of a display magnification for the digital camera 3 for a microscope can be directly changed from the one having the scale name "ON6" to the one having the scale name "ON1".

By performing the processes above, the setting of the display magnification can be changed without the observer performing selection from a list of display magnifications. Therefore, the operability can be further improved, thereby reducing an erroneous operation.

Figure 41:
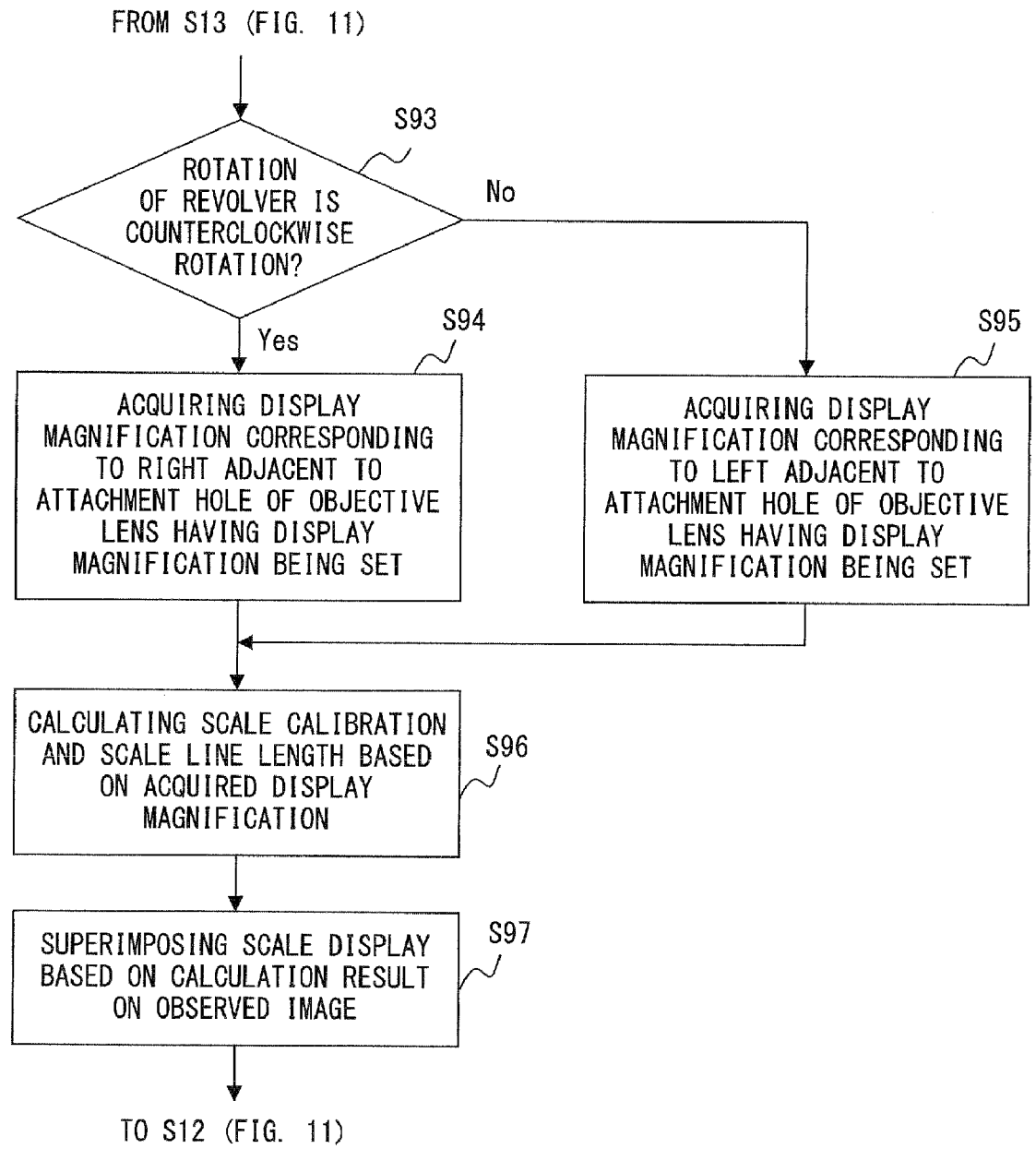
FIG. 41 shows a variation example of the flowchart shown in FIG. 11.

Described below is an example shown in FIG. 41. FIG. 41 shows a variation example of the flowchart shown in FIG. 11. It shows apart of the flow of the processing operation profile by the objective change determination unit 66 to directly change the setting state of the display of a scale on the basis of a recognition result of the rotation direction of the revolver 53, and superimpose the result on an observed image. The processing operation is performed depending on the processing operation of the objective change determination unit 66 shown in FIG. 39, and is performed instead of the process in S14 in the flowchart shown in FIG. 11.

If it is determined that the result of the determining process in step S13 shown in FIG. 1L is YES, and the flag information notified from the objective change determination unit 66 indicates "objective being changed", the process in step S93 shown in FIG. 41 is performed. That is, the CPU 201 determines whether or not the information about the rotation direction of the revolver 53 received from the objective change determination unit 66 refers to "counterclockwise rotation". If it is determined that the information refers to "counterclockwise rotation" (YES as a determination result), control is passed to step S94. On the other hand, if it is determined that the information refers to "clockwise rotation" (NO as a determination result), control is passed to step S95.

In step S94, the CPU 201 first reads the display magnification of each scale name stored in the nonvolatile memory not shown in the attached drawings. The CPU 201 acquires the display magnification corresponding to the right mounting hole next to the one on which the objective lens 52 having the display magnification currently being set. Afterwards, control is passed to step S96.

In step S95, the CPU 201 first reads the display magnification of each scale name stored in the nonvolatile memory not shown in the attached drawings. The CPU 201 acquires the display magnification corresponding to the left mounting hole next to the one on which the objective lens 52 having the display magnification currently being set. Afterwards, control is passed to step S96.

In step S96, the CPU 201 calculates as described above the scale calibration and the scale lines of an appropriate unit length on the basis of the value of the display magnification acquired in the process in step S 94 or S95. In step S97, the CPU 201 performs the control process of controlling the shot image-symbol string combination unit 64 and the observed image-symbol string combination unit 65 to superimpose the superimposed on the basis of the calculation result on the observed image. Afterwards, control is passed to step S12 shown in FIG. 11.

In the above-mentioned processing operation, the display of a scale superposed on an observed image is changed into display of a scale depending on the display magnification associated with the objective lens 52 in the next switch order in the rotation direction on the basis of the recognition result in the rotation direction of the revolver 53. Therefore, the operability of the digital camera 3 for a microscope is furthermore improved, thereby reducing erroneous operations.

As described above, some embodiments are described as modes for embodying the invention, but the present invention is not limited to the above-mentioned embodiments, and can be variously improved and amended within the scope of the gist of the present invention. For example, each of the above-mentioned embodiments can be combined with some others to embody the present invention.

For example, in the embodiment 1 etc., the objective change warning LED 72 is used as notification means, but a voice warning can be used instead. In addition, it is also possible to write predetermined notification information to the header of an image data file of an observed image. Furthermore, the PC 100 can issue a warning through the communication cable 101.

In addition, in each embodiment, when a change of an observed image is detected, an observer is prompted to make a change of a setting relating to display of a scale. Furthermore, an observer can be prompted to change the settings relating to the measurement functions such as a measurement between two points, a circle measurement (length of perimeter, radius, area), etc.

In each embodiment, the display of a scale is superposed on the display screen of an observed image, and a value of a display magnification such as "×100 as a magnification" can also be displayed.

In addition, for example, using or not using the function of notifying that a change of an observed image has been detected can be switched by operating a SW not shown in the attached drawings but provided for the operated portion 4, or selecting use or non-use on a menu screen depending on the observer.

On the list display of display magnifications described in each embodiment, only the display magnification such as [ON6: ×100] etc. of each scale name is displayed. Instead, for example, the scale calibration of an appropriate unit length calculated by the CPU 201 for a display magnification can be displayed with the display magnification such as [ON1: ×2: 10 um] etc.

What is claimed is:

1. A camera for a microscope, comprising:
an observed image display unit which displays an observed image acquired by the microscope;
a detection unit which detects a change of the observed image; and
a notification unit which outputs notification information indicating a result of the detection of the change of the observed image by the detection unit,
wherein the detection unit comprises an optical cutoff time keeping unit that keeps a time elapsed since the observed image changed into an optical cutoff state; and
wherein the detection unit is configured to detect whether the observed image has recovered from the optical cutoff state within a predetermined time since the observed image changed into the optical cutoff state, based on a timekeeping result of the optical cutoff time keeping unit.

2. A camera for a microscope, comprising:
an observed image display unit which displays an observed image acquired by the microscope;
a detection unit which detects a change of the observed image;
a notification unit which outputs notification information indicating a result of the detection of the change of the observed image by the detection unit;
a display magnification information storage unit which stores display magnification information of the observed image, wherein the notification unit is configured to display a list of display magnifications of the observed image stored in the display magnification information storage unit as the output of the notification information;
a scale information display unit which displays scale information indicating a size relationship between a sample to be observed by the microscope and an image of the sample expressed by the observed image;
a select instruction acquisition unit which is configured to acquire a select instruction from the displayed list of display magnifications; and
a scale information display change unit which changes the display of the scale information by the scale information display unit into a display of scale information corresponding to a display magnification relating to the select instruction.

3. The camera according to claim 2, wherein the notification unit is configured to rearrange the list of display magnifications so that the display magnification relating to the select instruction acquired by the select instruction acquisition unit is arranged in a specific order, and wherein the notification unit is configured to display the rearranged list.

4. The camera according to claim 2, wherein the notification unit stops the display of the list of display magnifications if a predetermined time has past since the display of the list was started and the select instruction acquisition unit does not acquire the select instruction.

5. The camera according to claim 4, wherein the notification unit notifies that the select instruction has not been acquired if the display of the list of display magnifications is stopped.

6. A camera for a microscope, comprising:
an observed image display unit which displays an observed image acquired by the microscope;
a detection unit which detects a change of the observed image;
a notification unit which outputs notification information indicating a result of the detection of the change of the observed image by the detection unit;
a display magnification information storage unit which stores display magnification information of the observed image, wherein the notification unit is configured to display a list of display magnifications of the observed image stored in the display magnification information storage unit as the output of the notification information;
a select instruction acquisition unit which is configured to acquire a select instruction from the displayed list of display magnifications;
a shoot instruction selection unit which is configured to acquire a shoot instruction for the observed image;
an observed image record unit which records the observed image when the shoot instruction acquisition unit acquires the shoot instruction; and
an observed image record prohibit unit which prohibits the recording of the observed image by controlling the observed image record unit when the shoot instruction selection unit acquires the shoot instruction for the observed image without the select instruction acquisition unit acquiring the select instruction after starting the display of the list of display magnifications.

7. The camera according to claim 6, further comprising a non-selection notification unit which, when the shoot instruction selection unit acquires the shoot instruction for the observed image without the select instruction acquisition unit acquiring the select instruction after the display of the list of display magnifications is started, notifies the acquisition of said shoot instruction.

8. A camera for a microscope, comprising:
an observed image display unit which displays an observed image acquired by the microscope;
a detection unit which detects a change of the observed image;
a notification unit which outputs notification information indicating a result of the detection of the change of the observed image by the detection unit; and
a display magnification information storage unit which stores display magnification information of the observed image,
wherein the notification unit is configured to display a list of display magnifications of the observed image stored in the display magnification information storage unit as the output of the notification information;
wherein the microscope comprises a rotating revolver to switch an objective lens used in an observation of a sample to be observed;
wherein the display magnification information storage unit stores information about the display magnifications as associated with each attachment position of each objective lens of the rotating revolver, and stores order information indicating a switch order of the objective lenses when the rotating revolver is rotated;
wherein the camera for the microscope further comprises a rotation direction recognition unit which recognizes a relationship between the change of the observed image detected by the detection unit and a rotation direction of the rotating revolver based on the observed image; and
wherein the notification unit changes, when the list of display magnifications is displayed, an order of the display magnifications in the list according to the rotation direction of the rotating revolver recognized by the rotation direction recognition unit and the information stored in the display magnification information storage unit, and displays the order-changed list.

9. A camera for a microscope, comprising:
an observed image display unit which displays an observed image acquired by the microscope;
a detection unit which detects a change of the observed image;
a notification unit which outputs notification information indicating a result of the detection of the change of the observed image by the detection unit; and
a display magnification information storage unit which stores display magnification information of the observed image,
wherein the notification unit is configured to display a list of display magnifications of the observed image stored in the display magnification information storage unit as the output of the notification information;
wherein the microscope comprises a rotating revolver for switching an objective lens used in an observation of a sample to be observed;
wherein the display magnification information storage unit stores information about the display magnifications as associated with each attachment position of each objective lens of the rotating revolver, and stores order information indicating a switch order of the objective lenses when the rotating revolver is rotated; and
wherein the camera for the microscope further comprises:
a rotation direction recognition unit which recognizes a relationship between the change of the observed image detected by the detection unit and a rotation direction of the rotating revolver based on the observed image;
a scale information display unit which displays scale information indicating a size relationship between the sample to be observed by the microscope and an image of the sample displayed on the observed image; and
a scale information display change unit which changes the display of the scale information by the scale information display unit into a display of scale information according to a display magnification associated with an objective lens that is in a next switching order in the rotation direction according to the rotation direction of the rotating revolver recognized by the rotation direction recognition unit and the information stored in the display magnification information storage unit.

* * * * *